US008649978B2

(12) United States Patent
Takaoka

(10) Patent No.: US 8,649,978 B2
(45) Date of Patent: Feb. 11, 2014

(54) VELOCITY CALCULATING DEVICE, VELOCITY CALCULATION METHOD, AND NAVIGATION DEVICE

(75) Inventor: Tomohisa Takaoka, Kanagawa (JP)

(73) Assignee: Sony Corporation, Tokyo (JP)

( * ) Notice: Subject to any disclaimer, the term of this patent is extended or adjusted under 35 U.S.C. 154(b) by 720 days.

(21) Appl. No.: 12/846,179

(22) Filed: Jul. 29, 2010

(65) Prior Publication Data

US 2011/0066377 A1    Mar. 17, 2011

(30) Foreign Application Priority Data

Sep. 15, 2009    (JP) ................................. 2009-213447

(51) Int. Cl.
*G01C 21/16*    (2006.01)
*G01P 15/00*    (2006.01)

(52) U.S. Cl.
USPC .......................................... 701/500; 701/507

(58) Field of Classification Search
None
See application file for complete search history.

(56) References Cited

U.S. PATENT DOCUMENTS

| 2004/0267492 | A1* | 12/2004 | Kogure et al. | ................ 702/141 |
| 2008/0071476 | A1 | 3/2008 | Hoshizaki | |
| 2008/0109166 | A1 | 5/2008 | Takaoka | ......................... 701/216 |
| 2008/0114545 | A1 | 5/2008 | Takaoka | ......................... 701/220 |
| 2010/0057360 | A1* | 3/2010 | Ohkubo | ......................... 701/220 |
| 2010/0292915 | A1* | 11/2010 | Ishigami et al. | .............. 701/200 |

FOREIGN PATENT DOCUMENTS

JP    2008-76389    4/2008

OTHER PUBLICATIONS

U.S. Appl. No. 12/846,161, filed Jul. 29, 2010, Takaoka.

* cited by examiner

*Primary Examiner* — James Trammell
*Assistant Examiner* — Demetra Smith-Stewart
(74) *Attorney, Agent, or Firm* — Oblon, Spivak, McClelland, Maier & Neustadt, L.L.P.

(57) ABSTRACT

Provided is a velocity calculating device including a vertical acceleration detector that detects a vertical acceleration generated due to an undulation of a contact surface; a horizontal angular velocity detector that detects a horizontal angular velocity generated due to the undulation; a correlation coefficient calculator that calculates a correlation coefficient that represents a degree to which an acceleration in the direction of travel is mixed into the vertical acceleration in accordance with an attachment angle; a true vertical acceleration detector that calculates a true vertical acceleration by subtracting the acceleration in the direction of travel mixed into the vertical acceleration from the vertical acceleration, the acceleration in the direction of travel mixed into the vertical acceleration being calculated using the correlation coefficient; and a velocity calculator that calculates a velocity of a moving body on the basis of the true vertical acceleration and the horizontal angular velocity.

8 Claims, 43 Drawing Sheets

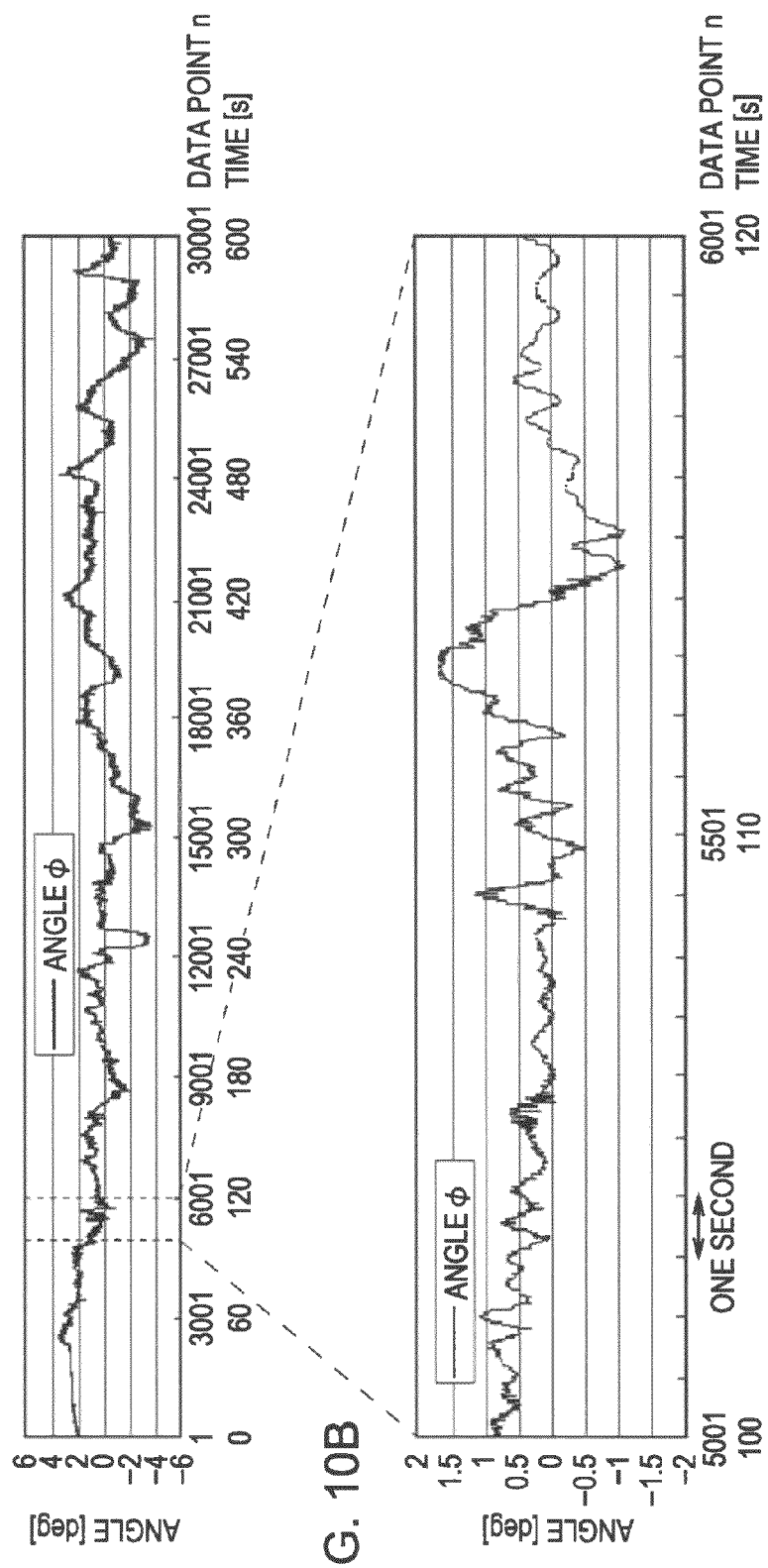

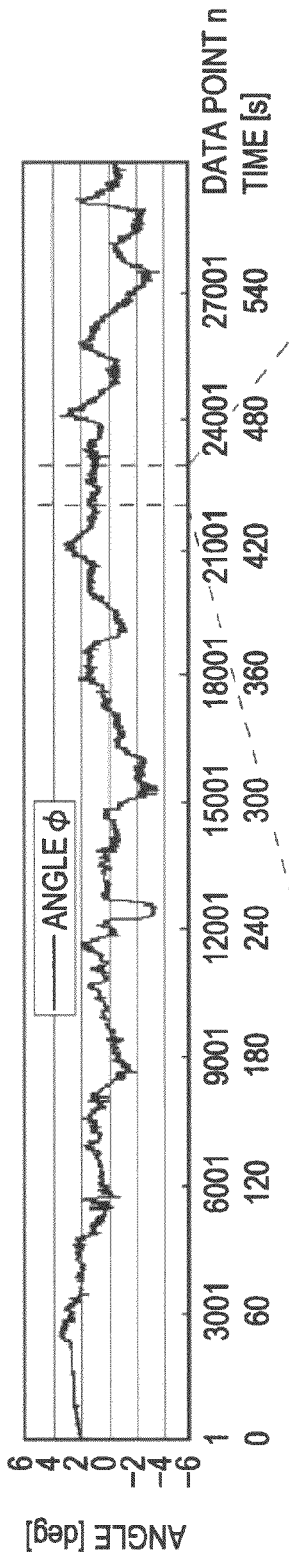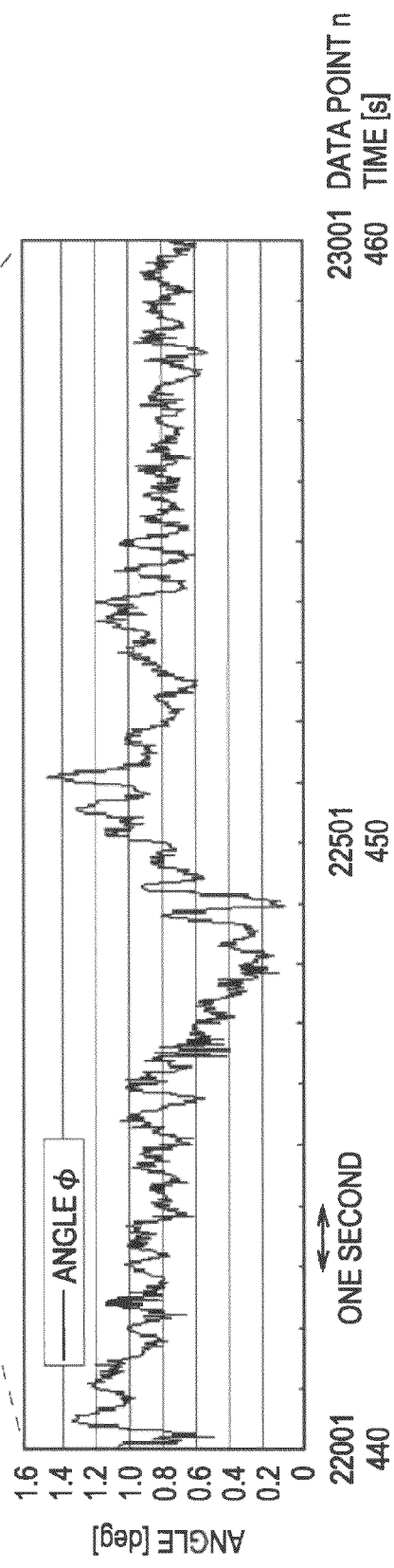

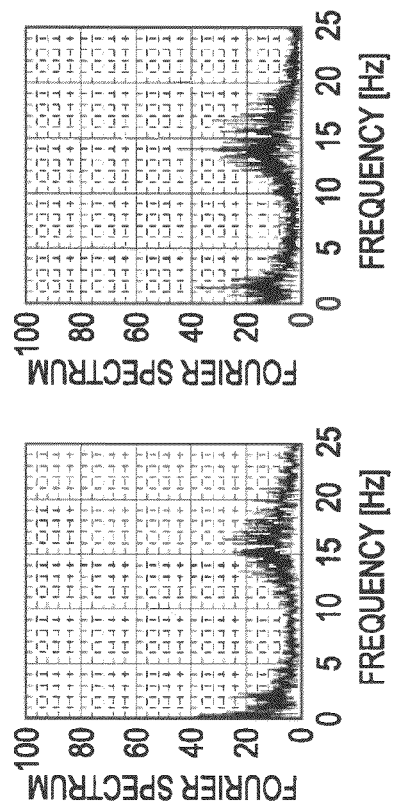
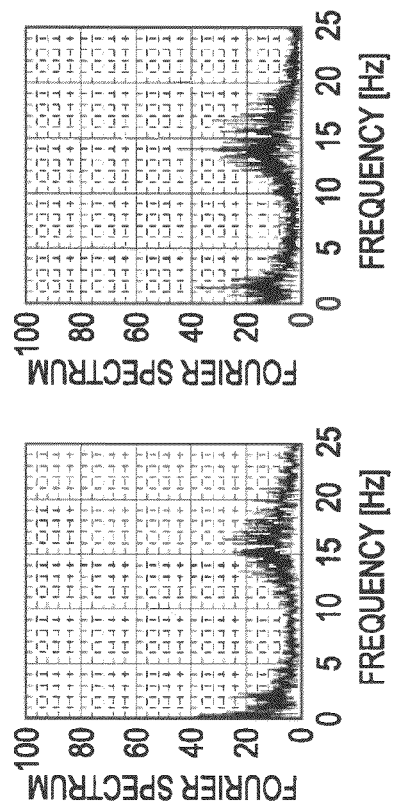
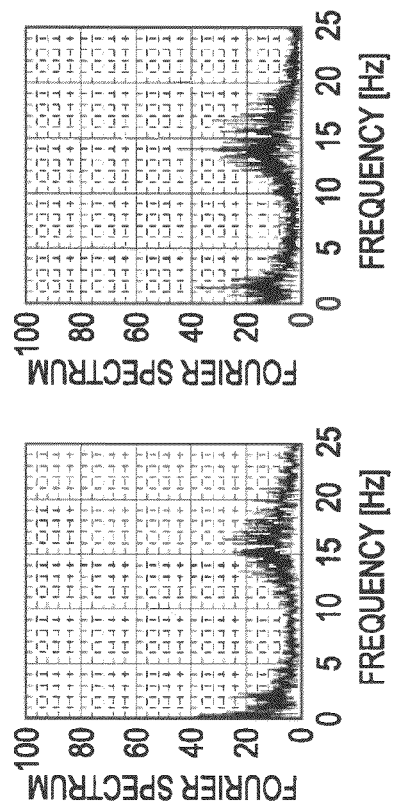
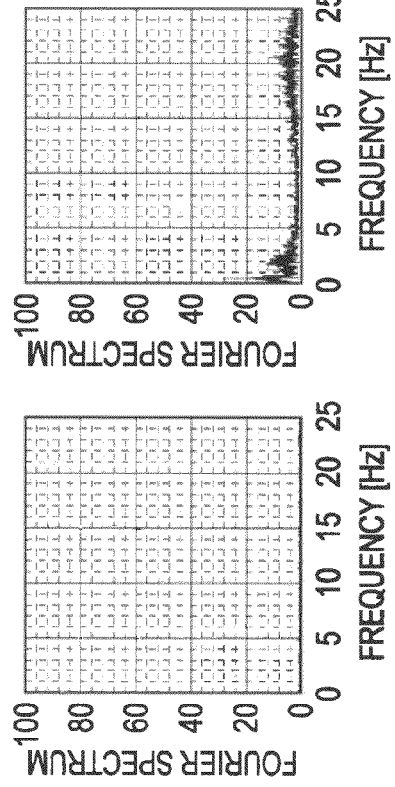
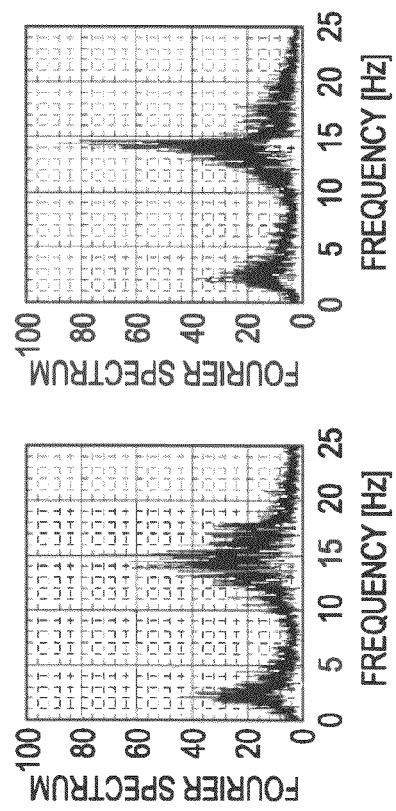
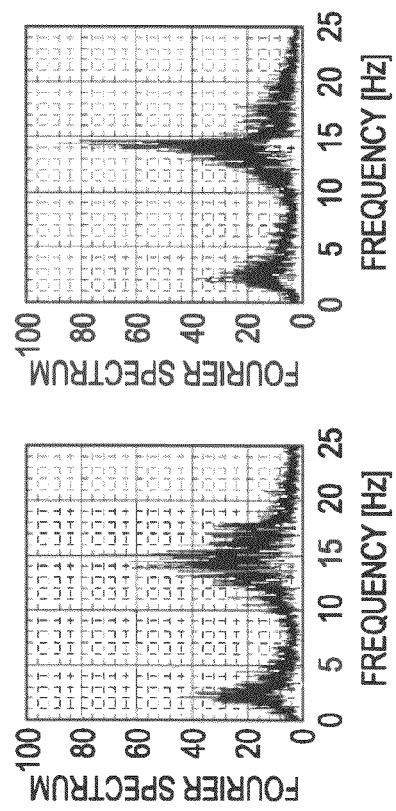
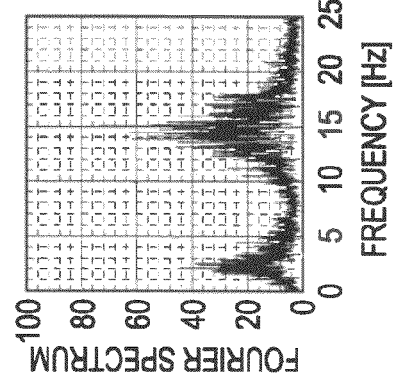
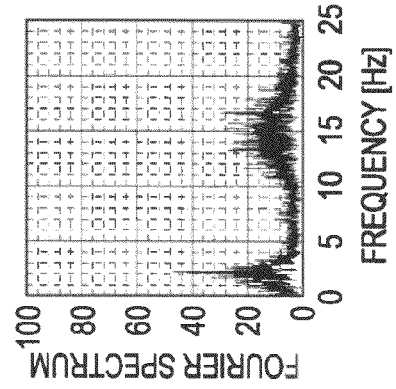

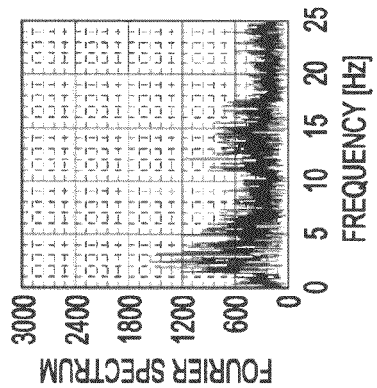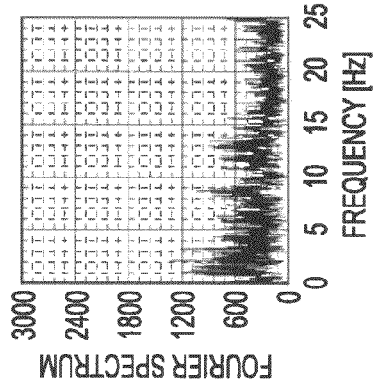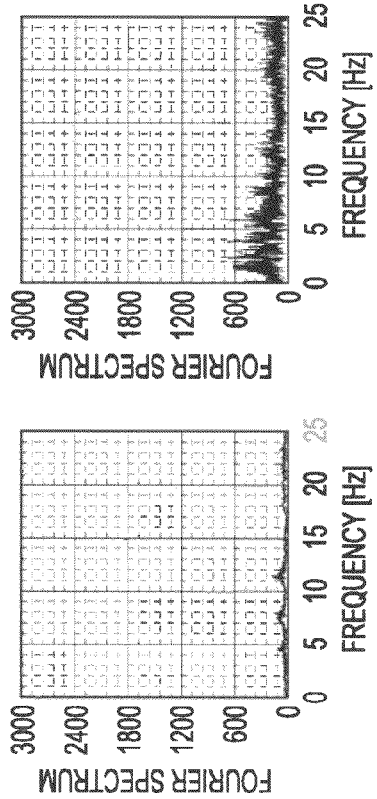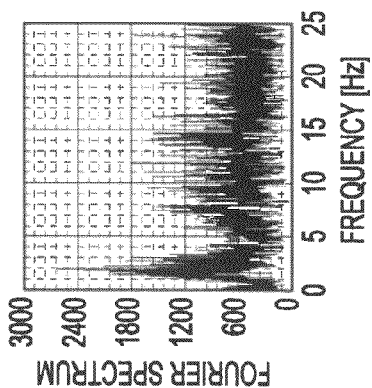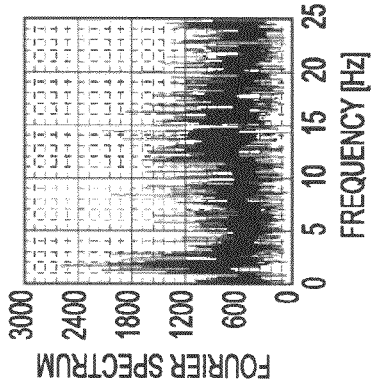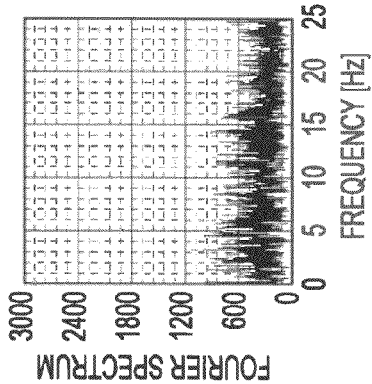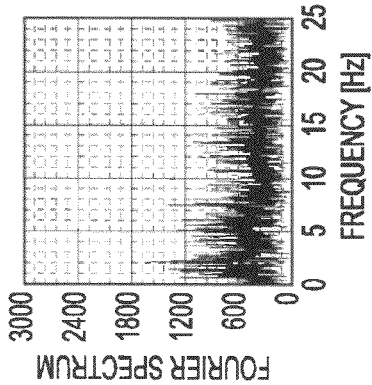

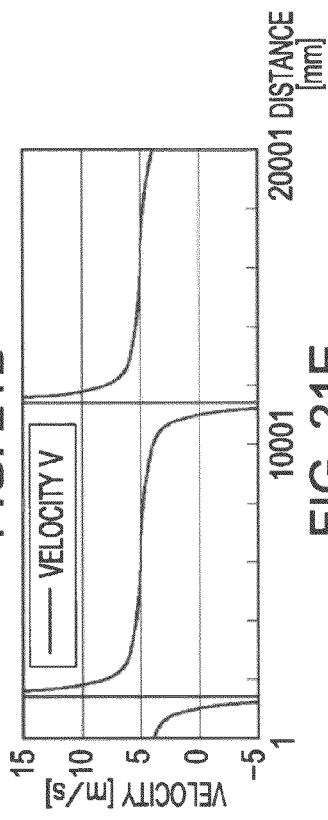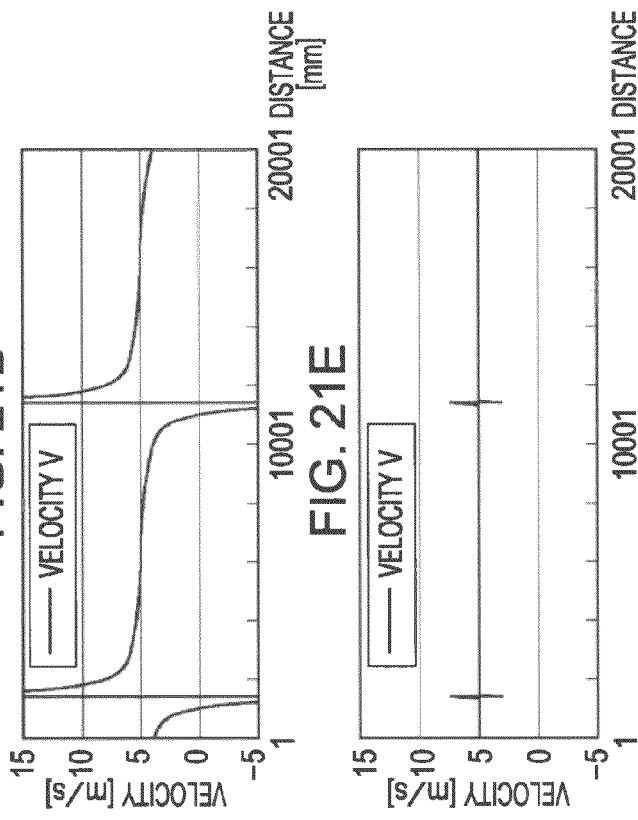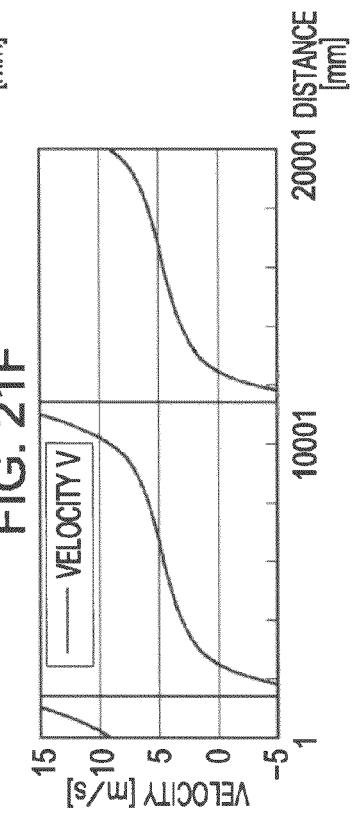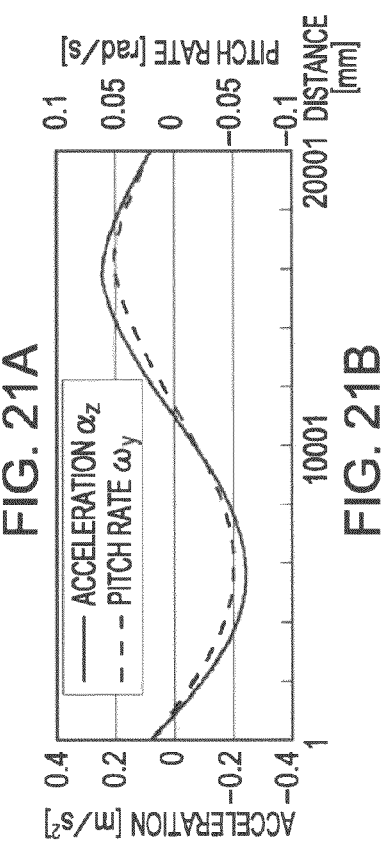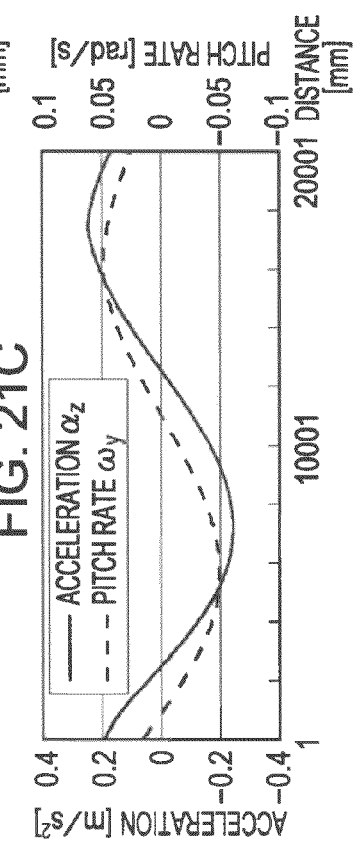

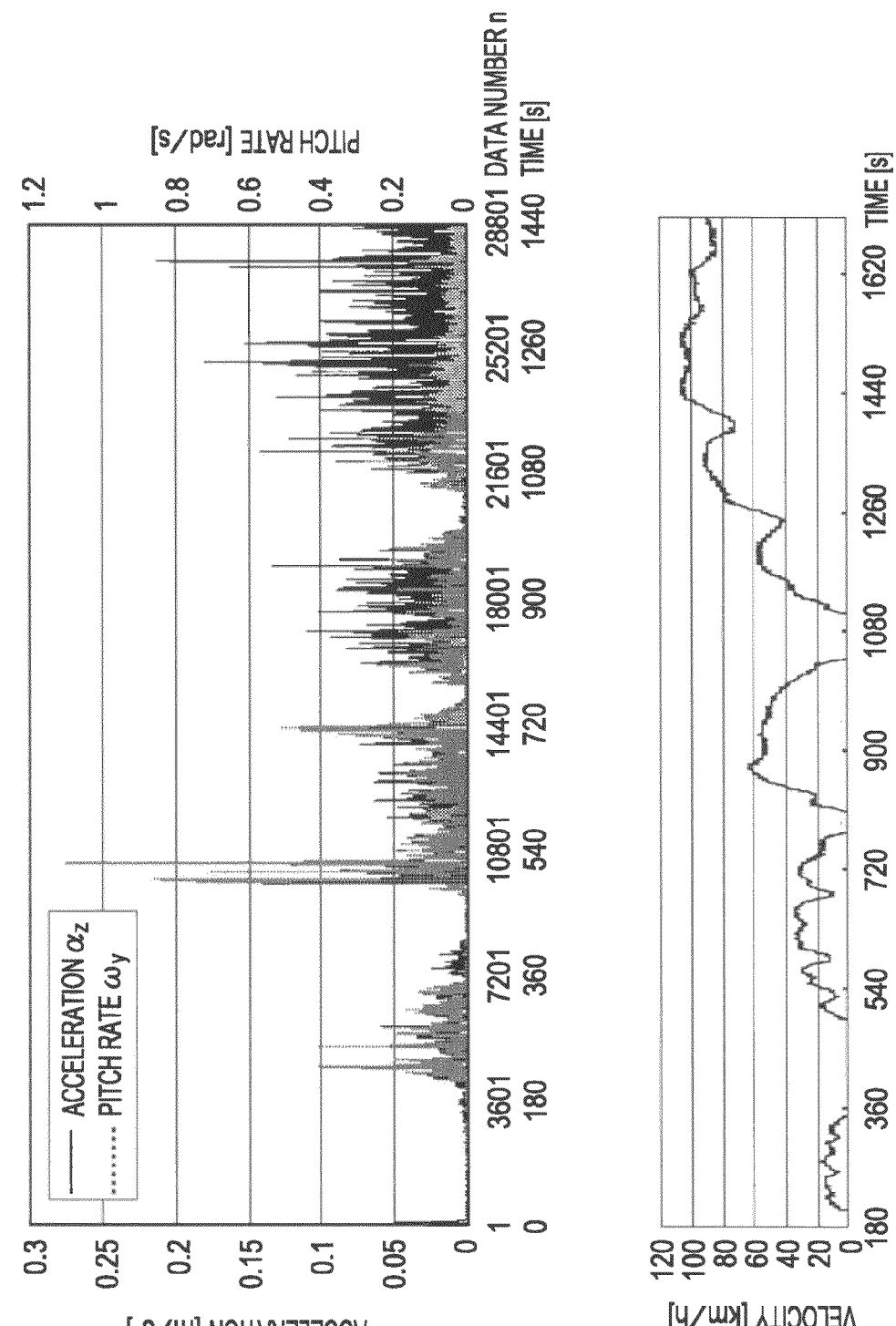

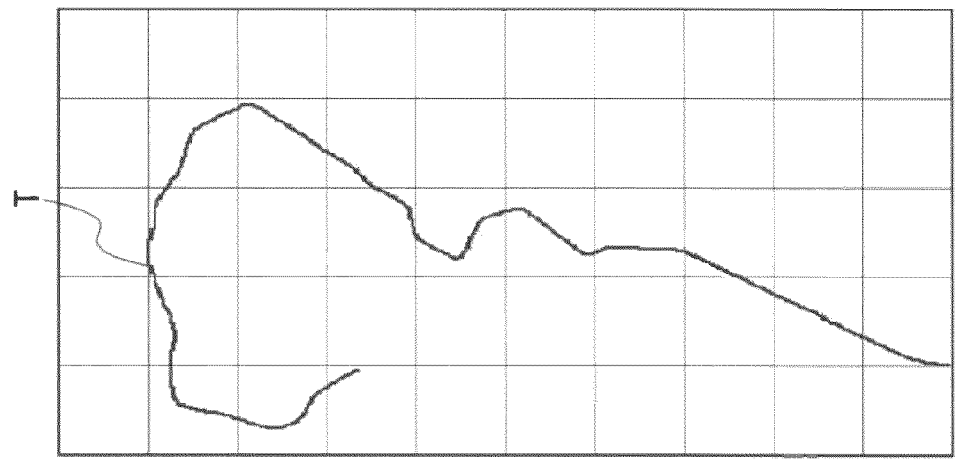
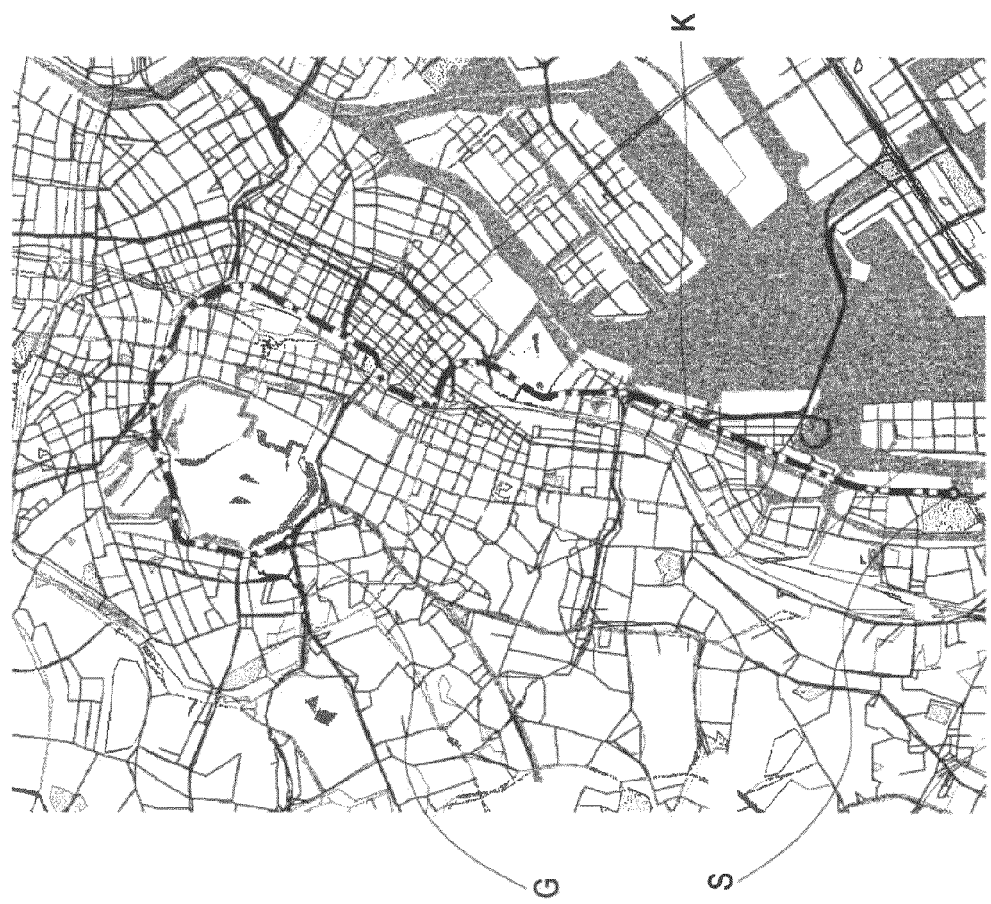

VELOCITY CALCULATING DEVICE, VELOCITY CALCULATION METHOD, AND NAVIGATION DEVICE

BACKGROUND OF THE INVENTION

1. Field of the Invention

The present invention relates to a velocity calculating device, a velocity calculating method, and a navigation device, which are suitable for, for example, a portable navigation device.

2. Description of the Related Art

Existing navigation devices receive position signals (hereinafter referred to as GPS signals) from a plurality of global positioning system (GPS) satellites and calculate the present position of a vehicle on the basis of the GPS signals.

However, when a vehicle in which the navigation device is placed is in a tunnel or an underground parking garage, it is difficult for the navigation device to receive GPS signals from GPS satellites and to calculate the present position on the basis of the GPS signals.

Even when it is difficult to receive GPS signals, some navigation devices calculate the velocity in the direction of travel of the vehicle on the basis of the acceleration in a horizontal direction perpendicular to the direction of travel and the angular velocity around the vertical axis perpendicular to the direction of travel when the vehicle is cornering, and thereby calculate the present position of the vehicle on the basis of the velocity in the direction of travel (see, for example, Japanese Unexamined Patent Application Publication No. 2008-76389).

SUMMARY OF THE INVENTION

Such navigation devices can calculate velocity in the direction of travel when the vehicle is cornering, but it is difficult to calculate the velocity in the direction of travel when the vehicle is moving linearly. Therefore, it is difficult for such navigation devices to calculate the velocity in the direction of travel under all road conditions.

The present invention provides a velocity calculating device, a velocity calculating method, and a navigation device that are capable of precisely calculating the velocity of a vehicle under all road conditions.

According to an embodiment of the present invention, there is provided a velocity calculating device including a vertical acceleration detector mounted on a moving body, the vertical acceleration detector detecting an acceleration in a vertical direction generated due to an undulation of a contact surface that is in contact with the moving body; a horizontal angular velocity detector mounted on the moving body, the horizontal angular velocity detector detecting an angular velocity around a horizontal axis that is perpendicular to a direction of travel of the moving body, the angular velocity being generated due to the undulation of the contact surface; a correlation coefficient calculator that calculates a correlation coefficient that represents a degree to which an acceleration in the direction of travel of the moving body is mixed into the acceleration in the vertical direction in accordance with an attachment angle with which a body including the vertical acceleration detector and the horizontal angular velocity detector is attached to the moving body; a true vertical acceleration detector that calculates a true acceleration in the vertical direction by subtracting the acceleration in the direction of travel mixed into the acceleration in the vertical direction from the acceleration in the vertical direction, the acceleration in the direction of travel mixed into the acceleration in the vertical direction being calculated on the basis of the correlation coefficient; and a velocity calculator that calculates a velocity of the moving body in the direction of travel of the moving body on the basis of the true acceleration in the vertical direction and the angular velocity around the horizontal axis.

According to an embodiment of the present invention, there is provided a method of calculating a velocity, the method including the steps of detecting an acceleration in a vertical direction generated due to an undulation of a contact surface that is in contact with a moving body by using a vertical acceleration detector mounted on the moving body; detecting an angular velocity around a horizontal axis that is perpendicular to a direction of travel of the moving body by using a horizontal angular velocity detector mounted on the moving body, the angular velocity being generated due to the undulation of the contact surface; calculating a correlation coefficient that represents a degree to which an acceleration in the direction of travel of the moving body is mixed into the acceleration in the vertical direction in accordance with an attachment angle with which a body including the vertical acceleration detector and the horizontal angular velocity detector is attached to the moving body by using a correlation coefficient calculator; calculating a true acceleration in the vertical direction by subtracting the acceleration in the direction of travel mixed into the acceleration in the vertical direction from the acceleration in the vertical direction by using a predetermined true vertical acceleration detector, the acceleration in the direction of travel mixed into the acceleration in the vertical direction being calculated on the basis of the correlation coefficient; and calculating a velocity of the moving body in the direction of the travel of the moving body on the basis of the true acceleration in the vertical direction and the angular velocity around the horizontal axis by using a velocity calculator.

Thus, the degree to the acceleration of the moving body in the direction of travel is mixed into the acceleration in a vertical direction in accordance with the angle with which the body is mounted on the moving body is calculated as the correlation coefficient, the acceleration direction of travel that is mixed into the acceleration in the vertical direction is calculated on the basis of the correlation coefficient, the true acceleration in the vertical direction is calculated by subtracting the acceleration direction of travel that is mixed into the acceleration in the vertical direction from the acceleration in the vertical direction, and the velocity of the moving body in the direction of travel is calculated on the basis of the true acceleration in the vertical direction and the angular velocity around the horizontal axis, whereby the velocity of the moving body can be precisely calculated irrespective of whether or not the body of the velocity calculating device is attached to the moving body with an attachment angle.

According to an embodiment of the present invention, there is provided a navigation device including a vertical acceleration detector mounted on a moving body, the vertical acceleration detector detecting an acceleration in a vertical direction generated due to an undulation of a contact surface that is in contact with the moving body; a horizontal angular velocity detector mounted on the moving body, the horizontal angular velocity detector detecting an angular velocity around a horizontal axis that is perpendicular to a direction of travel of the moving body, the angular velocity being generated due to the undulation of the contact surface; a correlation coefficient calculator that calculates a correlation coefficient that represents a degree to which an acceleration in the direction of travel of the moving body is mixed into the acceleration in a vertical direction in accordance with an attachment angle with which a body including the vertical acceleration detector and the horizontal angular velocity detector is attached to the moving body; a true vertical acceleration detector that calculates a true acceleration in a vertical direction by subtracting the acceleration in the direction of travel mixed into the acceleration in a vertical direction from the acceleration in a vertical direction, the acceleration in the direction of travel mixed into the acceleration in a vertical direction being calculated on the basis of the correlation coefficient; a velocity calculator that calculates a velocity of the moving body in the direction of travel of the moving body on the basis of the true acceleration in the vertical direction and the angular velocity around the horizontal axis; a vertical angular velocity detector that calculates an angular velocity around the vertical axis perpendicular to the direction of travel; an angle calculator that calculates an angle by which the moving body has rotated on the basis of the angular velocity around the vertical axis; and a position calculator that calculates a position of the moving body on the basis of the velocity in the direction of travel that is calculated by the velocity calculator and the angle that is calculated by the angle calculator.

Thus, the degree to the acceleration of the moving body in the direction of travel is mixed into the acceleration in a vertical direction in accordance with the angle with which the body is mounted on the moving body is calculated as the correlation coefficient, the acceleration direction of travel that is mixed into the acceleration in the vertical direction is calculated on the basis of the correlation coefficient, the true acceleration in the vertical direction is calculated by subtracting the acceleration direction of travel that is mixed into the acceleration in the vertical direction from the acceleration in the vertical direction, the velocity of the moving body in the direction of travel is calculated on the basis of the true acceleration in the vertical direction and the angular velocity around the horizontal axis, and the position of the moving body is calculated on the basis of the velocity in the direction of travel and the angle that is calculated by the angle calculator, whereby the velocity of the moving body can be precisely calculated irrespective of whether or not the body of the velocity calculating device is attached to the moving body with an attachment angle.

The embodiments of present invention realize a velocity calculating device and a method of calculating a velocity with which the degree to the acceleration of the moving body in the direction of travel is mixed into the acceleration in a vertical direction in accordance with the angle with which the body is mounted on the moving body is calculated as the correlation coefficient, the acceleration direction of travel that is mixed into the acceleration in the vertical direction is calculated on the basis of the correlation coefficient, the true acceleration in the vertical direction is calculated by subtracting the acceleration direction of travel that is mixed into the acceleration in the vertical direction from the acceleration in the vertical direction, and the velocity of the moving body in the direction of travel is calculated on the basis of the true acceleration in the vertical direction and the angular velocity around the horizontal axis, whereby the velocity of the moving body can be precisely calculated irrespective of whether or not the body of the velocity calculating device is attached to the moving body with an attachment angle.

The embodiment of present invention realizes a navigation device with which the degree to the acceleration of the moving body in the direction of travel is mixed into the acceleration in a vertical direction in accordance with the angle with which the body is mounted on the moving body is calculated as the correlation coefficient, the acceleration direction of travel that is mixed into the acceleration in the vertical direction is calculated on the basis of the correlation coefficient, the true acceleration in the vertical direction is calculated by subtracting the acceleration direction of travel that is mixed into the acceleration in the vertical direction from the acceleration in the vertical direction, the velocity of the moving body in the direction of travel is calculated on the basis of the true acceleration in the vertical direction and the angular velocity around the horizontal axis, and the position of the moving body is calculated on the basis of the velocity in the direction of travel and the angle that is calculated by the angle calculator, whereby the velocity of the moving body can be precisely calculated irrespective of whether or not the body of the velocity calculating device is attached to the moving body with an attachment angle.

BRIEF DESCRIPTION OF THE DRAWINGS

FIGS. 10A and 10B are graphs illustrating the angle of a road surface when a vehicle is traveling at a low velocity;

FIGS. 11A and 11B are graphs illustrating the angle of a road surface when a vehicle is traveling at a high velocity;

FIGS. 15A to 15H are graphs illustrating the total angular velocity that has been Fourier transformed for every 4096 data points;

FIGS. 16A to 16H are graphs illustrating the total acceleration that has been Fourier transformed for every 4096 data points;

FIGS. 21A to 21F are graphs illustrating a simulation result of the acceleration, the pitch rate, and the velocity when the PND is placed at three different positions;

FIGS. 26A and 26B are graphs illustrating examples of measurement results of the acceleration, the angular velocity, and the velocity;

FIGS. 35A and 35B are graphs illustrating a comparison between a route on a map and a travel path of the vehicle;

DESCRIPTION OF THE PREFERRED EMBODIMENTS

Hereinafter, embodiments for carrying out the present invention (hereinafter referred to as embodiments) will be described in the following order with reference to the drawings.

1. First Embodiment (an example in which a navigation device is not tilted)
2. Second Embodiment (an example removing the influence of unwanted acceleration component due to a tilt of the navigation device)
3. Other Embodiments 1. First Embodiment 1-1. Fundamental Principle In the following description, a personal navigation device (hereinafter referred to as a PND) is used as an example of a first embodiment of the present invention, and the fundamental principle of calculating the velocity and the present position of a vehicle using the PND will be described.

1-1-1. Principle of Velocity Calculation

Figure 1A:
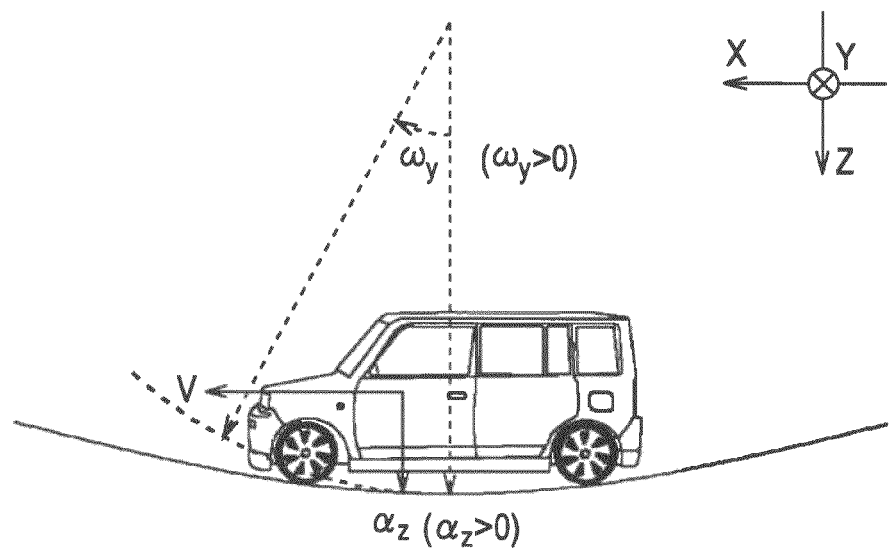
FIG. 1A is a diagram illustrating a vehicle traveling on a concave road surface.
Figure 1B:
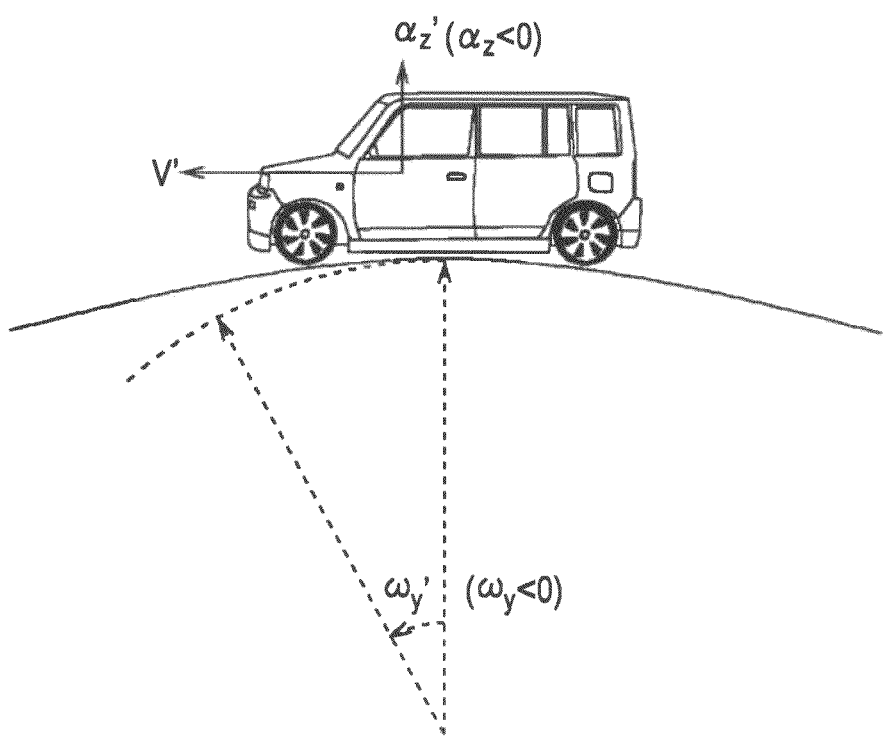
FIG. 1B is a diagram illustrating the vehicle traveling on a convex road surface.

In practice, a road on which a vehicle travels is seldom flat, and is generally concave as illustrated in FIG. 1A or generally convex as illustrated in FIG. 1B.

In the coordinate system associated with the vehicle, the X axis extends in the front-back direction, the Y axis extends in a horizontal direction perpendicular to the X axis, and the Z axis extends in the vertical direction.

The PND is placed, for example, on the dashboard of the vehicle. When the vehicle travels on the concave road (FIG. 1A), a three-axis acceleration sensor of the PND detects a downward acceleration $\alpha_z$ along the Z axis with a sampling frequency of, for example, 50 Hz.

A Y axis gyro sensor of the PND detects an angular velocity $\omega_y$ around the Y axis (hereinafter referred to as a pitch rate) perpendicular to the direction of travel of the vehicle with a sampling frequency of, for example, 50 Hz.

For the PND, the sign of the downward acceleration $\alpha_z$ along the Z axis is defined as positive. The sign of the pitch rate $\omega_y$, upwardly rotating, with respect to the direction of travel, along an imaginary circle that is formed along a concave road surface illustrated in FIG. 1A is defined as positive.

The PND calculates the velocity V of the vehicle in the direction of travel 50 times per second using the acceleration $\alpha_z$ detected by the three-axis acceleration sensor and the pitch rate $\omega_y$ detected by the Y axis gyro sensor in accordance with the following equation (1).

$$V = \frac{\alpha_z}{\omega_y} \qquad (1)$$

When the vehicle travels on a convex road (FIG. 1B), the three-axis acceleration sensor of the PND detects an upward acceleration $\alpha_{z'}$ along the Z axis with a sampling frequency of, for example, 50 Hz, and the Y axis gyro sensor of the PND detects a pitch rate $\omega_{y'}$ around the Y axis with a sampling frequency of, for example, 50 Hz.

The PND calculates the velocity V' of the vehicle in the direction of travel 50 times per second using the acceleration $\alpha_{z'}$ detected by the three-axis acceleration sensor and the pitch rate $\omega_{y'}$ detected by the Y axis gyro sensor in accordance with the following equation (2).

$$V' = \frac{\alpha_z'}{\omega_y'} \qquad (2)$$

For convenience of description here, a negative acceleration is described as the acceleration $\alpha_{z'}$. In practice, the three-axis acceleration sensor detects the acceleration $\alpha^{z'}$ as a negative value of the acceleration $\alpha_z$. Likewise, a negative pitch rate is described as the pitch rate $\omega_{y'}$. In practice, the Y axis gyro sensor detects the pitch rate $\omega_{y'}$ as a negative value of the pitch rate $\omega_y$. Therefore, in practice, the velocity V' is also calculated as the velocity V.

1-1-2. Principle of Calculating Present Position

Next, the principle of calculating the present position on the basis of the velocity V, which have been calculated by using the above principle of velocity calculation, and the angular velocity around the Z axis will be described.

Figure 2:
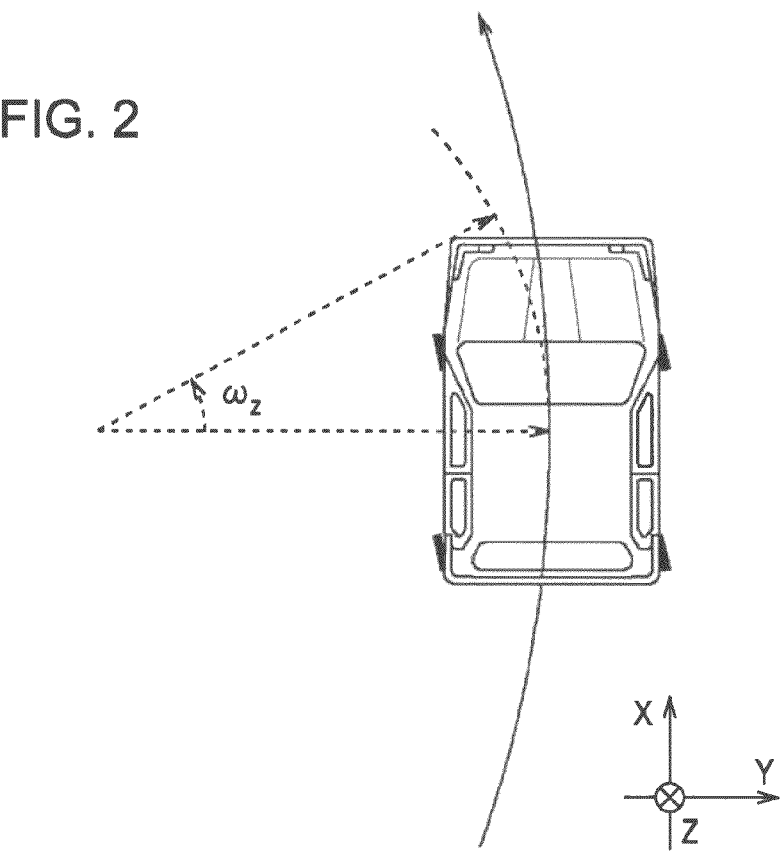
FIG. 2 is a diagram illustrating a vehicle traveling along a curve.

Referring to FIG. 2, when the vehicle is, for example, turning to the left, a Z axis gyro sensor of the PND detects an angular velocity around the Z axis (hereinafter referred to as a yaw rate) $\omega_z$ with a sampling frequency of, for example, 50 Hz.

Figure 3:
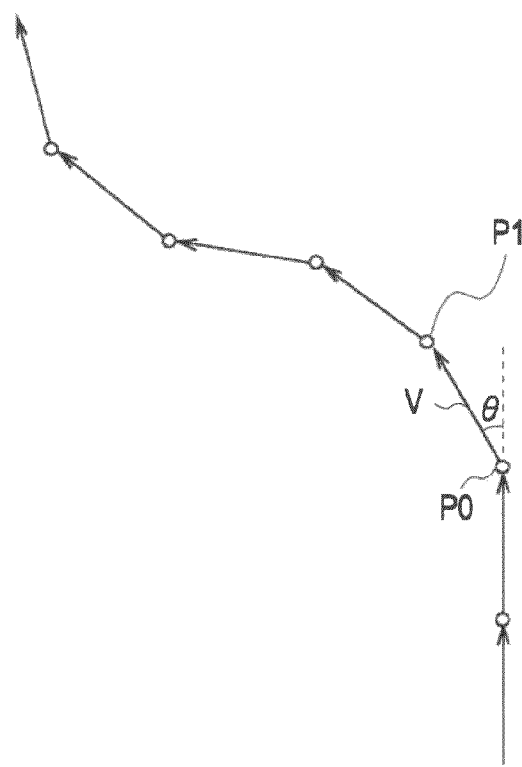
FIG. 3 is a diagram illustrating a method of calculating the present position using a velocity and an angle.

Referring to FIG. 3, the PND calculates the displacement from a previous position P0 to a present position P1 on the basis of the velocity V at the previous position P0 and an angle θ that is calculated by multiplying the yaw rate $\omega_z$ detected by the gyro sensor by a sampling period (in this case, 0.02 s). The PND calculates the present position P1 by adding the displacement to the previous position P0.

1-2. Structure of PND

The specific structure of the PND, which calculates the velocity of a vehicle using the fundamental principle described above, will be described.

1-2-1. External Structure of PND

Figure 4:
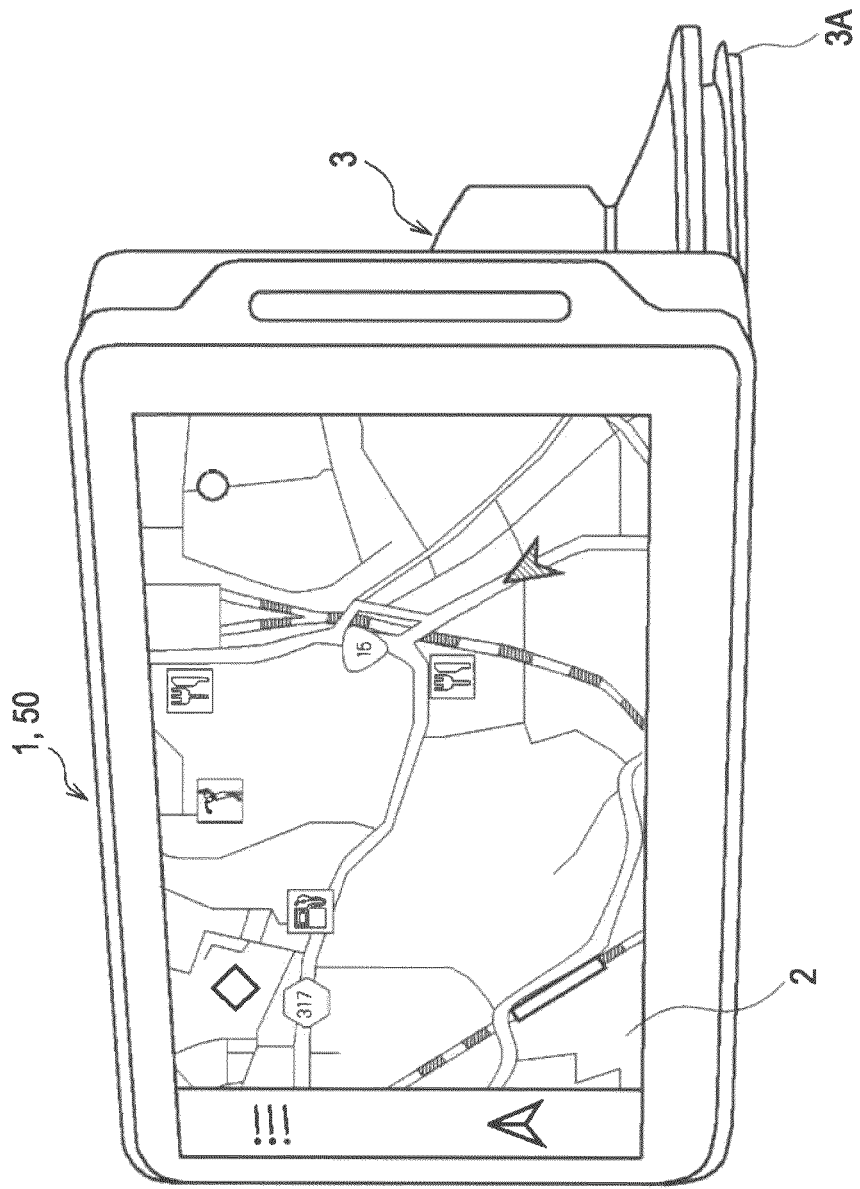
FIG. 4 is a diagram illustrating the overall structure of a PND.

Referring to FIG. 4, a PND 1 has a display 2 on a front surface thereof. The display 2 can display a map image corresponding to map data stored in, for example, a nonvolatile memory (not shown) of the PND 1.

The PND 1 is supported by and is mechanically and electrically connected to a cradle 3 that is attached to a dashboard of a vehicle with a suction cup 3A.

Thus, the PND 1 operates using electric power supplied by a battery of the vehicle through the cradle 3. When the PND 1 is detached from the cradle 3, the PND 1 operates using electric power supplied by an internal battery.

Figure 5:
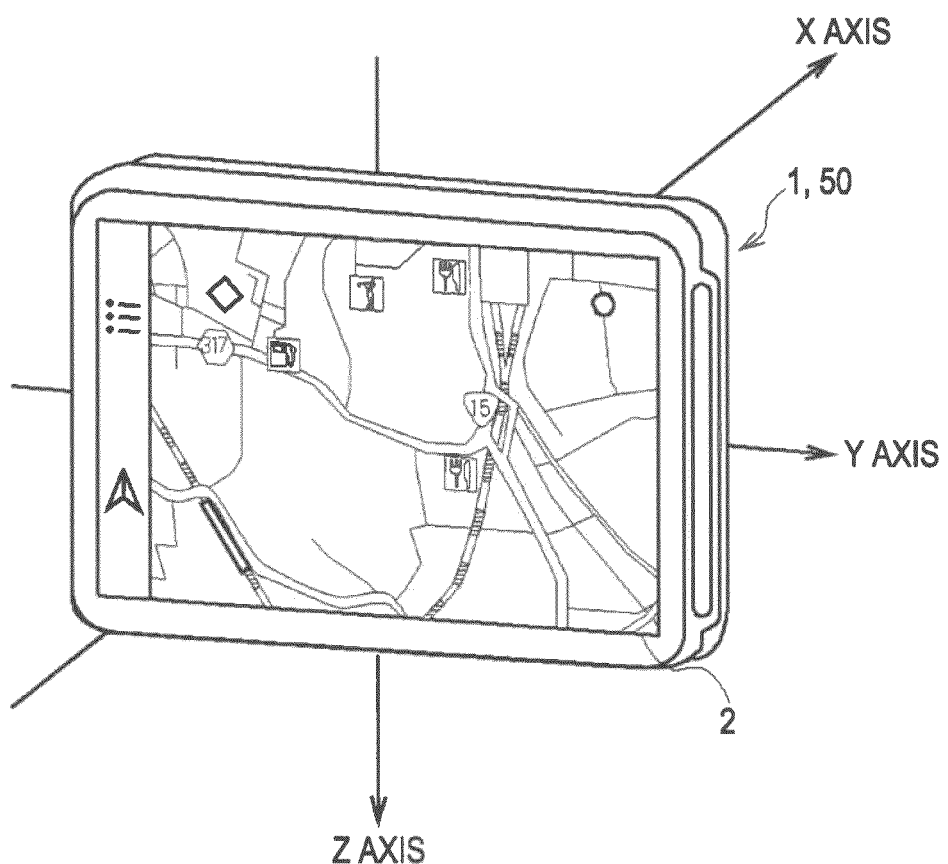
FIG. 5 is a diagram illustrating the definition of the coordinate system associated with the PND.

The PND 1 is disposed so that the display 2 extends perpendicular to the direction of travel of the vehicle. FIG. 5 illustrates the coordinate system associated with the PND 1. The X axis extends in the front-back direction of the vehicle, the Y axis extends in a horizontal direction perpendicular to the X axis, and the Z axis extends in the vertical direction.

In the coordinate system, the direction of travel of the vehicle is defined as the positive direction along the X axis, the direction to the right is defined as the positive direction along the Y axis, and the direction downward is defined as the positive direction along the Z axis.

1-2-2. Sensor Structure of PND

Figure 6:
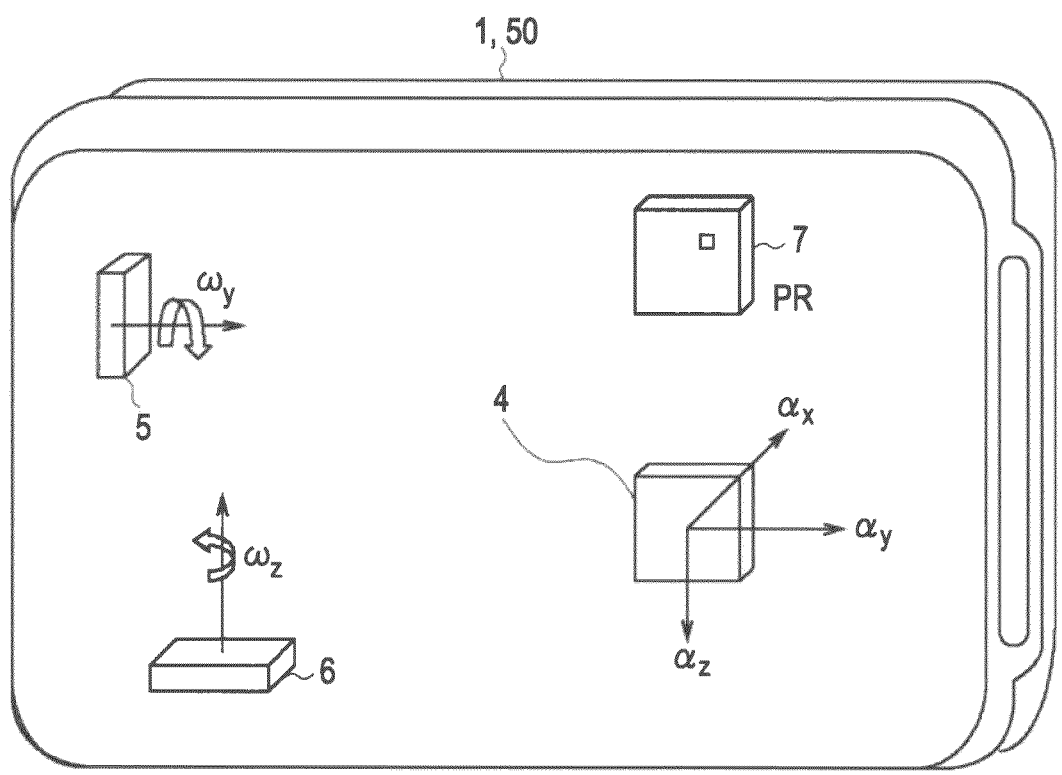
FIG. 6 is a diagram illustrating sensors included in the PND.

Referring to FIG. 6, the PND 1 includes a three-axis acceleration sensor 4, a Y axis gyro sensor 5, a Z axis gyro sensor 6, and a barometric pressure sensor 7.

The three-axis acceleration sensor 4 detects an acceleration $\alpha_x$ along the X-axis, an acceleration $\alpha_y$ along the Y-axis, and the acceleration $\alpha_z$ along the Z-axis respectively as voltages.

The Y axis gyro sensor 5, the Z axis gyro sensor 6, and the barometric pressure sensor 7 respectively detect the pitch rate $\omega_y$ around the Y axis, the yaw rate $\omega_z$ the around the Z axis, and an ambient pressure PR respectively as voltages.

1-2-3. Circuit Structure of PND

Figure 7:
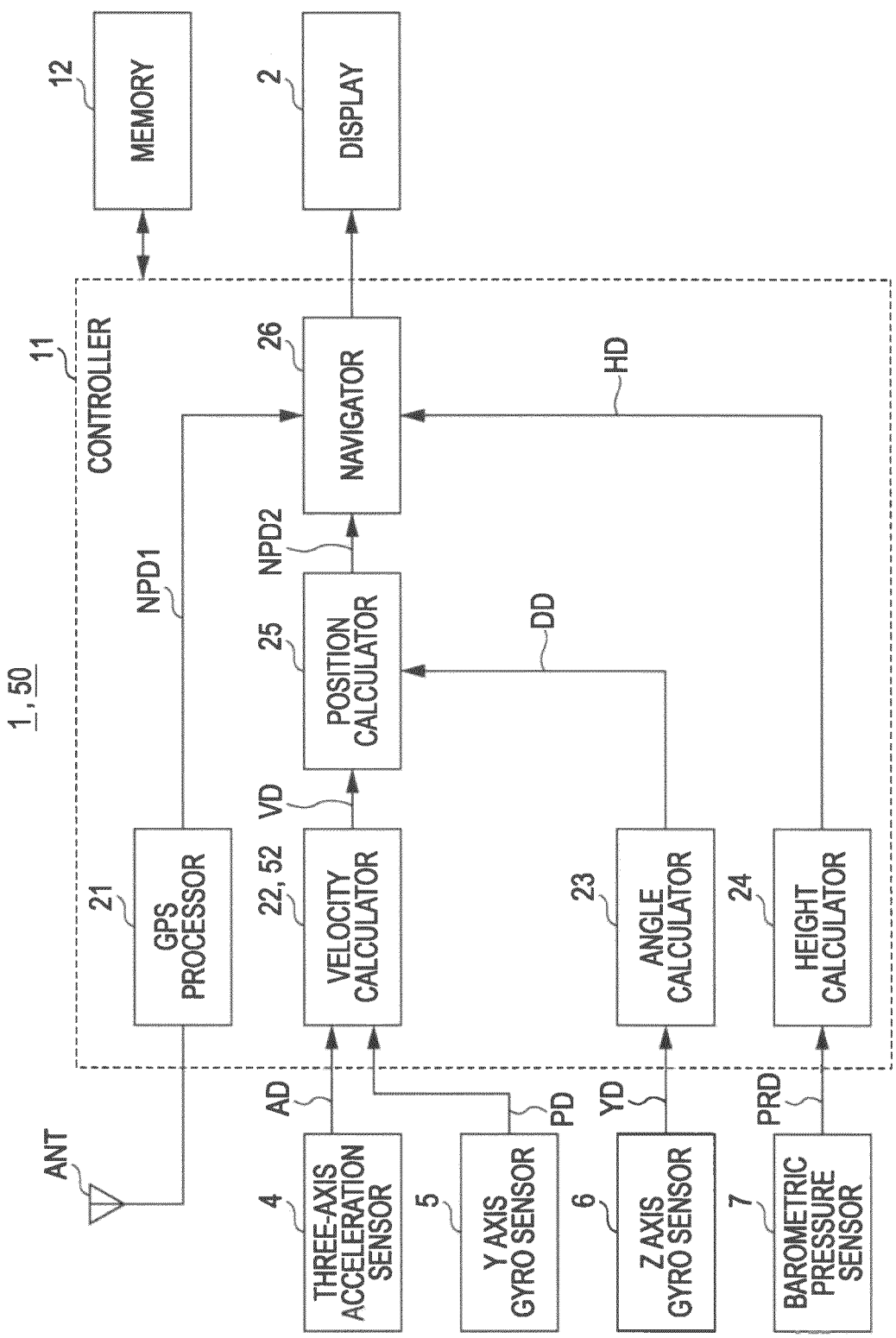
FIG. 7 is a block diagram illustrating of the circuit structure of the PND.

Referring to FIG. 7, a controller 11 of the PND 1, which is a central processing unit (CPU), controls the PND 1 in accordance with an operating system that is read from a memory 12 that includes a nonvolatile memory.

In the PND 1, the controller 11 performs velocity calculation and other processes described below in accordance with various application programs that are read from the memory 12.

In order to perform the velocity calculation and other processes, the controller 11 includes, as functional blocks, a GPS processor 21, a velocity calculator 22, an angle calculator 23, a height calculator 24, a position calculator 25, and a navigator 26.

A GPS antenna ANT of the PND 1 receives GPS signals from GPS satellites, and the GPS signals are sent to the GPS processor 21 of the controller 11.

The GPS processor 21 obtains present position data NPD1 by accurately measuring the present position of the vehicle on the basis of orbit data obtained by demodulating the GPS signals and data on the distances between the GPS satellites and the vehicle, and sends the present position data NPD1 to the navigator 26.

The navigator 26 reads map data of a region including the present position of the vehicle from the memory 12 on the basis of the present position data NPD1, and generates a map image including the present position, outputs the map image to the display 2, and thereby displays the map image.

The three-axis acceleration sensor 4 detects the accelerations $\alpha_x$, $\alpha_y$, and $\alpha_z$ with a sampling frequency of, for example, 50 Hz, and sends acceleration data AD that represents the acceleration $\alpha_z$ to the velocity calculator 22 of the controller 11.

The Y axis gyro sensor 5 detects the pitch rate $\omega_y$ with a sampling frequency of, for example, 50 Hz, and sends pitch rate data PD that represents the pitch rate $\omega_y$ to the velocity calculator 22 of the controller 11.

The velocity calculator 22 calculates the velocity V 50 times per second in accordance with equation (1) using the acceleration $\alpha_z$, which corresponds to the acceleration data AD supplied by the three-axis acceleration sensor 4, and the pitch rate $\omega_y$, which corresponds to the pitch rate data PD supplied by the Y axis gyro sensor 5, and sends velocity data VD that represents the velocity V to the position calculator 25.

The Z axis gyro sensor 6 detects the yaw rate $\omega_z$ at a sampling frequency of, for example, 50 Hz, and sends yaw rate data YD that represents the yaw rate $\omega_z$ to the angle calculator 23 of the controller 11.

The angle calculator 23 calculates the angle θ with which the vehicle turns to the right or to the left by multiplying the yaw rate $\omega_z$, which corresponds to the yaw rate data YD supplied by the Z axis gyro sensor 6, by a sampling period (in this case, 0.02 s), and sends angle data DD that represents the angle θ to the position calculator 25.

The position calculator 25 calculates the displacement from the previous position P0 to the present position P1 illustrated in FIG. 3 on the basis of the velocity V, which corresponds to the velocity data VD supplied by the velocity calculator 22, and the angle θ, which corresponds to the angle data DD supplied by the angle calculator 23. The position calculator 25 calculates the present position P1 by adding the displacement to the previous position P0, and sends present position data NPD2, which represents the present position P1, to the navigator 26.

The barometric pressure sensor 7 detects the ambient pressure PR with a sampling frequency of, for example, 50 Hz, and sends barometric pressure data PRD that represents the barometric pressure PR to the height calculator 24.

The height calculator 24 calculates the height of the vehicle on the basis of the barometric pressure PR, which corresponds to the barometric pressure data PRD supplied by the barometric pressure sensor 7, and sends height data HD that represents the height of the vehicle to the navigator 26.

The navigator 26 reads map data of a region including the present position of the vehicle from the memory 12 on the basis of the present position data NPD2 supplied by the position calculator 25 and the height data HD supplied by the height calculator 24, generates a map image including the present position, outputs the map image to the display 2, and thereby displays the map image.

1-3. Velocity Calculation Process

Next, a velocity calculation process performed by the velocity calculator 22 will be described in detail. In this process, the velocity calculator 22 calculates the velocity V on the basis of the acceleration $\alpha_z$, which corresponds to the acceleration data AD supplied by the three-axis acceleration sensor 4, and the pitch rate $\omega_y$, which corresponds to the pitch rate data PD supplied by the Y axis gyro sensor 5.

Figure 8:
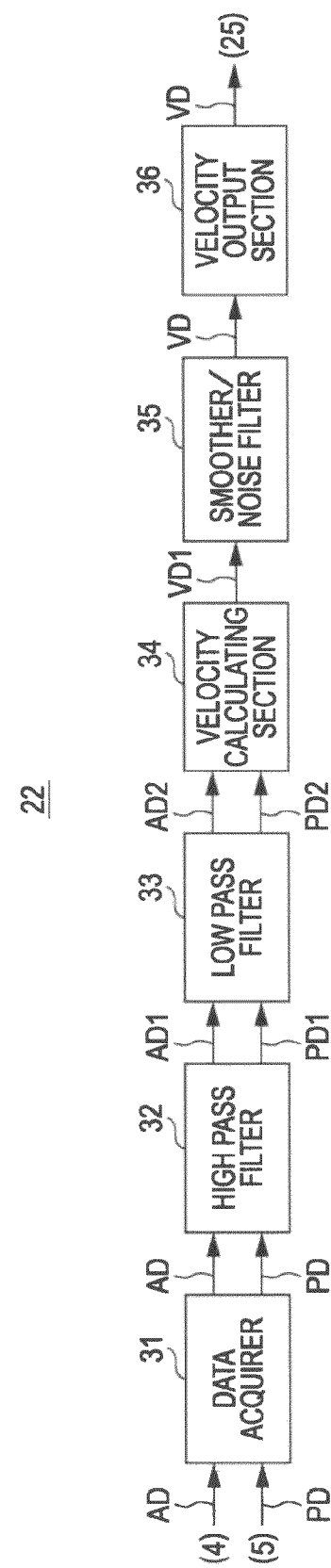
FIG. 8 is a block diagram illustrating the structure of a velocity calculator.

Referring to FIG. 8, in order to perform the velocity calculation, the velocity calculator 22 includes, as functional blocks, a data acquirer 31, a high pass filter 32, a low pass filter 33, a velocity calculating section 34, a smoother/noise filter 35, and a velocity output section 36.

The data acquirer 31 of the velocity calculator 22 acquires the acceleration data AD supplied by the three-axis acceleration sensor 4 and the pitch rate data PD supplied by the Y axis gyro sensor 5, and sends the acceleration data AD and the pitch rate data PD to the high pass filter 32.

The high pass filter 32 removes direct-current components from the acceleration data AD and the pitch rate data PD, which are supplied by the data acquirer 31, to generate acceleration data AD1 and pitch rate data PD1, and sends the acceleration data AD1 and the pitch rate data PD1 to the low pass filter 33.

The low pass filter 33 performs low pass filtering (described below) on the acceleration data AD1 and the pitch rate data PD1, which are supplied by the high pass filter 32, to generate acceleration data AD2 and pitch rate data PD2, and sends the acceleration data AD2 and the pitch rate data PD2 to the velocity calculating section 34.

The velocity calculating section 34 performs velocity calculation (described below) using the acceleration data AD2 and the pitch rate data PD2, which are supplied by the low pass filter 33, to generate velocity data VD1, and sends the velocity data VD1 to the smoother/noise filter 35.

The smoother/noise filter 35 performs smoothing and noise filtering (described below) on the velocity data VD1, which is supplied by the velocity calculating section 34, to generate velocity data VD, and sends the velocity data VD to the velocity output section 36.

The velocity output section 36 sends the velocity data VD, which is supplied by the smoother/noise filter 35 and represents the velocity V of the vehicle, to the position calculator 25.

Thus, the velocity calculator 22 calculates the velocity V of the vehicle on the basis of the acceleration data AD supplied by the three-axis acceleration sensor 4 and the pitch rate data PD supplied by the Y axis gyro sensor 5.

1-3-1. Low Pass Filtering

Next, low pass filtering, which is performed by the low pass filter 33 on the acceleration data AD1 and the pitch rate data PD1 supplied by the high pass filter 32, will be described in detail.

Figure 9:
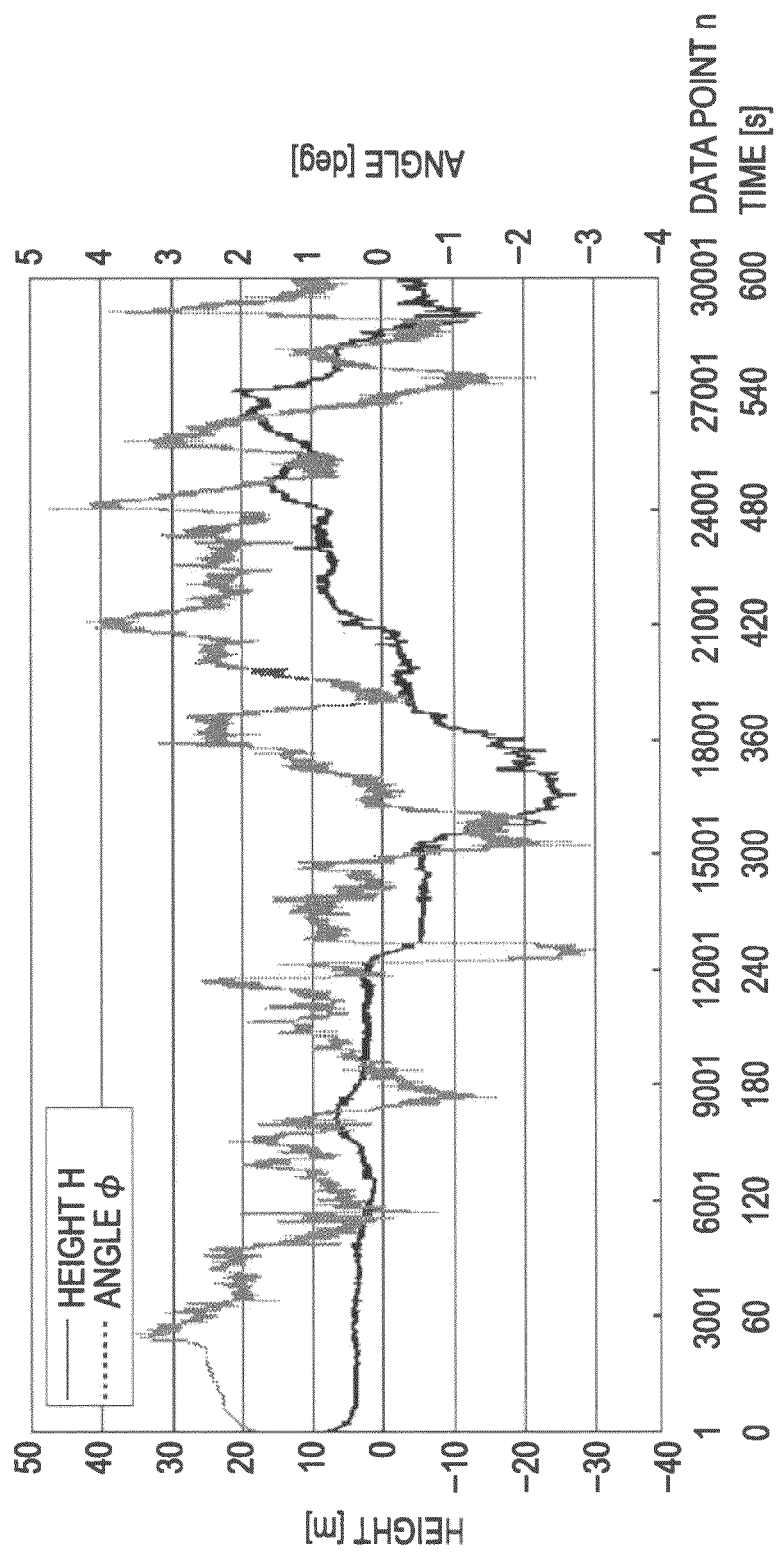
FIG. 9 is graph illustrating the relationship between a height and an angle.

FIG. 9 illustrates the relationship between a height H, which is based on the barometric pressure PR corresponding to the barometric pressure data PRD obtained by the barometric pressure sensor 7, and an angle φ around the Y axis with respect to a horizontal direction, which is based on the pitch rate $\omega_y$ corresponding to the pitch rate data PD obtained by the Y axis gyro sensor 5. Regarding the angle φ, the upward direction with respect to the direction of travel (the X axis) is defined as positive.

Referring to FIG. 9, there is a correlation between the height H and the angle φ as can be seen from the fact that when the height H sharply decreases from about the 12001st data point (240 s), i.e., when the vehicle travels downhill, the angle φ sharply decreases from about 0.5 deg to about −2.5 deg.

When the height H changes, the angle φ changes in accordance with the change in the height H. Thus, the PND 1 can detect the undulation of a road surface in the direction of travel of the vehicle using the Y axis gyro sensor 5.

FIG. 10A illustrates the angle φ of FIG. 9. FIG. 10B illustrates the angle φ of FIG. 10A from the 5001st data point to the 6001st data point. During this time, the vehicle travels at a low velocity that is lower than 20 km/h. As can be seen from FIG. 10B, the angle φ oscillates once to twice per second.

Thus, when a vehicle is traveling at a low velocity lower than 20 km/h, the PND 1 mounted on the vehicle detects the angle φ, which is based on the pitch rate $\omega_y$ corresponding to the pitch rate data PD obtained by the Y axis gyro sensor 5, as an oscillation having a frequency in the range of 1 to 2 Hz.

As with FIG. 10A, FIG. 11A illustrates the angle φ of FIG. 9. FIG. 11B illustrates the angle φ of FIG. 11A from the 22001st data point to the 23001st data point. During this time, the vehicle travels at a high velocity that is higher than 60 km/h.

As can be seen from FIG. 11B, when the vehicle is traveling at a high velocity higher than 60 km/h, the PND 1 also detects the angle φ, which is based on the pitch rate $\omega_y$ corresponding to the pitch rate data PD obtained by the Y axis gyro sensor 5, as an oscillation having a frequency in the range of 1 to 2 Hz.

Figure 12:
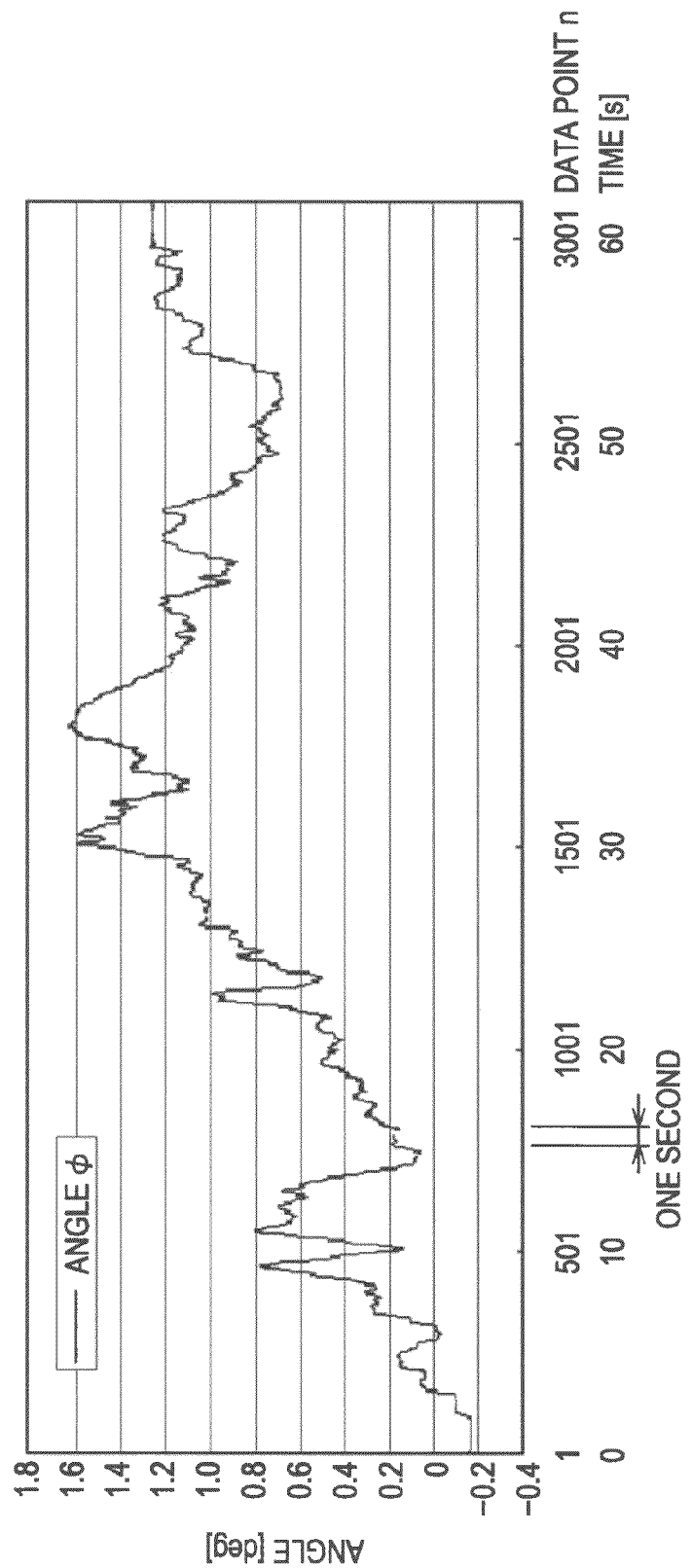
FIG. 12 is a graph illustrating the angle of a road surface when a vehicle is traveling at a very low velocity.

Moreover, as illustrated in FIG. 12, when the vehicle is traveling at a very low velocity that is lower than 10 km/h, the PND 1 also detects the angle φ, which is based on the pitch rate $\omega_y$ corresponding to the pitch rate data PD obtained by the Y axis gyro sensor 5, as an oscillation having a frequency in the range of 1 to 2 Hz.

Therefore, using the Y axis gyro sensor 5, the PND 1 detects the pitch rate $\omega_y$ as an oscillation having a frequency in the range of 1 to 2 Hz irrespective of the velocity of the vehicle.

Figure 13:
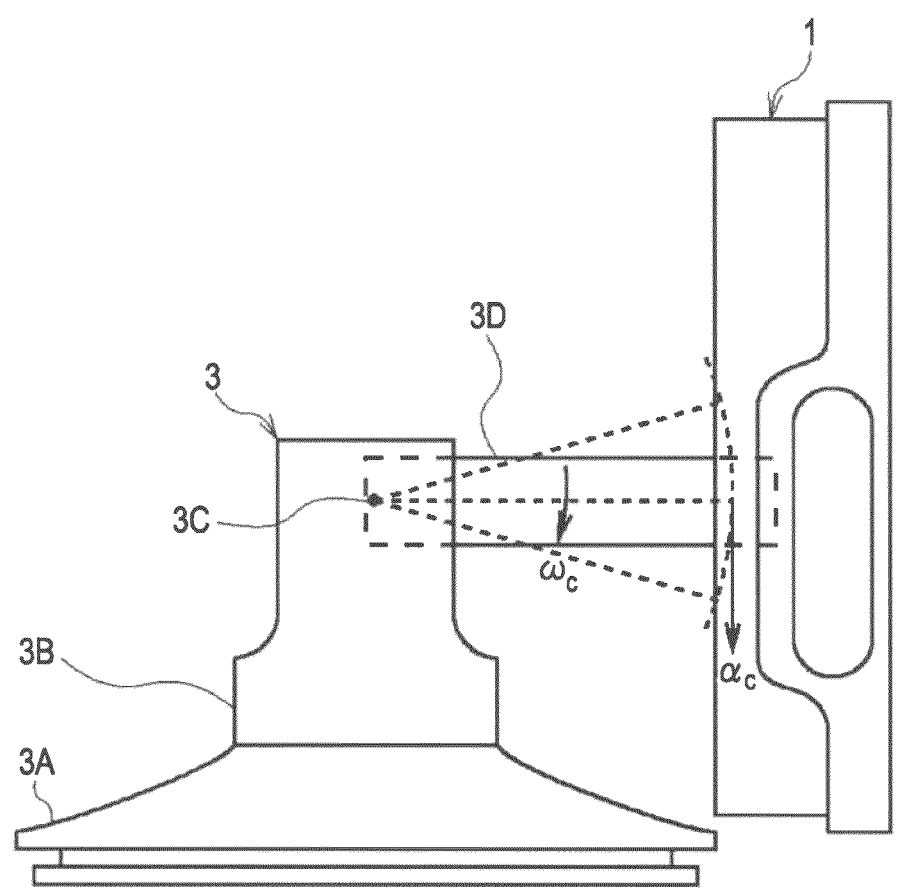
FIG. 13 is a diagram illustrating a vibration due to a cradle.

The PND 1 is supported by the cradle 3, which is attached to the dashboard of the vehicle with the suction cup 3A. Referring to FIG. 13, the cradle 3 includes a body 3B, which is disposed on the suction cup 3A, and a PND supporter 3D. One end of the PND supporter 3D is supported by the body 3B at a support point 3C that is located at a predetermined height, and the PND 1 is supported by the PND supporter 3D at the other end of the PND supporter 3D.

Therefore, when the vehicle vibrates due to the undulation of a road surface, the PND 1 vibrates up and down around the support point 3C of the PND supporter 3D with, for example, an acceleration $\alpha_c$ and an angular velocity $\omega_c$.

Therefore, in practice, the three-axis acceleration sensor 4 detects an acceleration (hereinafter referred to as a total acceleration) $\alpha_{cz}$ that is the sum of the acceleration $\alpha_z$ (FIG. 1) along the Z axis, which is generated by the vibration of the vehicle due to the undulation of the road surface, and the acceleration $\alpha_c$, which is generated by the vibration of the PND 1 around the support point 3C of the PND supporter 3D.

The Y axis gyro sensor 5 detects an angular velocity (hereinafter referred to as a total angular velocity) $\omega_{cy}$ that is the sum of the pitch rate $\omega_y$ (FIG. 1) around the Y axis, which is generated by the vibration of the vehicle due to the undulation of the road surface, and the angular velocity $\omega_c$, which is generated by the vibration of the PND 1 around the support point 3C of the PND supporter 3D.

Therefore, the low pass filter 33 acquires the acceleration data AD1, which represents the total angular velocity $\omega_{cy}$, and the pitch rate data PD1, which represents the total acceleration $\omega_{cz}$, through the data acquirer 31 and the high pass filter 32.

Figure 14:
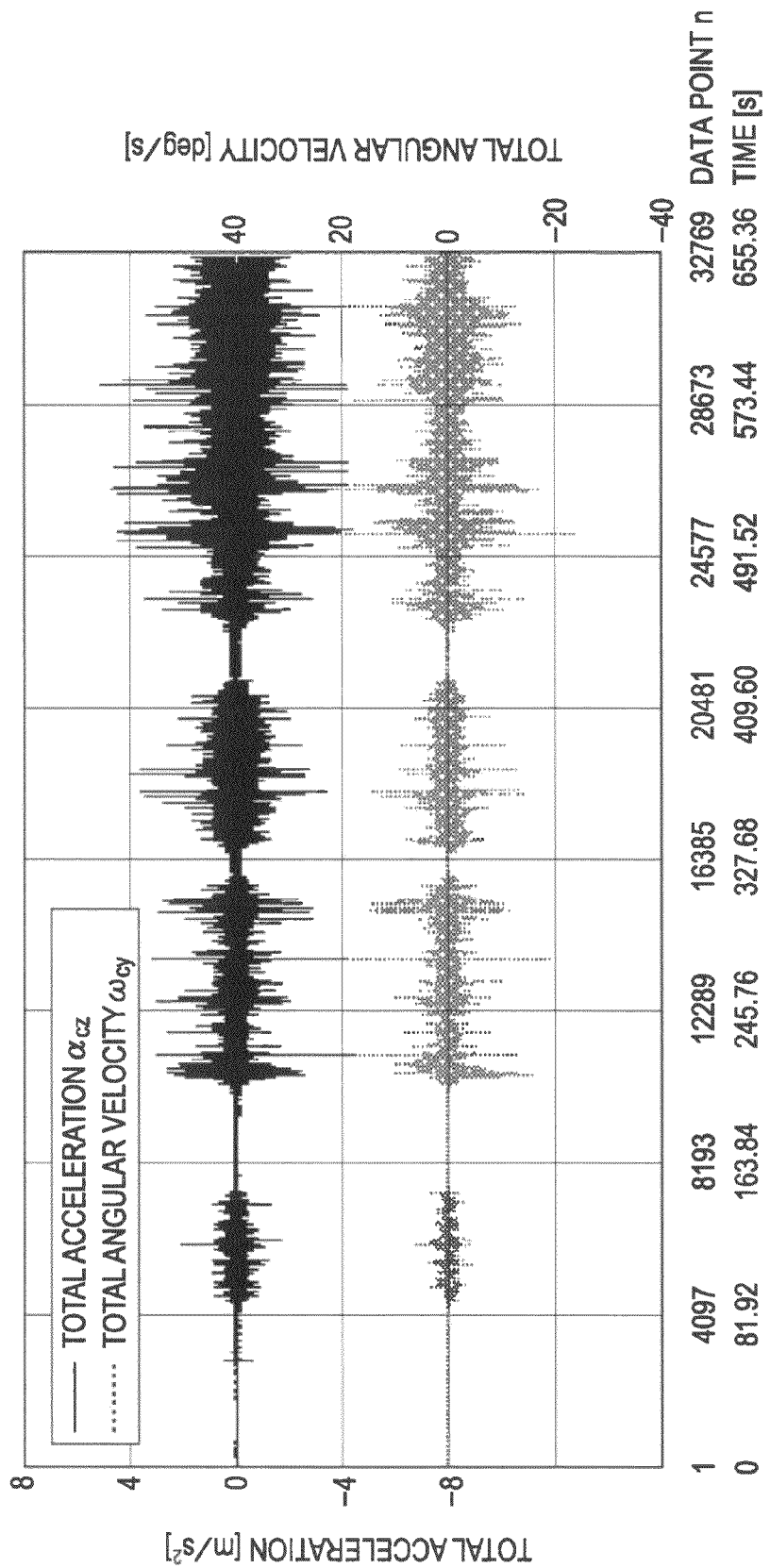
FIG. 14 is a graph illustrating a total acceleration and a total angular velocity after being high pass filtered.

FIG. 14 illustrates the total acceleration $\alpha_{cz}$ and the total angular velocity $\omega_{cy}$, which respectively correspond to the acceleration data AD1 and the pitch rate data PD1 that have been high pass filtered by the high pass filter 32. FIGS. 15A to 15F are graphs illustrating the total angular velocity $\omega_{cy}$ of FIG. 14, which has been Fourier transformed for every 4096 data points.

In particular, FIG. 15A is a graph of the total angular velocity $\omega_{cy}$ of FIG. 14 from the 1st to the 4096th data point, which has been Fourier transformed. Likewise, FIGS. 15B, 15C, and 15D are graphs of the total angular velocity $\omega_{cy}$ of FIG. 14 from the 4097th data point to the 8192nd data point, the 8193rd data point to the 12288th data point, and the 12289th data point to the 16384th data point, respectively, each of which has been Fourier transformed.

FIGS. 15E, 15F, 15G, and 15H, are graphs of the total angular velocity $\omega_{cy}$ of FIG. 14 from the 16385th data point to the 20480th data point, the 20481st data point to the 24576th data point, the 24577th data point to the 28672nd data point, and the 28673rd data point to the 32768th data point, respectively, each of which has been Fourier transformed.

As can be clearly seen from FIGS. 15C to 15H, a frequency component in the range of 1 to 2 Hz and a frequency component of about 15 Hz have large values.

That is, the Y axis gyro sensor 5 of the PND 1 detects the total angular velocity $\omega_{cy}$ that is the sum of the pitch rate $\omega_y$, which oscillates with a frequency in the range of 1 to 2 Hz due to the aforementioned undulation of the road surface, and the angular velocity $\omega_c$, which oscillates with a frequency of about 15 Hz due to the cradle 3 that supports the PND 1.

FIGS. 16A to 16F are graphs illustrating the total acceleration $\alpha_{cz}$ of FIG. 14, which has been Fourier transformed for every 4096 data points.

In particular, FIG. 16A is a graph of the total acceleration $\alpha_{cz}$ of FIG. 14 from the 1st data point to the 4096th data point, which has been Fourier transformed. Likewise, FIGS. 16B, 16C, and 16D are graphs of the total acceleration $\alpha_{cz}$ of FIG. 14 from the 4097th data point to the 8192nd data point, the 8193rd data point to the 12288th data point, and the 12289th data point to the 16384th data point, respectively, each of which has been Fourier transformed.

FIGS. 16E, 16F, 16G, and 16H, are graphs of the total acceleration $\alpha_{cz}$ of FIG. 14 from the 16385th data point to the 20480th data point, the 20481st data point to the 24576th data point, the 24577th data point to the 28672nd data point, and the 28673rd data point to the 32768th data point, respectively, each of which has been Fourier transformed.

Considering the fact that the total angular velocity $\omega_{cy}$ (FIGS. 15C to 15H) has the frequency component in the range of 1 to 2 Hz and the frequency component of about 15 Hz, it is estimated that the total acceleration $\alpha_{cz}$ also has a frequency component in the range of 1 to 2 Hz and a frequency component of about 15 Hz.

That is, the three-axis acceleration sensor 4 of the PND 1 detects the total acceleration $\alpha_{cz}$, which is the sum of the acceleration $\alpha_z$, which oscillates with a frequency in the range of 1 to 2 Hz due to the aforementioned undulation of the road surface, and the acceleration $\alpha_c$, which oscillates with a frequency of about 15 Hz due to the cradle 3 that support the PND 1.

Therefore, the low pass filter 33 performs low pass filtering on the acceleration data AD1 and the pitch rate data PD1, which are supplied by the high pass filter 32, so as to remove the frequency component of about 15 Hz, i.e., the acceleration $\alpha_c$ and the angular velocity $\omega_c$ that are generated due to the cradle 3 that supports the PND 1.

Figure 17A:
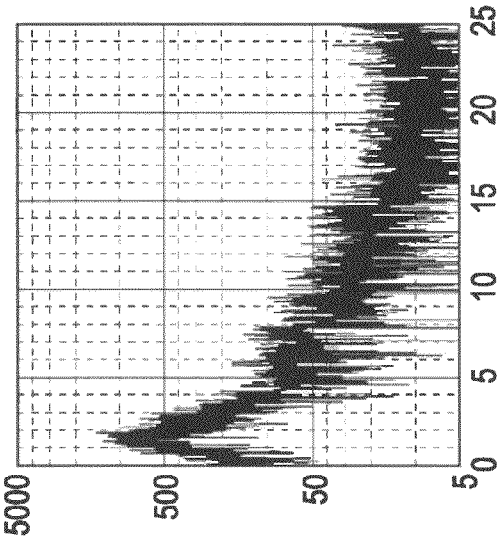
FIGS. 17A to 17D are graphs illustrating a comparison of low pass filtering performed on the total acceleration.
Figure 17B:
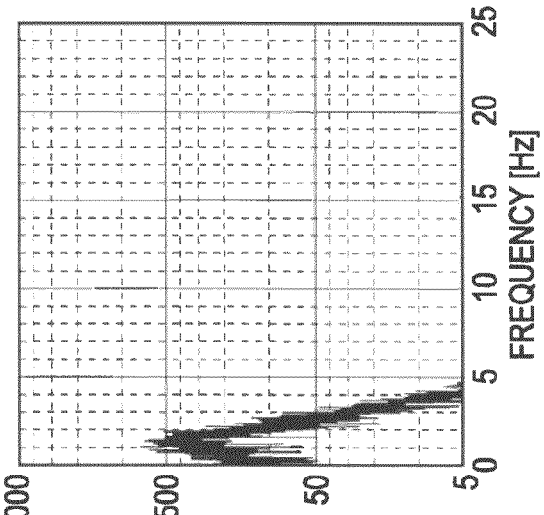
Figure 17C:
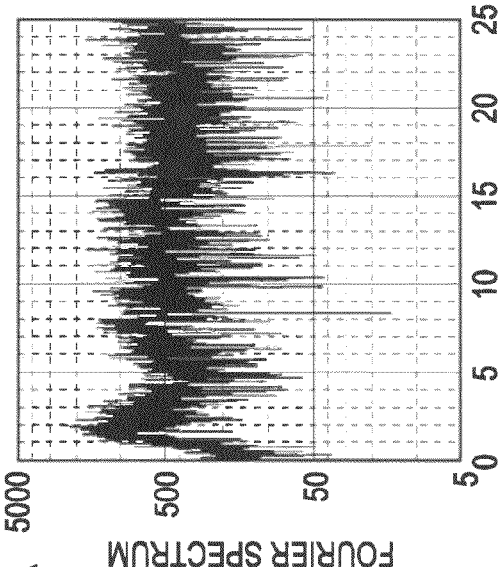
Figure 17D:
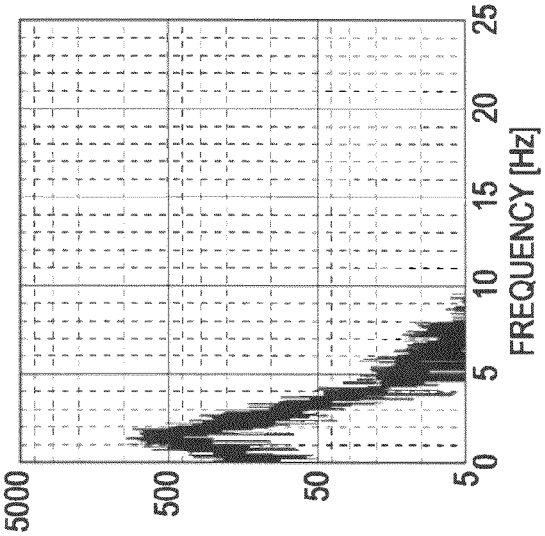

FIG. 17A is a graph of data that is the same as that of FIG. 16H, which is plotted with a logarithmic vertical axis. FIGS. 17B, 17C and 17D are graphs of the total acceleration $\alpha_{cz}$ from the 28673rd data point to the 32768th data point, on which infinite impulse response (IIR) filtering with a cutoff frequency of 2 Hz has been performed twice, four times, and six times, respectively, and on which Fourier transformation has been performed.

Figure 18A:
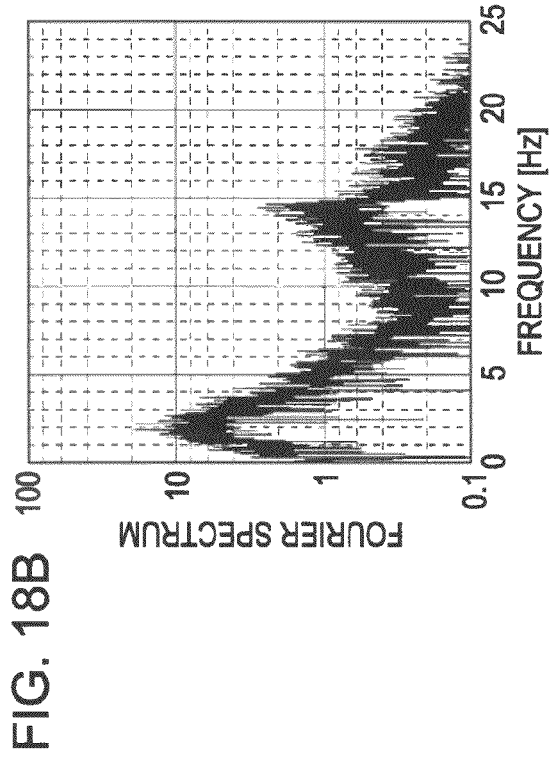
FIGS. 18A to 18D are graphs illustrating a comparison of low pass filtering performed on the total angular velocity.
Figure 18C:
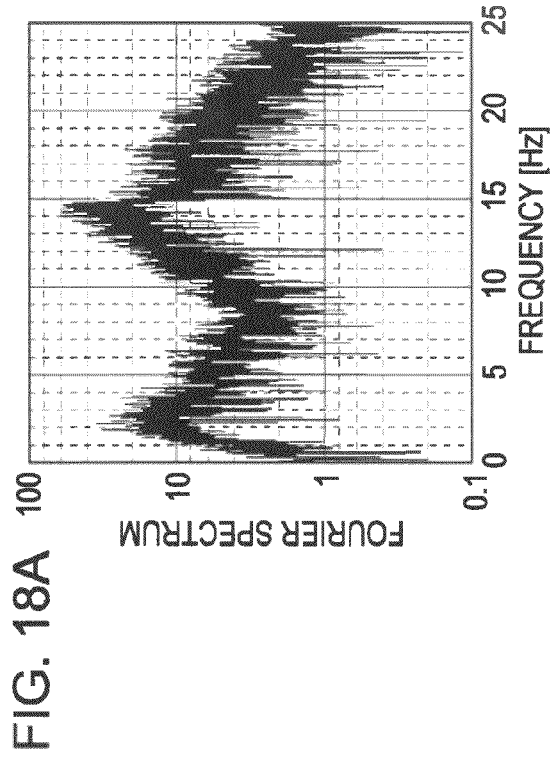
Figure 18B:
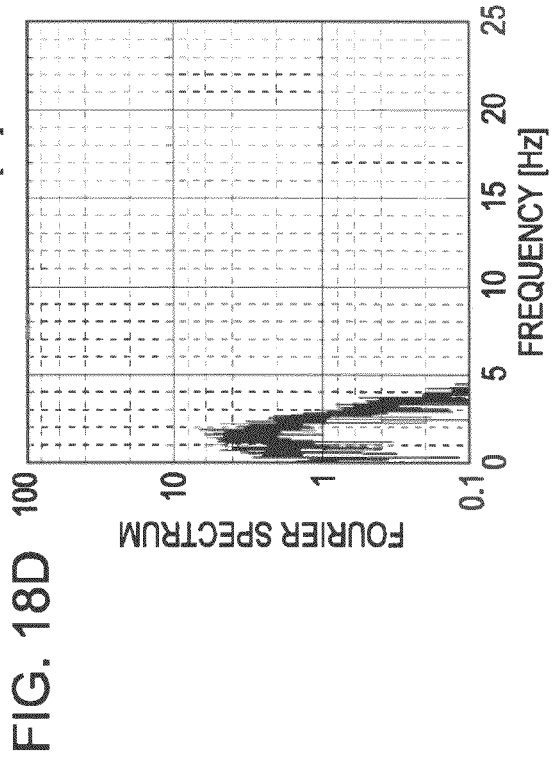
Figure 18D:
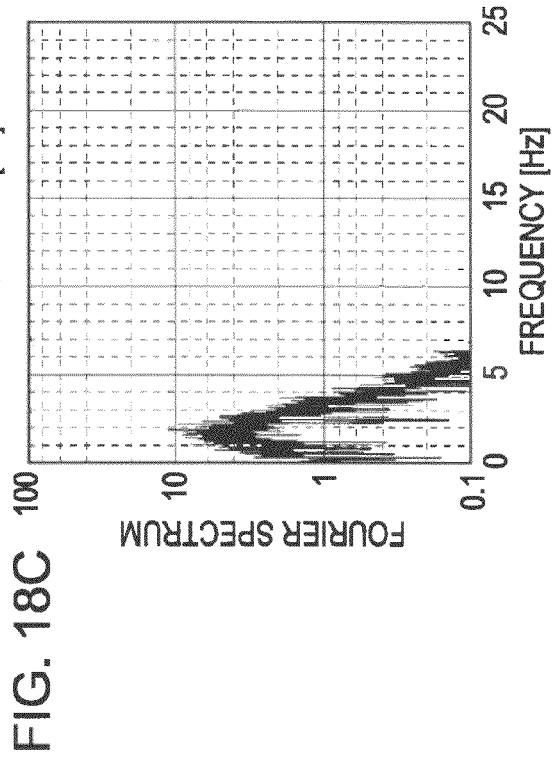

FIG. 18A is a graph of data that is the same as that of FIG. 15H, which is plotted with a logarithmic vertical axis. FIGS. 18B, 18C and 18D are graphs of the total angular velocity $\omega_{cy}$ from the 28673rd data point to the 32768th data point, on which infinite impulse response (IIR) filtering with a cutoff frequency of 2 Hz is performed twice, four times, and six times, respectively, and on which Fourier transformation is performed.

As can be seen from FIGS. 17B to 17D and FIGS. 18B to 18D, the PND 1 can remove the frequency component of about 15 Hz from the acceleration data AD1 and the pitch rate data PD1, which are supplied by the high pass filter 32, by performing the IIR filtering with a cutoff frequency of 2 Hz four times or more on the acceleration data AD1 and the pitch rate data PD1.

Therefore, the low pass filter 33 according to the embodiment performs the IIR filtering with a cutoff frequency of 2 Hz four times on the acceleration data AD1 and the pitch rate data PD1, which are supplied by the high pass filter 32, to generate an acceleration data AD2 and pitch rate data PD2, and sends the acceleration data AD2 and the pitch rate data PD2 to the velocity calculating section 34.

Thus, the low pass filter 33 removes the acceleration $\alpha_c$, which is generated due to the vibration of the PND supporter 3D around the support point 3C of the cradle 3, from the total acceleration $\alpha_{cz}$, and thereby extracts only the acceleration $\alpha_z$, which is generated due to the undulation of the road surface.

Moreover, the low pass filter 33 removes the angular velocity $\omega_c$, which is generated due to the vibration of the PND supporter 3D around the support point 3C of the cradle 3, from the total angular velocity $\omega_{cy}$, and thereby extracts only the pitch rate $\omega_y$, which is generated due to the undulation of the road surface.

1-3-2. Velocity Calculation

Next, velocity calculation performed by the velocity calculating section 34 will be described in detail. The velocity calculating section 34 calculates the velocity V on the basis of the acceleration data AD2 and the pitch rate data PD2 supplied by the low pass filter 33.

Figure 19:
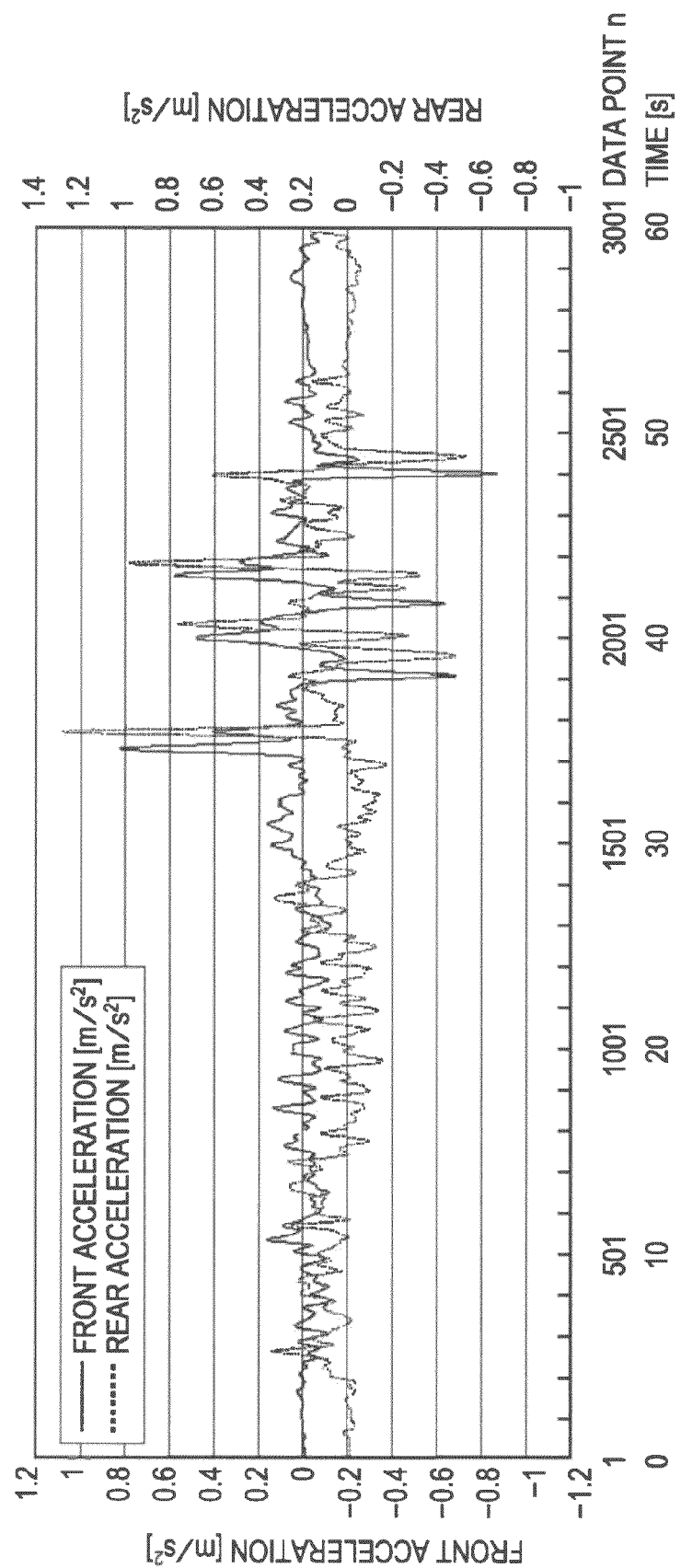
FIG. 19 is a graph illustrating the relationship between a front acceleration and a rear acceleration when the vehicle is traveling at a low velocity.
Figures 20A, 20B:
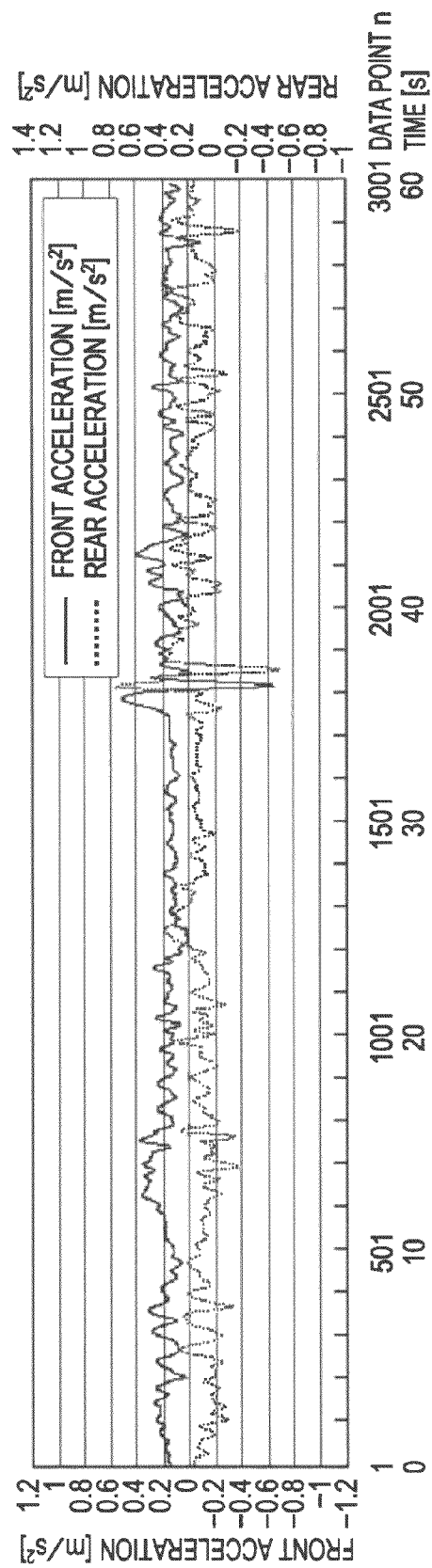
FIGS. 20A and 20B are graphs illustrating the relationship between the front acceleration and the rear acceleration when the vehicle is traveling at a medium velocity and at a high velocity.

FIGS. 19, 20A, and 20B respectively illustrate the acceleration $\alpha_z$ corresponding to the acceleration data AD2, which is generated when the vehicle is traveling at a low velocity lower than 20 km/h, at a medium velocity equal to or higher than 20 km/h and lower than 60 km/h, and at a high velocity equal to or higher than 60 km/h. For each of the velocity ranges, a case in which the PND 1 is placed on the dashboard in a front part of the vehicle and a case in which the PND 1 is placed near to the rear window in a rear part of the vehicle are illustrated.

In FIGS. 19, 20A, and 20B, the acceleration $\alpha_z$ that is detected by the PND1 placed in the front part of the vehicle is referred to as the front acceleration and the acceleration $\alpha_z$ that is detected by the PND1 placed in the rear part of the vehicle is referred to as the rear acceleration.

As can be seen from FIGS. 19, 20A, and 20B, the phase of the rear acceleration is delayed with respect to the phase of the front acceleration irrespective of the velocity of the vehicle. This phase delay is approximately equal to the wheelbase divided by the velocity of the vehicle, the wheelbase being the distance between the front wheel axis and the rear wheel axis of the vehicle.

FIGS. 21A to 21C respectively illustrate an example of a simulation result representing the relationship between the acceleration $\alpha_z$ corresponding to the acceleration data AD2 and the pitch rate $\omega_y$ corresponding to the pitch rate data PD2 when the PND 1 is placed on the dashboard (at a position away from the front wheel axis by 30% of the wheelbase), at the center, and at a position above the rear wheel axis of the vehicle. FIGS. 21D to 21F illustrate the velocity V calculated using equation (1) on the basis of the acceleration $\alpha_z$ and the pitch rate $\omega_y$ obtained from the simulation result illustrated in FIGS. 21A to 21C.

In this simulation, it is assumed that a vehicle having a wheelbase of 2.5 m travels at a velocity of 5 m/s on a road surface having a sinusoidal undulation with an amplitude of 0.1 m and a wavelength of 20 m.

As can be seen from FIGS. 21A to 21C, the phase of the acceleration $\alpha_z$ is delayed when the position of the PND 1 is moved toward the back of the vehicle. In contrast, the phase of the pitch rate $\omega_y$ is not delayed irrespective of the position of the PND 1 on the vehicle.

Therefore, as illustrated in FIG. 21B, the phase difference between the acceleration $\alpha_z$ and the pitch rate $\omega_y$ is negligible when the PND 1 is placed at the center of the vehicle. Thus, as illustrated in FIG. 21E, the velocity V, which is calculated using equation (1), is substantially constant.

However, as illustrated in FIGS. 21A and 21C, when the position of the PND 1 is moved forward or backward from the center of the vehicle, the phase difference between the acceleration $\alpha_z$ and the pitch rate $\omega_y$ increases. Therefore, as illustrated in FIGS. 21D and 21F, due to the phase difference between the acceleration $\alpha_z$ and the pitch rate $\omega_y$, the velocity V calculated using equation (1) has a larger error than the velocity V calculated when the PND 1 is placed at the center of the vehicle (FIG. 21E).

In particular, when the autonomous velocity V of the vehicle is lower than 20 km/h, the phase difference between the acceleration $\alpha_z$ and the pitch rate $\omega_y$ is large, so that the calculation error of the autonomous velocity V increases.

Figure 22:
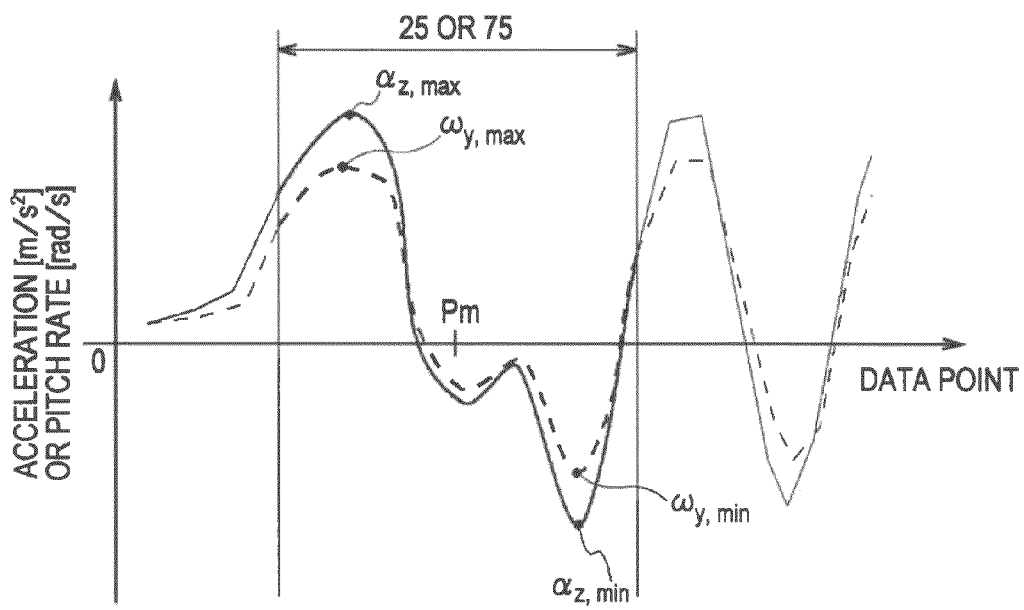
FIG. 22 is a graph illustrating the relationship between the maximum value and the minimum value.

Therefore, referring to FIG. 22, the velocity calculating section 34 extracts the maximum value and the minimum value of the acceleration $\alpha_z$, which corresponds to the acceleration data AD2 supplied by the low pass filter 33, from a range of 25 or 75 data points centered around a data point Pm that corresponds to the previous position P0 (FIG. 3). The maximum and minimum values will be referred to as the maximum acceleration $\alpha_{z,max}$ and the minimum acceleration $\alpha_{z,min}$, respectively.

Moreover, the velocity calculating section 34 extracts the maximum value and the minimum value of the pitch rate $\omega_y$, which corresponds to the pitch rate data PD2 supplied by the low pass filter 33, from a range of 25 or 75 data points centered around the data point Pm. The maximum and minimum values will be referred to as the maximum pitch rate $\omega_{y,max}$ and the minimum pitch rate $\omega_{y,min}$, respectively.

That is, the velocity calculating section 34 extracts the maximum and minimum accelerations $\alpha_{z,max}$ and $\alpha_{z,min}$ and the maximum and minimum pitch rates $\omega_{y,max}$ and $\omega_{y,min}$ from a range that is larger than the largest possible phase difference that may be generated between the acceleration $\alpha_z$ and the pitch rate $\omega_y$.

The velocity calculating section 34 calculates the velocity V in the direction of travel at the previous position P0 (FIG. 3) in accordance with the following equation (3), which is rewritten from equation (1), using the maximum and minimum accelerations $\alpha_{z,max}$ and $\alpha_{z,min}$, which are extracted from the acceleration data AD2, and the maximum and minimum pitch rates $\omega_{y,max}$ and $\omega_{y,min}$, which are extracted from pitch rate data PD2, to generate velocity data VD1, and sends the velocity data VD1 to the smoother/noise filter 35.

$$V = \frac{\alpha_{z,max} - \alpha_{z,min}}{\omega_{y,max} - \omega_{y,min}} \quad (3)$$

Thus, even when there is a phase difference between the acceleration $\alpha_z$ and the pitch rate $\omega_y$, the velocity calculating section 34 can calculate, by using equation (3), the velocity V from which the influence of the phase delay is removed.

Figure 23:
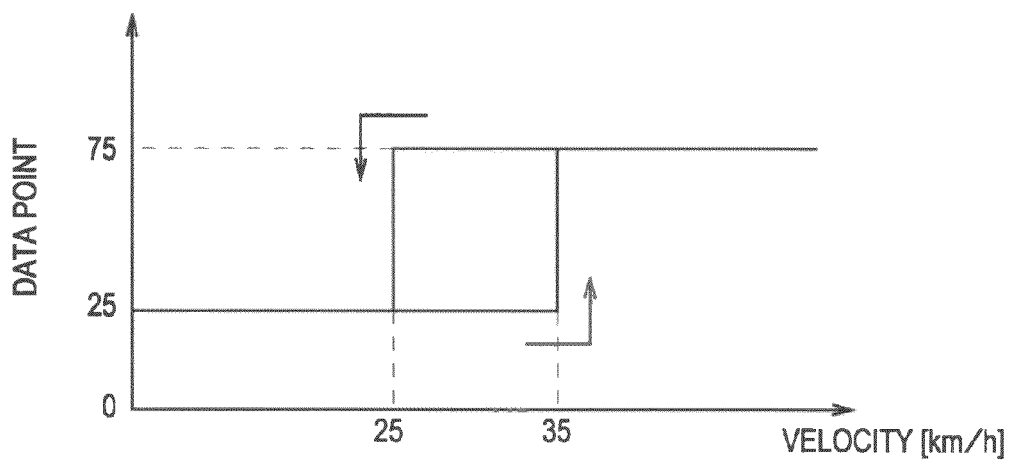
FIG. 23 is a graph illustrating the relationship between the velocity and the number of data points.

Referring to FIG. 23, when calculating the velocity V in the direction of travel at the previous position P0 while the vehicle is accelerating, the velocity calculating section 34 uses a range of 25 data points if the velocity $V_{n-1}$ at the second previous position (not shown) (hereinafter referred to as a former velocity) is in the range of 0 km/h to 35 km/h, and the velocity calculating section 34 uses a range of 75 data points if the former velocity $V_{n-1}$ is higher than 35 km/h.

When calculating the velocity V in the direction of travel at the previous position P0 while the vehicle is decelerating, the velocity calculating section 34 uses a range of 75 data points if the former velocity $V_{n-1}$ is equal to or higher than 25 km/h, and the velocity calculating section 34 uses a range of 25 data points if the former velocity $V_{n-1}$ is lower than 25 km/h.

Thus, the velocity calculating section 34 switches the data range between 25 data points and 75 data points in accordance with the velocity V when extracting the maximum and minimum accelerations $\alpha_{z,max}$ and $\alpha_{z,min}$ and the maximum and minimum pitch rates $\omega_{y,max}$ and $\omega_{y,min}$.

When the velocity V of the vehicle is equal to or lower than, for example, 25 km/h, the acceleration $\alpha_z$ and the pitch rate $\omega_y$ change sharply in response to a slight change in the road surface. Therefore, the velocity calculating section 34 uses a narrow data range in order to deal with a sharp change.

When the velocity of the vehicle is equal to or higher than 35 km/h, the influence of a suspension of the vehicle is large and the acceleration $\alpha_z$ and the pitch rate $\omega_y$ change slowly. Therefore, the velocity calculating section 34 sets a wide data range in order to deal with a slow change Thus, the velocity calculating section 34 changes the data range, from which the maximum and minimum accelerations $\alpha_{z,max}$ and $\alpha_{z,min}$ and the maximum and minimum pitch rates $\omega_{y,max}$ and $\omega_{y,min}$ are extracted, in accordance with the velocity V of the vehicle, so that the conditions of the road surface and the vehicle that change in accordance with the velocity V can be taken into account, whereby the velocity V can be calculated more precisely.

Moreover, when calculating the maximum and minimum accelerations $\alpha_{z,max}$ and $\alpha_{z,min}$ and the maximum and minimum pitch rates $\omega_{y,max}$ and $\omega_{y,min}$, the velocity calculating section 34 changes the data range with a hysteresis between the case when the vehicle is accelerating and the case when the vehicle is decelerating.

Thus, frequency of changing of the data range around a switching velocity is reduced as compared to a case in which the velocity calculating section 34 calculates the velocity V by changing the data range without a hysteresis. As a result, the velocity calculating section 34 can reduce the calculation error of the velocity V that may occur due to frequent switching of the data range, whereby the velocity V can be calculated more precisely.

1-3-3. Smoothing and Noise Filtering

Next, smoothing and noise filtering performed by the smoother/noise filter 35 on the velocity data VD1, which has been calculated by the velocity calculating section 34, will be described in detail.

The smoother/noise filter 35 performs low pass filtering, which is first-order IIR with a variable cutoff frequency, on the velocity data VD1 supplied by the velocity calculating section 34.

To be specific, when calculating the velocity V in the direction of travel at the previous position P0, the smoother/noise filter 35 determines the cutoff frequency on the basis of the former velocity $V_{n-1}$.

When the velocity of the vehicle is equal to or higher than, for example, 60 km/h, the velocity V calculated by the velocity calculating section 34 of the PND 1 includes a large amount of noise, and thereby the velocity V considerably deviates. Therefore, the smoother/noise filter 35 uses a low pass filter having a low cutoff frequency when the former velocity $V_{n-1}$ is equal to or higher than 60 km/h.

In contrast, the smoother/noise filter 35 uses a low pass filter having a high cutoff frequency when the former velocity $V_{n-1}$ is lower than 60 km/h.

When the velocity V calculated by the velocity calculating section 34 is lower than, for example, 10 km/h, the pitch rate $\omega_y$, which is the denominator of equation (1) or (3), may be small, so that the velocity V calculated using the equation (1) or (3) may become considerably higher than the real value.

Therefore, the smoother/noise filter 35 acquires the acceleration data AD2 and the pitch rate data PD2, which have been low pass filtered, from the low pass filter 33. If the pitch rate $\omega_y$ corresponding to the pitch rate data PD2 is lower than a predetermined threshold, the smoother/noise filter 35 determines that the velocity V is excessively high and sets the value of the velocity V, after being low pass filtered, at 0.

Figure 24A:
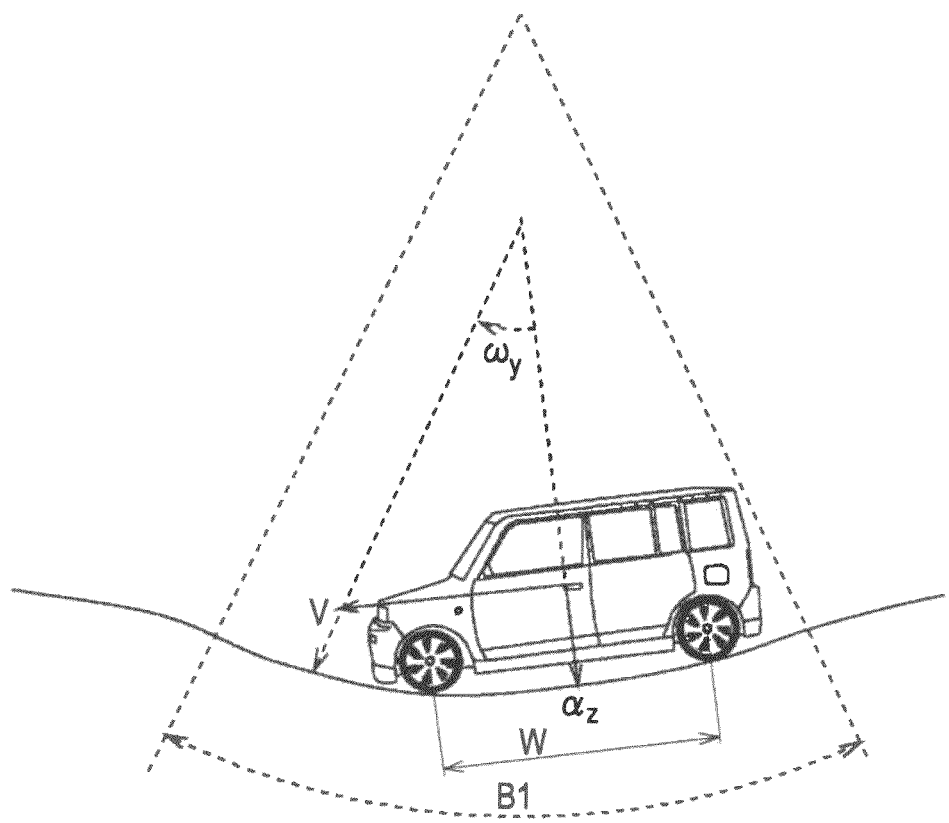
FIGS. 24A and 24B are diagrams illustrating accelerations and pitch rates for arcs having different lengths.

If an arc B1 of the undulation of a road surface is larger than the wheelbase W of the vehicle as illustrated in FIG. 24A, the PND 1 can accurately calculate the velocity V using the aforementioned fundamental principle.

Figure 24B:
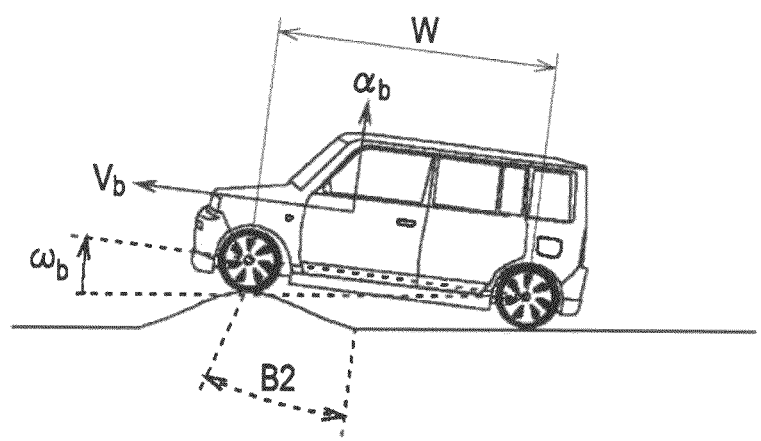

However, if an arc B2 of the undulation of a road surface is smaller than the wheelbase W of the vehicle as illustrated in FIG. 24B, an acceleration $\alpha_b$ in a vertical direction of the vehicle and an angular velocity $\omega_b$ around the Y axis centered around the rear wheel of the vehicle are generated when the front wheel of the vehicle rolls over the undulation.

At this time, the three-axis acceleration sensor 4 and the Y axis gyro sensor 5 of the PND 1 detect the acceleration $\alpha_b$ and the angular velocity $\omega_b$ (FIG. 24B), instead of detecting the acceleration $\alpha_z$ and the pitch rate $\omega_y$ (FIG. 24A), which are generated due to a vibration having a frequency in the range of 1 to 2 Hz due to the undulation of the road surface.

The acceleration $\alpha_b$ is larger than the acceleration $\alpha_z$, which is generated when the arc B1 of the undulation of the road surface is larger than the wheelbase W of the vehicle.

The angular velocity $\omega_b$ is higher than the pitch rate $\omega_y$, which is generated when the arc B1 of the undulation of the road surface is larger than the wheelbase W of the vehicle.

A velocity $V_b$ (hereinafter also referred to as a small-arc velocity) is calculated using equation (1) or (3) on the basis of the acceleration $\alpha_b$ and the angular velocity $\omega_b$, which are generated when the arc B2 of the undulation of the road surface is smaller than the wheelbase W of the vehicle.

Because the acceleration $\alpha_b$ changes more than the angular velocity $\omega_b$, the velocity $V_b$ is considerably higher than the velocity V, which is calculated using equation (1) or (3) on the basis of the acceleration $\alpha_z$ and the angular velocity $\omega_y$, generated when the arc B1 of the undulation of the road surface is larger than the wheelbase W of the vehicle.

Therefore, when the arc B2 of the undulation of the road surface is smaller than the wheelbase W of the vehicle, the velocity calculator 22 of the PND 1 calculates the small-arc velocity $V_b$ on the basis of the acceleration $\alpha_b$ and the angular velocity $\omega_b$, which leads to calculating the velocity V as an excessively high value.

The smoother/noise filter 35 acquires, from the low pass filter 33, the acceleration data AD2 and the pitch rate data PD2, which have been low pass filtered, and determines whether or not the acceleration $\alpha_z$ corresponding to the acceleration data AD2 and pitch rate $\omega_y$ corresponding to the pitch rate data PD2 are higher than predetermined thresholds.

If the acceleration $\alpha_z$ corresponding to the acceleration data AD2 and the pitch rate $\omega_y$ corresponding to the pitch rate data PD2 are higher than the predetermined thresholds, the smoother/noise filter 35 determines that the velocity V is excessively high and uses the former velocity $V_{n-1}$ instead of the velocity V that has been low pass filtered. That is, the smoother/noise filter 35 uses the former velocity $V_{n-1}$ if the velocity V is excessively high when the velocity of the vehicle is not very low, because it is likely that the velocity V is not accurate in such a case.

Thus, if the velocity V that has been low pass filtered is excessively high, the smoother/noise filter 35 sets the velocity V at 0 when the velocity of the vehicle is very low and sets the velocity V at the former velocity $V_{n-1}$ when the velocity of the vehicle is not very low, whereby the velocity V can be calculated more accurately.

1-4. Process of Position Calculation Using Velocity Calculation

Figure 25:
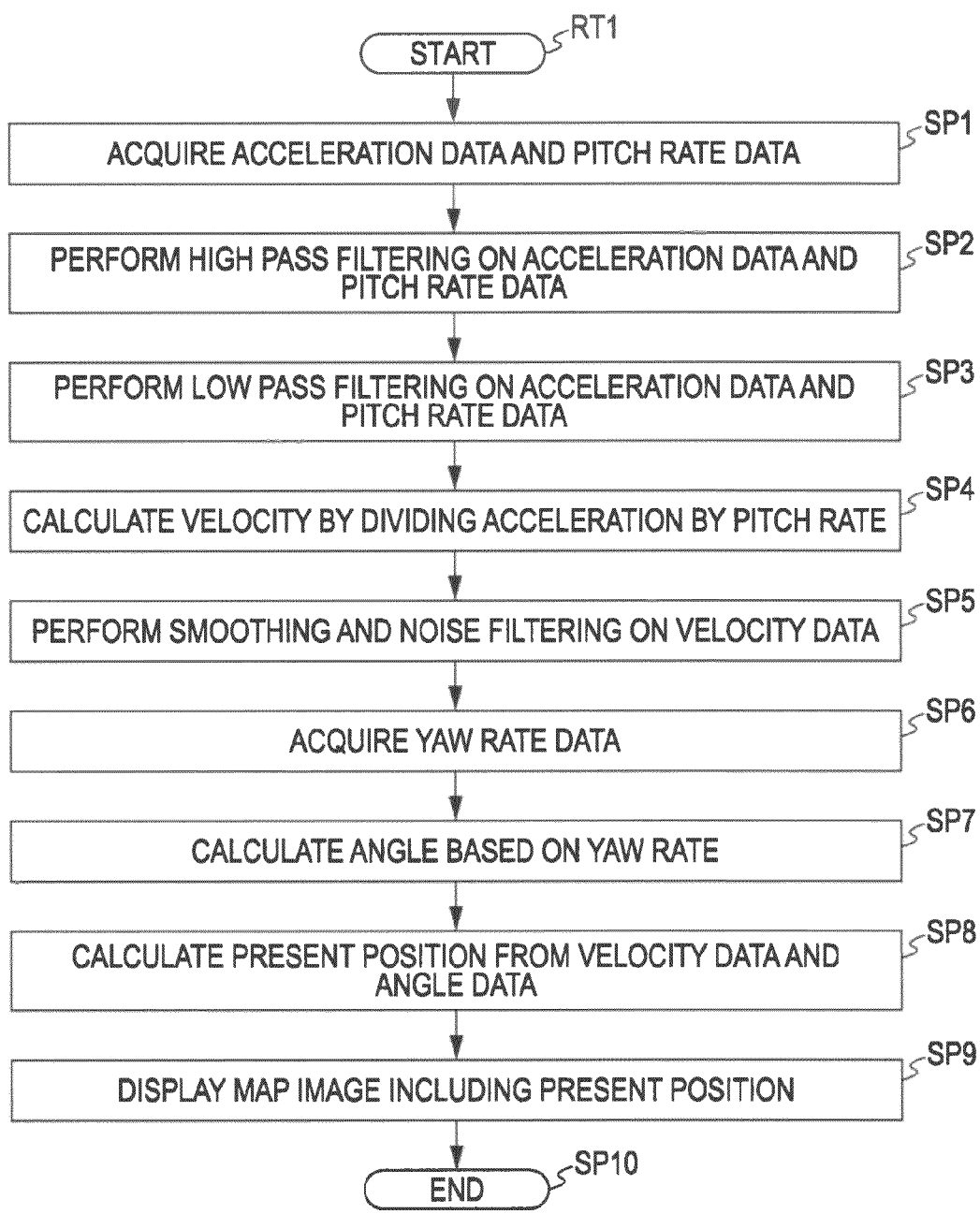
FIG. 25 is a flowchart illustrating a process of calculating the present position using velocity calculation.

Referring to the flowchart of FIG. 25, a process of position calculation using the aforementioned velocity calculation, which is performed by the controller 11 of the PND 1, will be described.

The controller 11 starts the process from a start step of a routine RT1. In step SP1, the data acquirer 31 of the velocity calculator 22 acquires the acceleration data AD detected by the three-axis acceleration sensor 4 and the pitch rate data PD detected by the Y axis gyro sensor 5, and the controller 11 proceeds to step SP2.

In step SP2, the high pass filter 32 of the velocity calculator 22 of the controller 11 performs high pass filtering on the acceleration data AD and the pitch rate data PD, and the controller 11 proceeds to step SP3.

In step SP3, the low pass filter 33 of the velocity calculator 22 of the controller 11 performs low pass filtering, which is fourth-order IIR filtering with a cutoff frequency of, for example, 1 Hz, on the acceleration data AD1 and the pitch rate data PD1, which have been high pass filtered, and the controller 11 proceeds to step SP4.

In step SP4, the velocity calculating section 34 of the velocity calculator 22 of the controller 11 calculates the velocity V using equation (3) on the basis of the acceleration $\alpha_z$ corresponding to the acceleration data AD2 and the pitch rate $\omega_y$ corresponding to the pitch rate data PD2, which have been low pass filtered, and the controller 11 proceeds to step SP5.

In step SP5, the controller 11 performs smoothing and noise filtering on the velocity data VD representing the velocity V, which has been calculated in step SP4.

To be specific, the controller 11 performs low pass filtering having a variable cutoff frequency on the velocity data VD1 representing the velocity V, which has been calculated in step SP4.

If the controller 11 determines that the velocity V that has been low pass filtered is excessively high, the controller 11 sets the velocity V at 0 when the velocity of the vehicle is lower than, for example, 10 km/h and sets the velocity V at the former velocity $V_{n-1}$ when the velocity of the vehicle is equal to or higher than 10 km/h, and the controller 11 proceeds to step SP6.

In step SP6, the angle calculator 23 of the controller 11 acquires the yaw rate data YD detected by the Z axis gyro sensor 6, and the controller 11 proceeds to step SP7.

In step SP7, the angle calculator 23 of the controller 11 calculates the angle data DD representing the angle θ by multiplying the yaw rate $\omega_z$ corresponding to the yaw rate data YD by the sampling period 0.02 s, and the controller 11 proceeds to step SP8.

In step SP8, the controller 11 calculates the present position data NPD2 on the basis of the velocity data VD, on which smoothing and noise filtering have been performed in step SP5, and the angle data DD, which has been calculated in step SP7, and the controller 11 proceeds to step SP9.

In step SP9, the controller 11 reads from the memory 12 a map data including the present position of the vehicle on the basis of the present position data NPD2 supplied by the position calculator 25, generates a map image including the present position, and outputs the map image to the display 2, and the controller 11 proceeds to step SP10 where the process finishes.

1-5. Measurement Results

Figure 36:
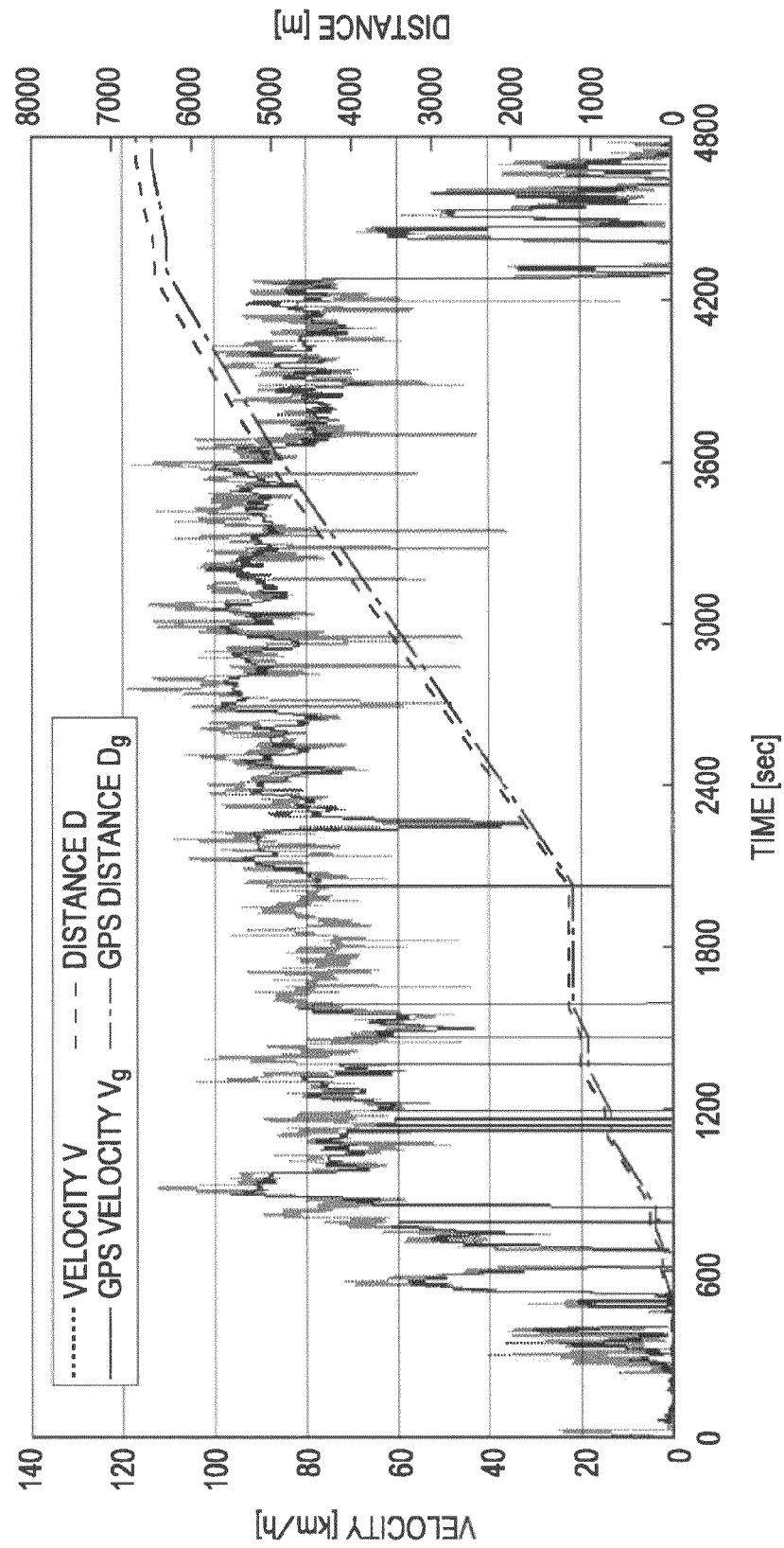
FIG. 36 is a graph illustrating a comparison between the velocity and the distance measured with a PND placed on a light car and the velocity and the distance calculated on the basis of GPS signals.
Figure 37:
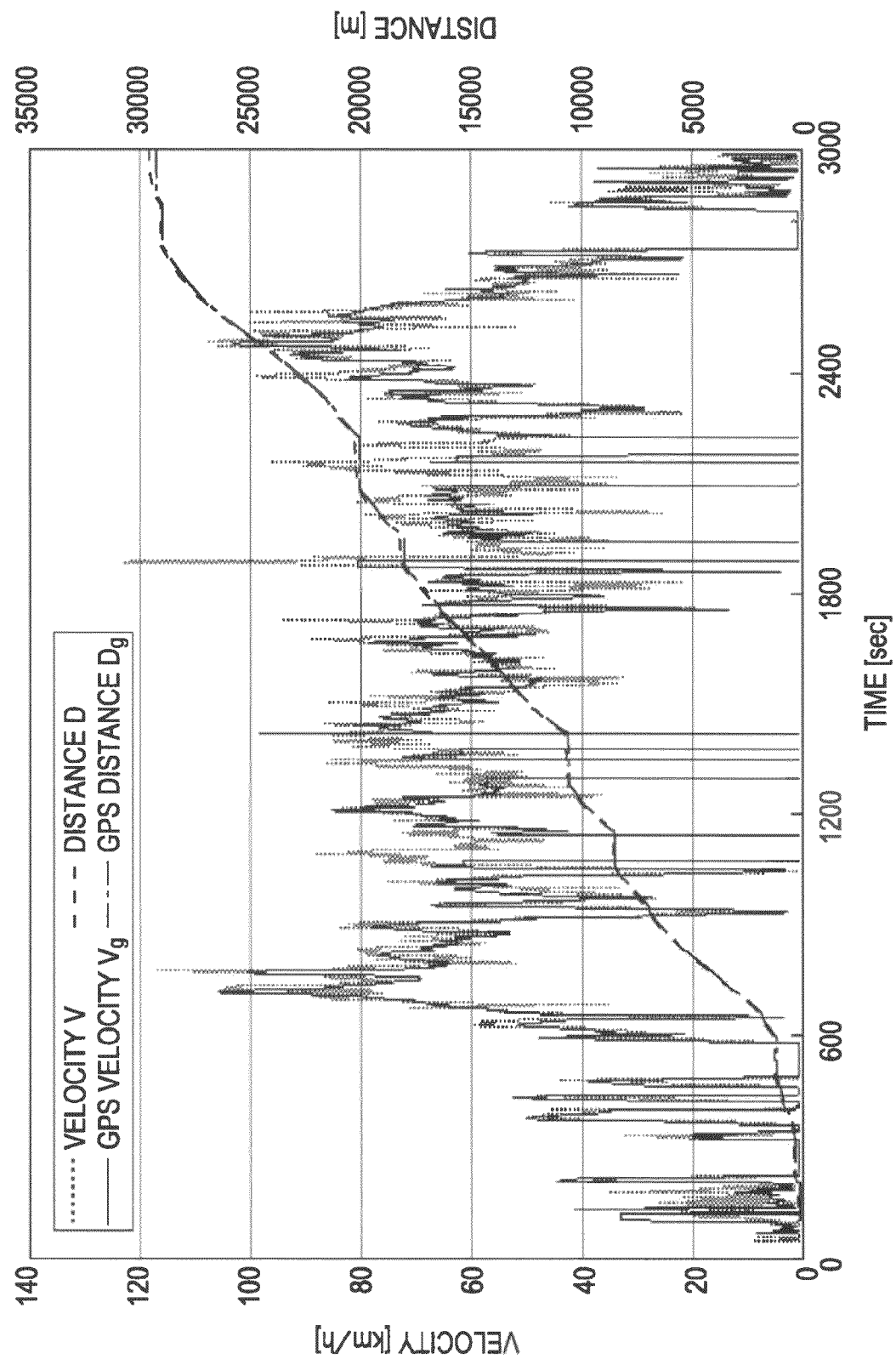
FIG. 37 is a graph illustrating a comparison between the velocity and the distance measured with a PND placed on a minivan and the velocity and the distance calculated on the basis of GPS signals.

FIGS. 26 to 37 illustrate measurement results obtained by the aforementioned velocity calculation. FIGS. 26 to 35 illustrate measurement results when the PND 1 is placed on a sedan. FIGS. 36 and 37 illustrate measurement results when the PND 1 is placed on a light car and a minivan, respectively.

FIG. 26A illustrates the acceleration $\alpha_z$ corresponding to the acceleration data AD detected by the three-axis acceleration sensor 4 and the pitch rate $\omega_y$ corresponding to the pitch rate data PD detected by the Y axis gyro sensor 5. FIG. 26B illustrates the velocity V calculated using the acceleration $\alpha_z$ and the pitch rate $\omega_y$ using equation (3).

As can be seen from FIGS. 26A and 26B, the acceleration $\alpha_z$ measured by the PND 1 increases when velocity V of the vehicle increases, while the pitch rate $\omega_y$ measured by the PND 1 remains substantially constant.

FIGS. 27A, 28A, 29A, 30A, and 31A are graphs illustrating the velocity V, which is calculated by the PND 1 by performing velocity calculation, and the distance D, which is calculated using the velocity V. FIGS. 27B, 28B, 29B, 30B, and 31B are graphs illustrating a reference velocity $V_{ref}$ that is calculated from the speed pulse of the vehicle on which the PND 1 is mounted and a reference distance $D_{ref}$ calculated using the reference velocity $V_{ref}$. FIGS. 27A to 31B illustrate cases when the vehicle on which the PND 1 is placed travels on different roads.

The velocity calculated from the speed pulse of the vehicle will be referred to as a reference velocity, and the distance calculated using the reference velocity will be referred to as a reference distance.

Figure 27A:
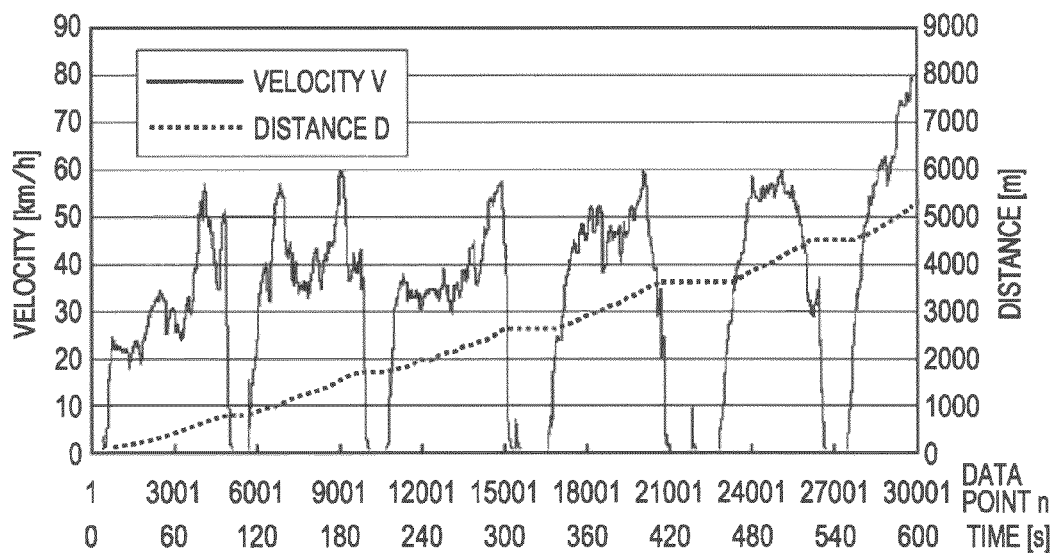
FIGS. 27A and 27B are graphs illustrating a first comparison between the measurement results and references.
Figure 27B:
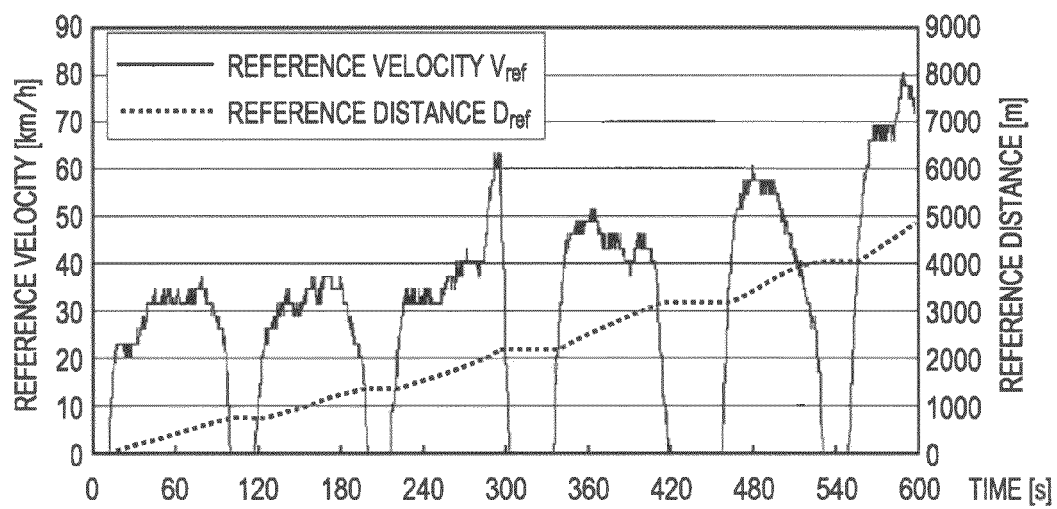

FIG. 27A illustrates the velocity V, which is calculated using the velocity calculation according to the embodiment, and the distance D calculated using the velocity V. FIG. 27B illustrates the reference velocity $V_{ref}$ and the reference distance $D_{ref}$, which are to be compared with the velocity V and the distance D illustrated in FIG. 27A.

As illustrated in FIGS. 27A and 27B, the graph of the velocity V is substantially similar to that of the reference velocity $V_{ref}$. The error between the distance D, which is calculated on the basis of the velocity V, and the reference distance $D_{ref}$ is smaller than 10%.

Figure 28A:
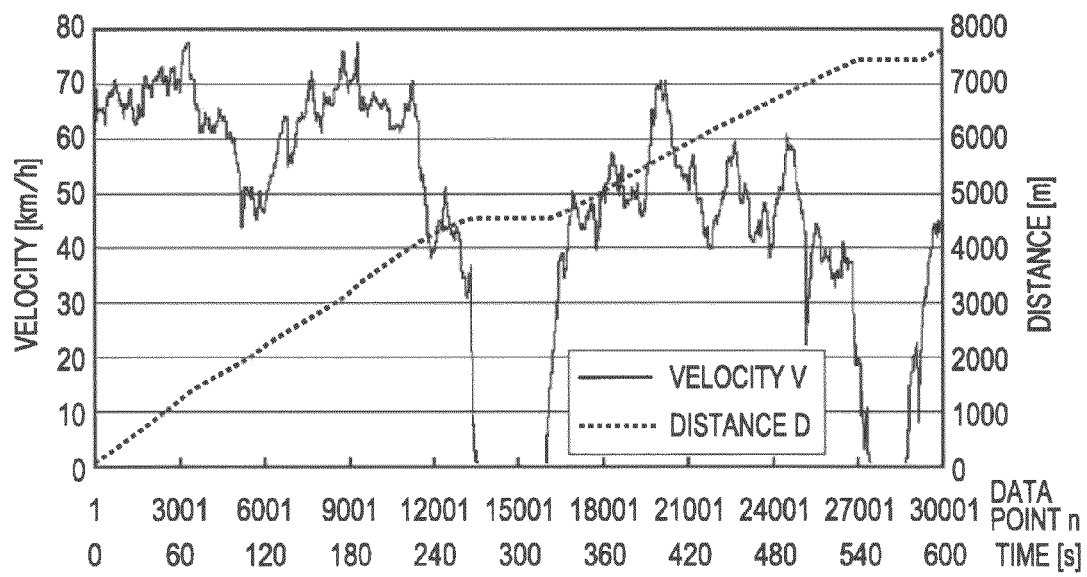
FIGS. 28A and 28B are graphs illustrating a second comparison between the measurement results and the references.
Figure 28B:
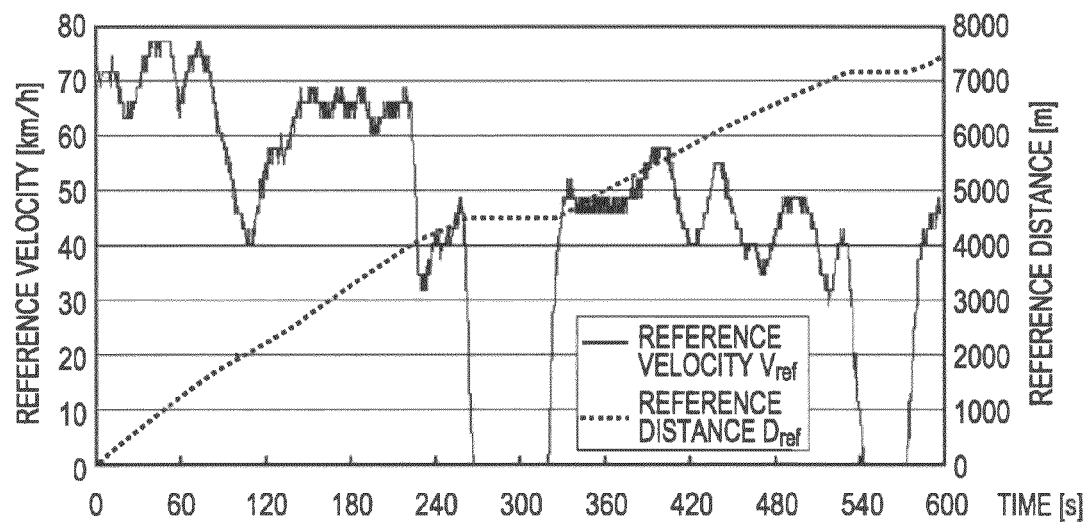

FIG. 28A illustrates the velocity V, which is calculated using the velocity calculation according to the embodiment, and the distance D calculated using the velocity V. FIG. 28B illustrates the reference velocity $V_{ref}$ and the reference distance $D_{ref}$, which are to be compared with the velocity V and the distance D illustrated in FIG. 28A.

Figure 29A:
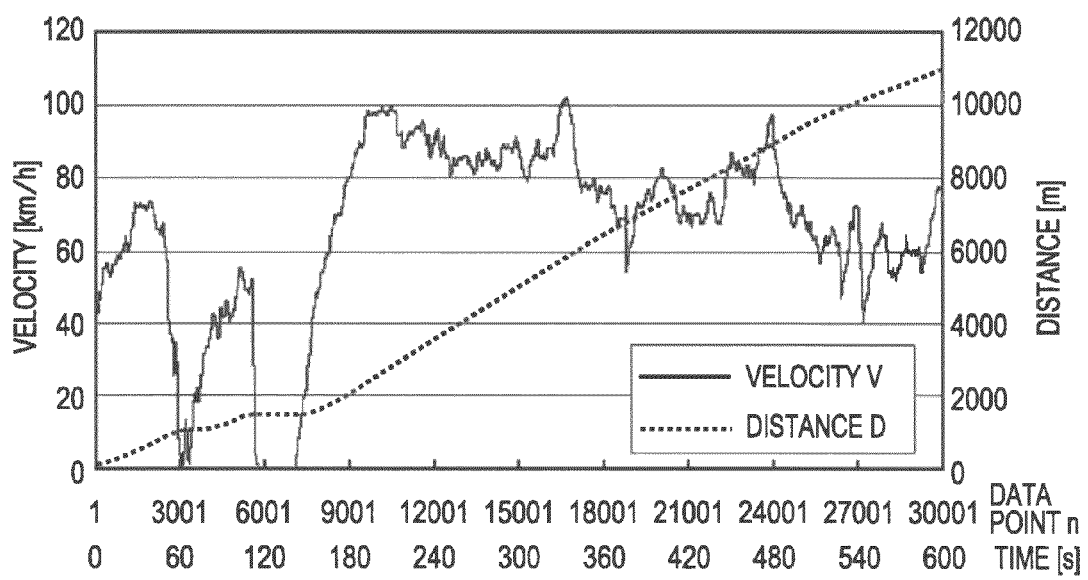
FIGS. 29A and 29B are graphs illustrating a third comparison between the measurement results and the references.
Figure 29B:
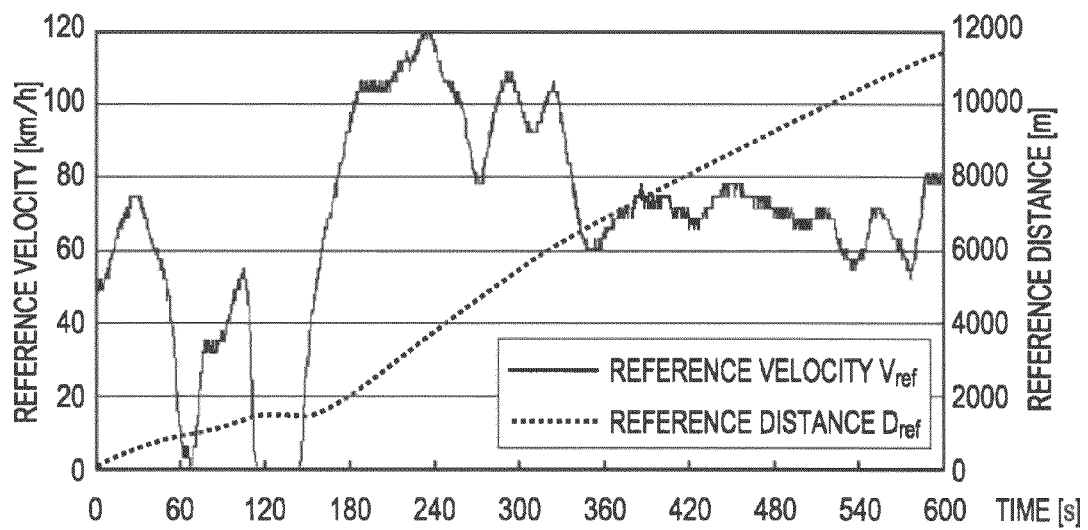

FIG. 29A illustrates the velocity V, which is calculated using the velocity calculation according to the embodiment, and the distance D calculated using the velocity V. FIG. 29B illustrates the reference velocity $V_{ref}$ and the reference distance $D_{ref}$, which are to be compared with the velocity V and the distance D illustrated in FIG. 29A.

Figure 30A:
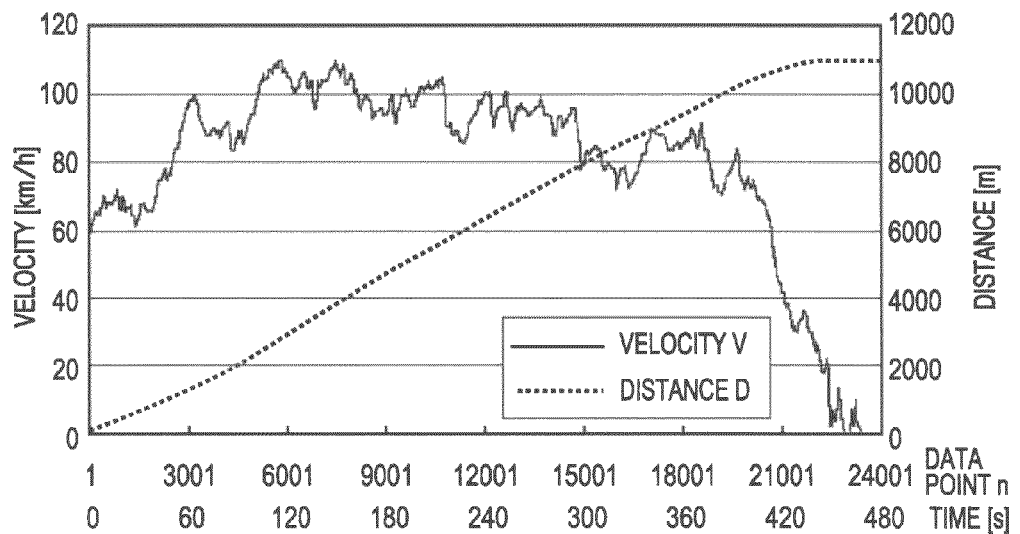
FIGS. 30A and 30B are graphs illustrating a fourth comparison between the measurement results and the references.
Figure 30B:
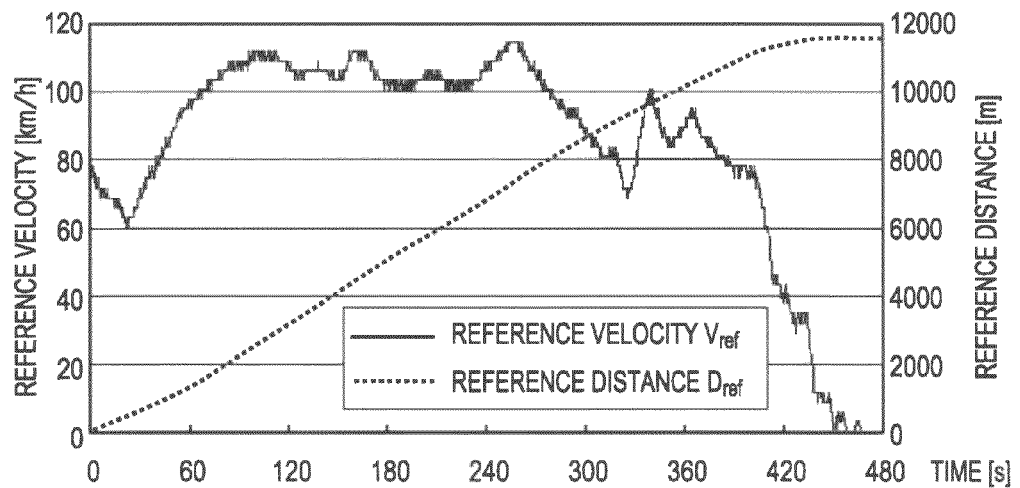

FIG. 30A illustrates the velocity V, which is calculated using the velocity calculation according to the embodiment, and the distance D calculated using the velocity V. FIG. 30B illustrates the reference velocity $V_{ref}$ and the reference distance $D_{ref}$, which are to be compared with the velocity V and the distance D illustrated in FIG. 30A.

Figure 31A:
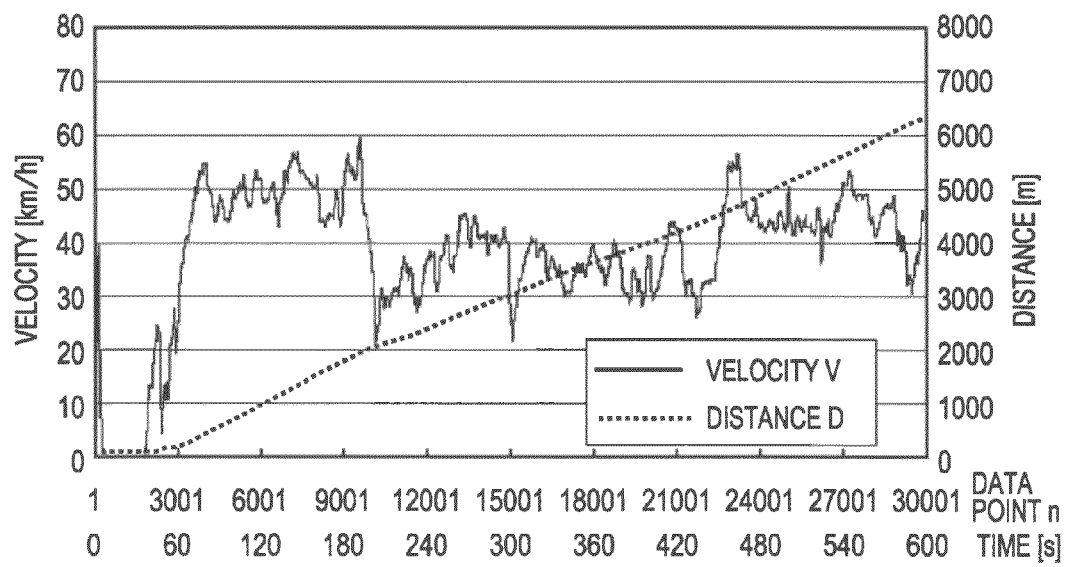
FIGS. 31A and 31B are graphs illustrating a fifth comparison between the measurement results and the references.
Figure 31B:
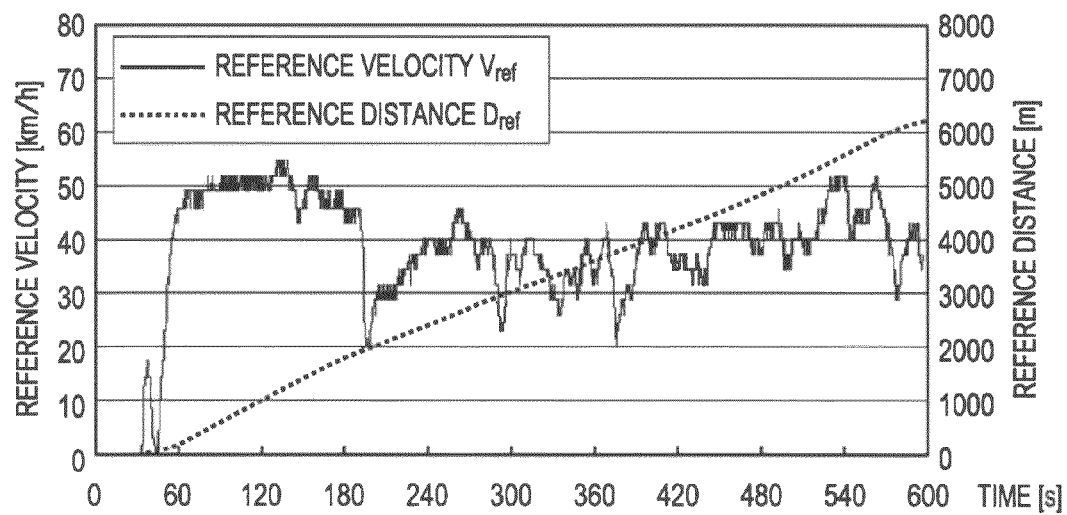

FIG. 31A illustrates the velocity V, which is calculated using the velocity calculation according to the embodiment, and the distance D calculated using the velocity V. FIG. 31B illustrates the reference velocity $V_{ref}$ and the reference distance $D_{ref}$, which are to be compared with the velocity V and the distance D illustrated in FIG. 31A.

As in the case of FIG. 26A, the velocity V illustrated in FIGS. 27A, 28A, 29A, 30A, and 31A, which illustrates the cases when the vehicle travels on different roads, are substantially similar to the reference velocity $V_{ref}$ illustrated in FIGS. 27B, 28B, 29B, 30B, and 31B, respectively. The error between the distance D, which is calculated on the basis of the velocity V, and the reference distance $D_{ref}$ is smaller than 10%.

Figure 32A:
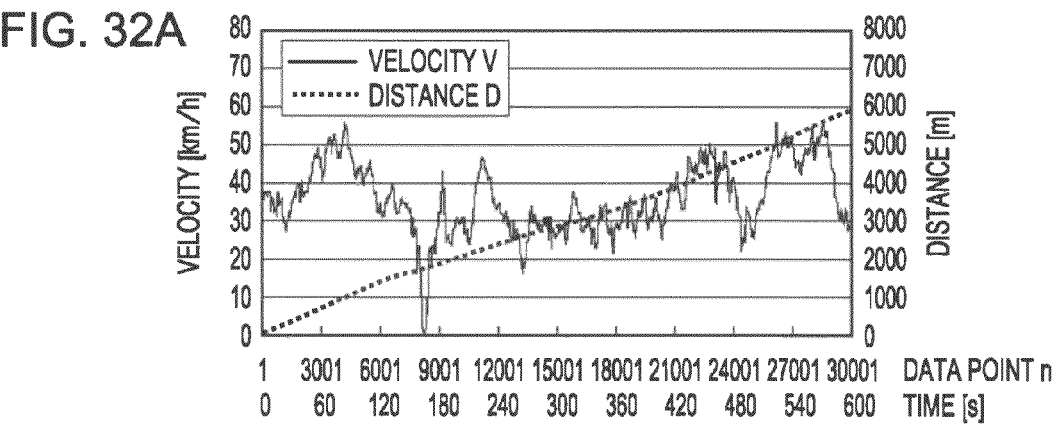
FIGS. 32A to 32C are graphs illustrating a first comparison between the measurement results and the references when the vehicle is traveling along a curve.
Figure 32B:
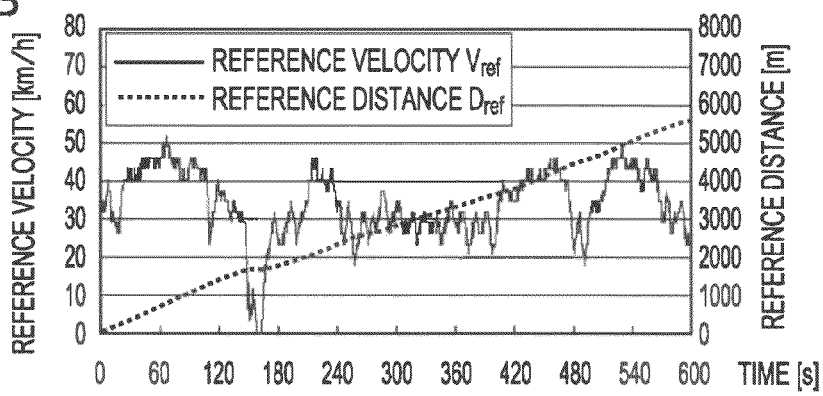
Figure 32C:
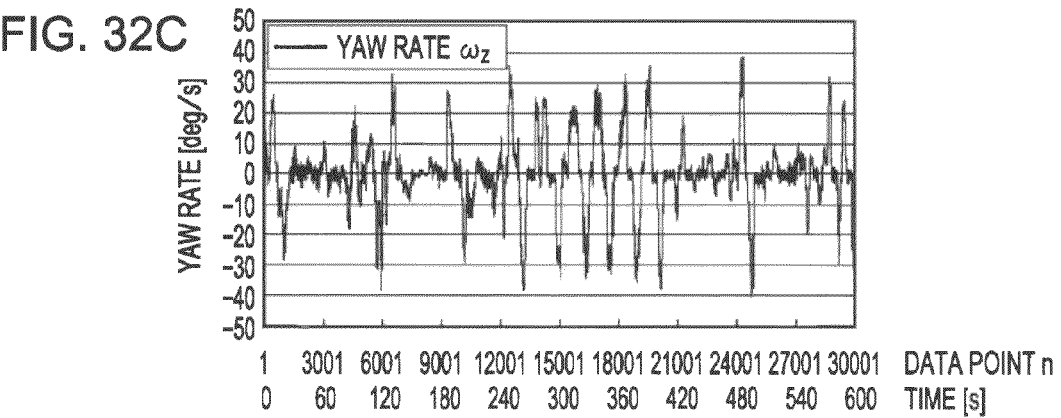

FIG. 32A is a graph of the velocity V and the distance D that are calculated by the PND 1 using the velocity calculation. FIG. 32B is a graph of the reference velocity $V_{ref}$ and the reference distance $D_{ref}$, which is calculated from the reference velocity $V_{ref}$. FIG. 32C is a graph of the yaw rate $\omega_z$, which is detected by the Z axis gyro sensor 6 of the PND 1.

Referring to FIG. 32C, the yaw rate $\omega_z$ that is higher than 20 deg/s indicates a right turn of the vehicle, and the yaw rate $\omega_z$ that is smaller than −20 deg/s indicates a left turn of the vehicle.

As can be seen from FIG. 32C, even when the vehicle repeats right turns and left turns, the velocity V calculated by the PND 1 (FIG. 32A) is substantially similar to the reference velocity $V_{ref}$ (FIG. 32B). The error between the distance D, which is calculated on the basis of the velocity V, and the reference distance $D_{ref}$ is smaller than 10%.

Figure 33A:
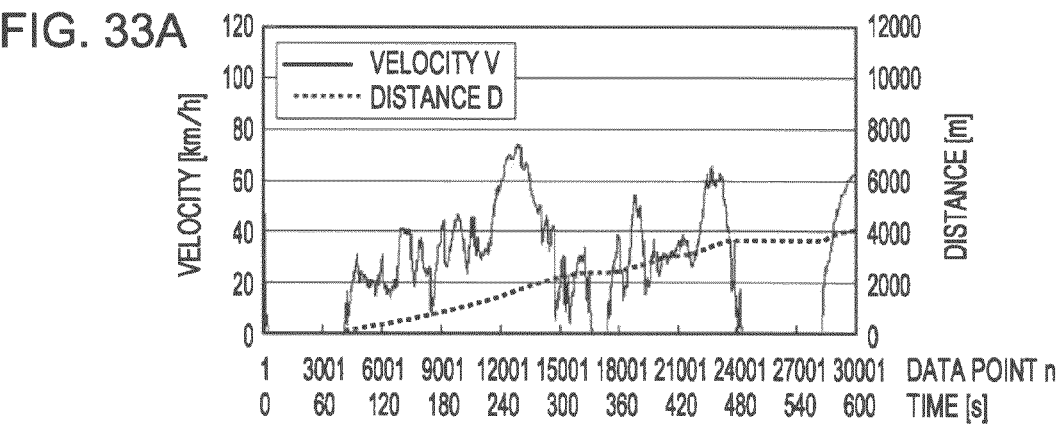
FIGS. 33A to 33C are graphs illustrating a second comparison between the measurement results and the references when the vehicle is traveling along a curve.
Figure 33B:
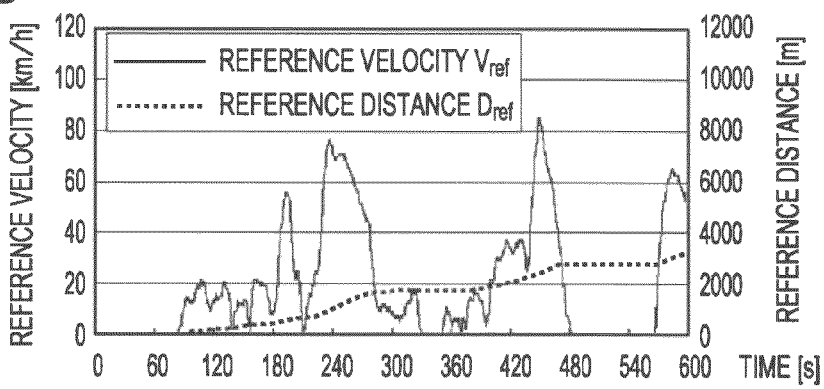
Figure 33C:
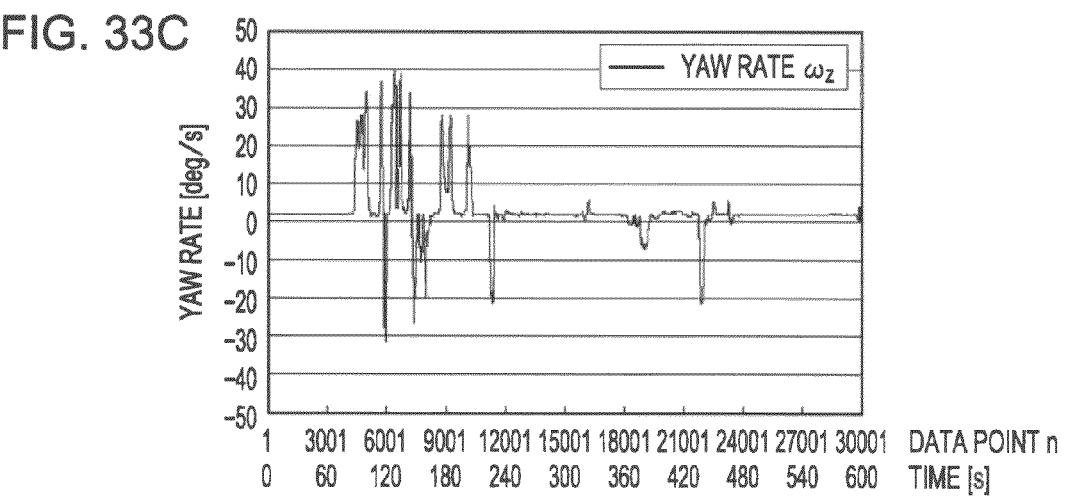

FIG. 33A is a graph of the velocity V and the distance D that are calculated by the PND 1 using the velocity calculation when the vehicle travels on a road that is different from that of FIG. 32A. FIG. 33B is a graph of the reference velocity $V_{ref}$ and the reference distance $D_{ref}$ that is calculated from the reference velocity $V_{ref}$. FIG. 33C is a graph of the yaw rate $\omega_z$, which is detected by the Z axis gyro sensor 6.

Figure 34A:
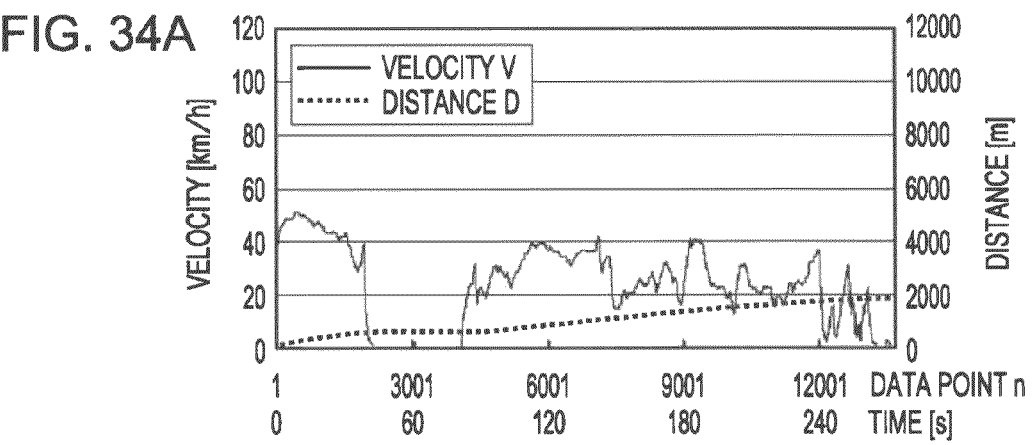
FIGS. 34A to 34C are graphs illustrating a third comparison between the measurement results and the references when the vehicle is traveling along a curve.
Figure 34B:
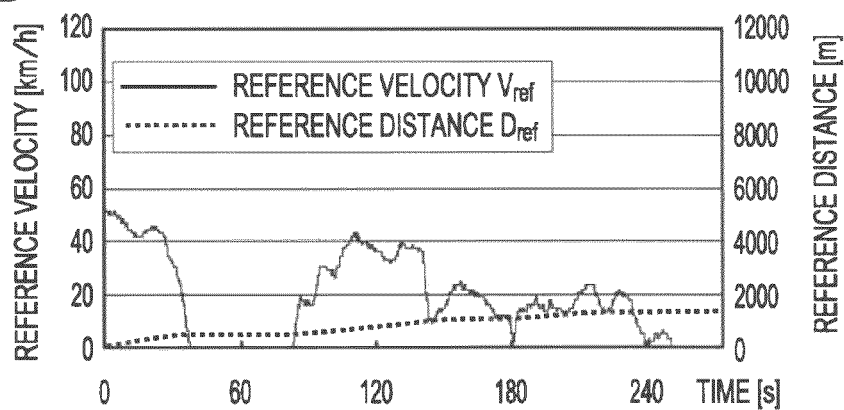
Figure 34C:
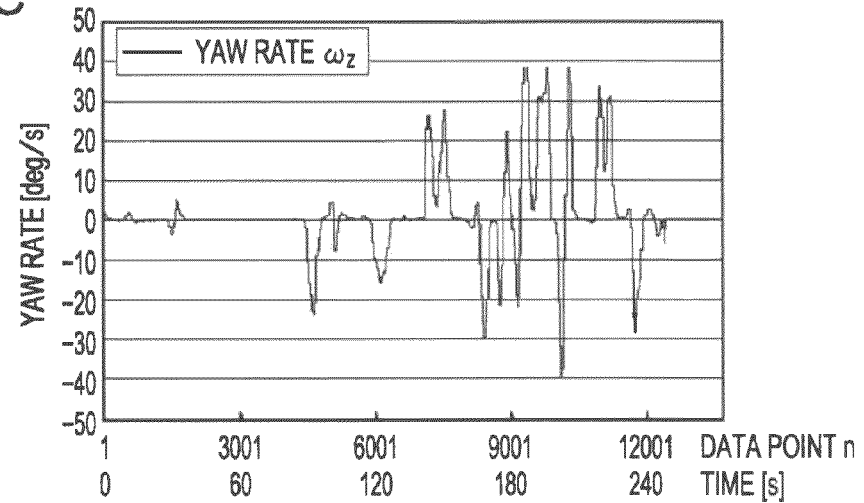

FIG. 34A is a graph of the velocity V and the distance D that are calculated by the PND 1 using the velocity calculation when the vehicle travels on a road that is different from those of FIGS. 32A and 33A. FIG. 34B is a graph of the reference velocity $V_{ref}$ and the reference distance $D_{ref}$ that is calculated from the reference velocity $V_{ref}$. FIG. 34C is a graph of the yaw rate $\omega_z$, which is detected by the Z axis gyro sensor 6.

As can be seen from these results, when the vehicle travels along a large number of curves, the velocity V calculated by the PND 1 is substantially similar to the reference velocity $V_{ref}$, and the error between the distance D, which is calculated on the basis of the velocity V, and the reference distance $D_{ref}$ is smaller than 10%.

FIG. 35A illustrates a map including a route K of a vehicle from a start S to a goal G. FIG. 35B illustrates a travel path T of the vehicle, which is a plot of the present positions of the vehicle calculated by the PND 1 mounted on the vehicle.

The travel path T (FIG. 35B) is substantially isometric and similar to the route K (FIG. 35A) along which the vehicle has traveled. As can be seen from this fact, the PND 1 can substantially accurately calculate the present position.

FIG. 36 illustrates the velocity V and the distance D, which are calculated by the PND 1 placed on a light car. For comparison with the velocity V and the distance D, FIG. 36 also illustrates the velocity $V_g$, which is calculated on the basis of GPS signals received with the GPS antenna ANT, and the distance $D_g$, which is calculated from the velocity $V_g$.

Hereinafter, the velocity that is calculated on the basis of GPS signals received by the GPS antenna ANT will be referred to as the GPS velocity, and the distance that is calculated from the GPS velocity will be referred to as the GPS distance.

FIG. 37 illustrates the velocity V and the distance D, which are calculated by the PND 1 placed on a minivan. For comparison with the velocity V and the distance D, FIG. 37 also illustrates the velocity $V_g$, which is calculated on the basis of GPS signals received by the GPS antenna ANT, and the distance $D_g$, which is calculated from the velocity $V_g$.

As can be seen from FIGS. 36 and 37, for vehicles having different sizes, i.e. wheelbases, the velocity V calculated by the PND 1 according to the embodiment of the present invention is substantially similar to the GPS velocity $V_g$, and the error between the distance D, which is calculated on the basis of the velocity V, and the GPS distance $D_g$ is smaller than 10%.

In FIGS. 36 and 37, when the vehicle is in a tunnel and the like and does not receive GPS signals, the GPS velocity $V_g$ is set at 0.

1-6. Operation and Effect

In the PND 1 having the structure described above, the three-axis acceleration sensor 4 detects the acceleration $\alpha_z$ along the Z axis perpendicular to direction of travel of the vehicle, which is generated due to the undulation of a road surface, and the Y axis gyro sensor 5 detects the pitch rate $\omega_y$ around the Y axis perpendicular to the direction of travel of the vehicle, which is generated due to the undulation of a road surface.

The PND 1 calculates the velocity V using equation (1) or (3) on the basis of the acceleration $\alpha_z$ detected by the three-axis acceleration sensor 4 and the pitch rate $\omega_y$ detected by the Y axis gyro sensor 5.

Thus, the PND 1, which has a simple structure including the three-axis acceleration sensor 4 and the Y axis gyro sensor 5, can accurately calculate the velocity V of the vehicle under all road conditions even when it is difficult for the PND 1 to receive GPS signals.

The PND 1 has a good usability because the PND 1 is detachable from the vehicle and it is not necessary for a user to carry out a cumbersome task of connecting a cable to receive speed pulse signals from the vehicle.

The Z axis gyro sensor 6 of the PND 1 detects the yaw rate $\omega_z$ around the Z axis perpendicular to the direction of travel of the vehicle, and the PND 1 calculates present position on the basis of the velocity V and the yaw rate $\omega_z$.

Thus, the PND 1, which has a simple structure including the three-axis acceleration sensor 4, the Y axis gyro sensor 5, and the Z axis gyro sensor 6, can accurately calculate the present position of the vehicle under all road conditions even when it is difficult for the PND 1 to receive GPS signals.

When calculating the velocity V, the PND 1 performs low pass filtering on the acceleration data AD1 and the pitch rate data PD1. Thus, the PND 1 can remove from the acceleration $\alpha_z$ and the angular velocity $\omega_c$ components that are generated due to the cradle 3 and oscillate at a frequency of, for example, about 15 Hz, which is substantially higher than those of the acceleration $\alpha_z$ and the pitch rate $\omega_y$, which are generated due to undulation of a road surface and oscillate at a frequency of, for example, 1 to 2 Hz.

Thus, the PND 1 can more accurately calculate the velocity V using the acceleration $\alpha_z$ and the pitch rate $\omega_y$ from which the vibration component generated due to the cradle 3 is removed.

The PND 1 extracts the maximum acceleration $\alpha_{z,max}$ and the minimum acceleration $\alpha_{z,min}$ from the range of 25 to 75 data points of the acceleration $\alpha_z$ around the data point $P_m$, and extracts the maximum pitch rate $\omega_{y,max}$ and the minimum pitch rate $\omega_{y,min}$ from the range of 25 to 75 data points of the pitch rate $\omega_y$ around the data point $P_m$.

The PND 1 calculates the velocity V using equation (3) from the maximum and minimum accelerations $\alpha_{z,max}$ and $\alpha_{z,min}$ and the maximum and minimum pitch rates $\omega_{y,max}$ and $\omega_{y,min}$.

Thus, the PND 1 uses data points in a range that is wider than the phase difference between the acceleration $\alpha_z$ and the pitch rate $\omega_y$, the phase delay being changeable in accordance with the position at which the PND 1 is placed in the vehicle, thereby removing the influence of the phase difference between the acceleration $\alpha_z$ and the pitch rate $\omega_y$.

When the velocity V calculated using equation (3) on the basis of the acceleration $\alpha_z$ and the pitch rate $\omega_y$ is excessively high, the PND 1 sets the velocity V at 0 when the vehicle is traveling at a very low velocity, and otherwise the PND 1 sets the velocity at the former velocity $V_{n-1}$, thereby calculating the velocity V more accurately.

With the above structure, the PND 1 according to the first embodiment detects the acceleration $\alpha_z$ along the Z axis, which is generated due to the undulation of a road surface, and the pitch rate $\omega_y$ around the Y axis, which is generated due to the undulation of the road surface, and calculates the velocity V using the acceleration $\alpha_z$ and the pitch rate $\omega_y$, thereby accurately calculating the velocity V under all road conditions.

2. Second Embodiment

A PND 50 according to a second embodiment (FIGS. 4 to 8) differs from the PND 1 according to the first embodiment in that the PND 50 can calculate the velocity V more precisely with consideration of the tilt of the PND 50.

2-1. Negative Influence when PND is Used in Upward Tilt Position

Figure 38:
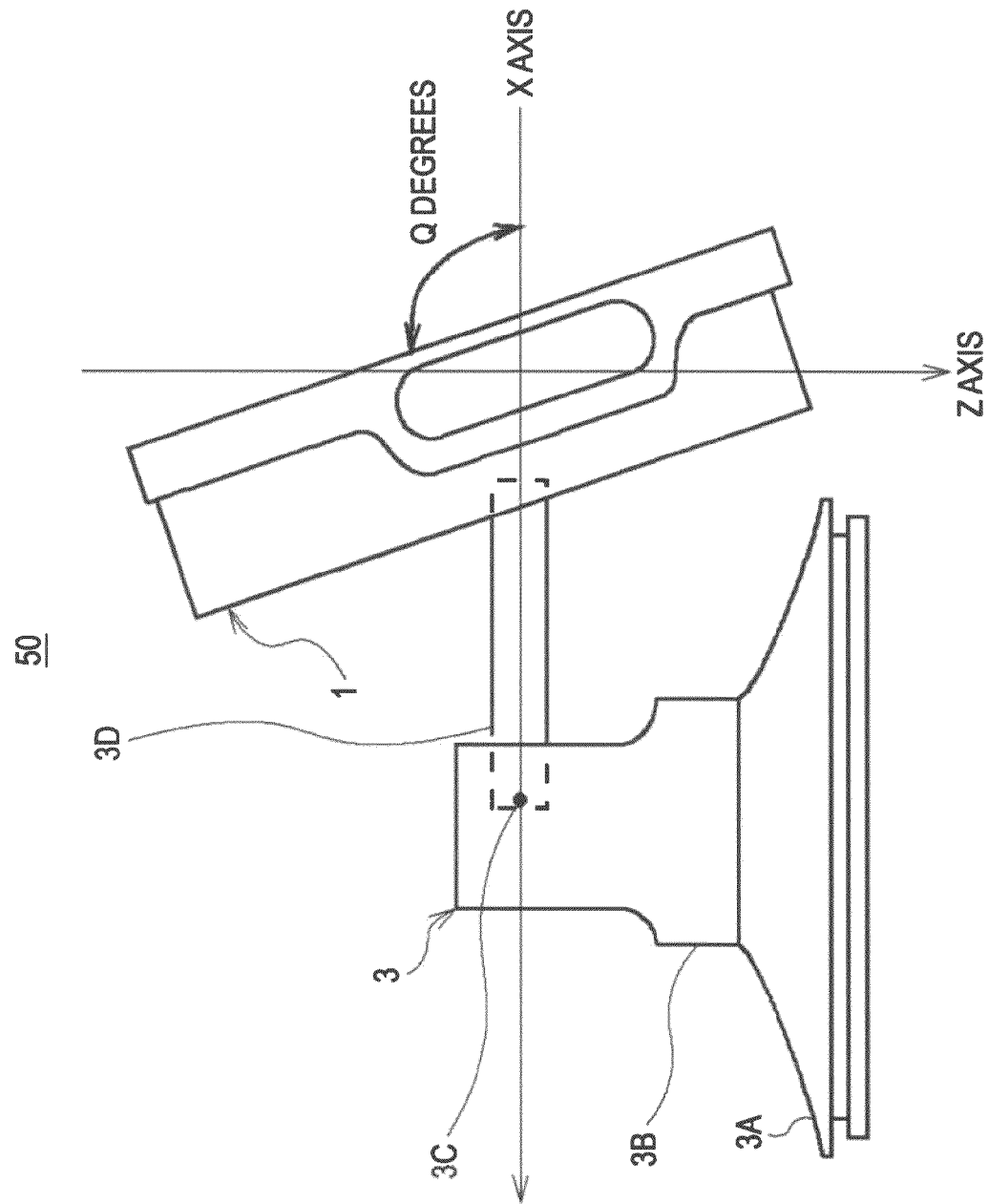
FIG. 38 is a diagram illustrating of an PND according to the second embodiment in an upward tilt position.

The PND 50 according to the second embodiment removes a negative influence that is produced in the velocity calculation when the PND 50 is used in a position that is tilted in the direction of travel along the X axis and around the Y axis (FIG. 5) by Q degrees (for example, 120 degrees) as illustrated in FIG. 38 (hereinafter referred to as an upward tilt position).

The upward tilt position may occur when the PND 50 is initially attached to the cradle 3 in the upward tilt position or when the PND 50 is attached to the cradle 3 and then tilted to be in the upward tilt position.

The following discussion holds true also when the PND 50 is used in a downward tilt position, which is opposite to the upward tilt position and in which the PND 50 is tilted in the direction of travel along the X axis and around the Y axis (FIG. 5) by –Q degrees.

Figure 39:
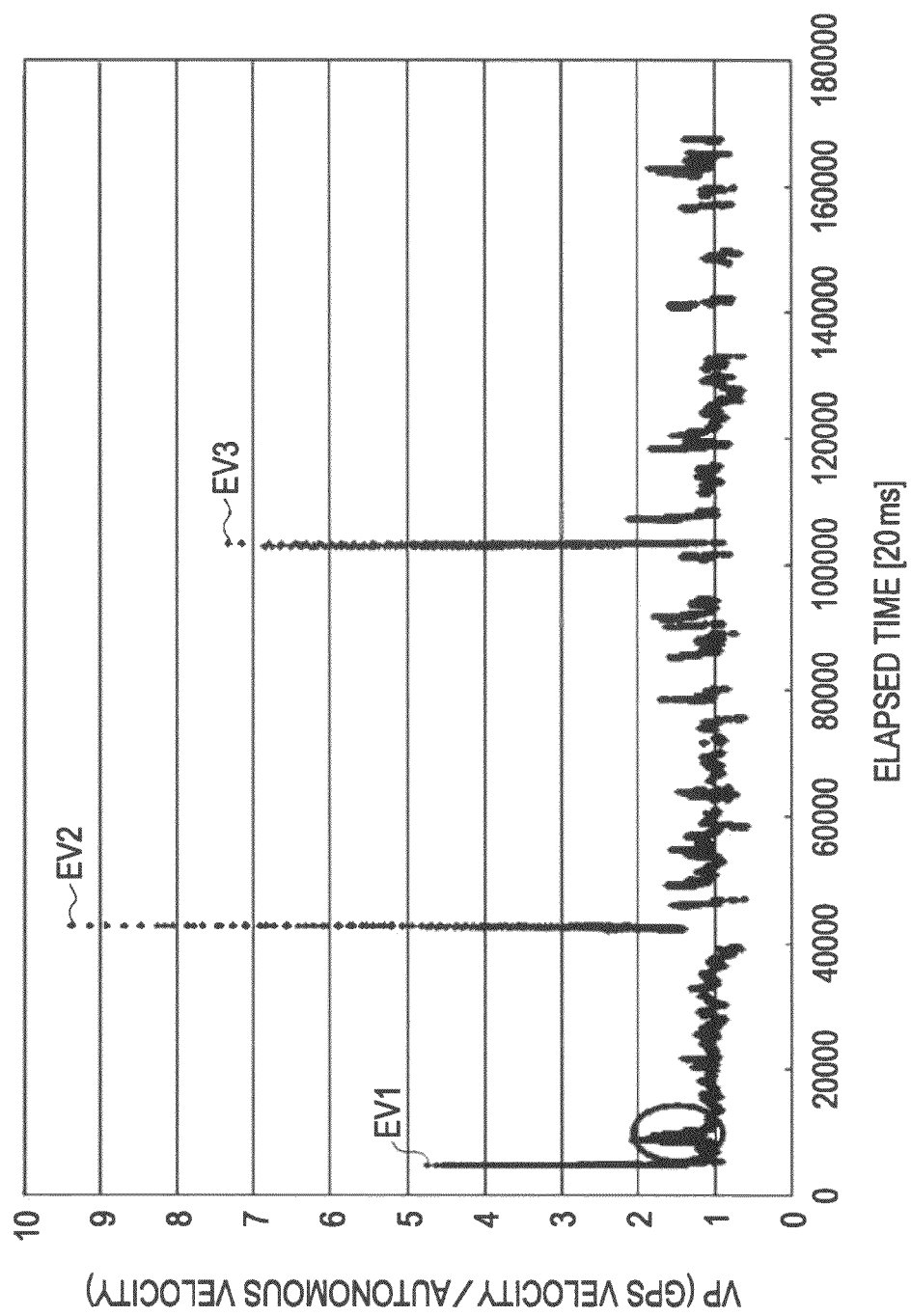
FIG. 39 is a graph illustrating the ratio of the GPS velocity to the autonomous velocity when the PND is in the upward tilt position.

Referring to FIG. 39, for example, when the PND 50 is used, for example, in a position in which the body of the PND 50 is perpendicular to the Z axis (FIGS. 5 and 13) and is not tilted along the X axis, the velocity ratio VP (GPS velocity $V_g$/autonomous velocity V), which is the ratio of the GPS velocity $V_g$ to the velocity V calculated using the velocity calculation process according to the embodiment of the present invention (hereinafter referred to as an autonomous velocity V) is ideally a constant value "1".

However, in practice, when the PND 50 is used in the upward position in which the PND 50 is tilted in the direction of travel along the X axis and around the Y axis (FIG. 5) by Q degrees (for example, 120 degrees), the velocity ratio VP (GPS velocity $V_g$/autonomous velocity V) are detected as three abnormal values EV1 to EV3, which are excessively high.

Figure 40:
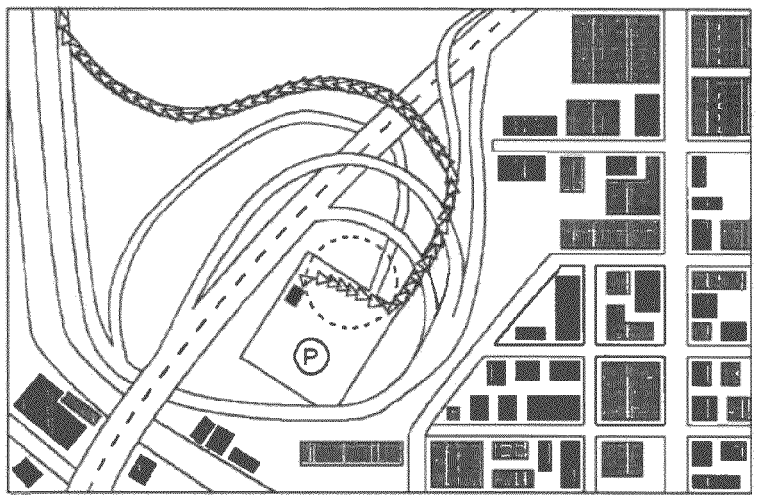
FIG. 40 is a diagram illustrating a position at which an abnormal value EV1 is output.
Figure 41:
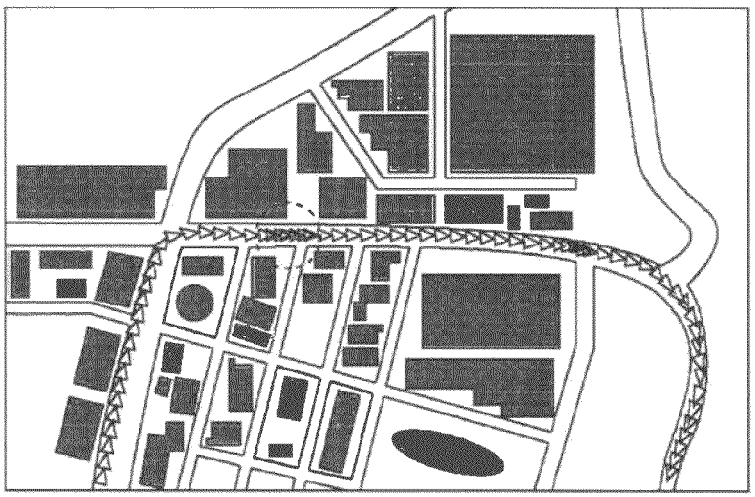
FIG. 41 is a diagram illustrating a position at which an abnormal value EV2 is output.
Figure 42:
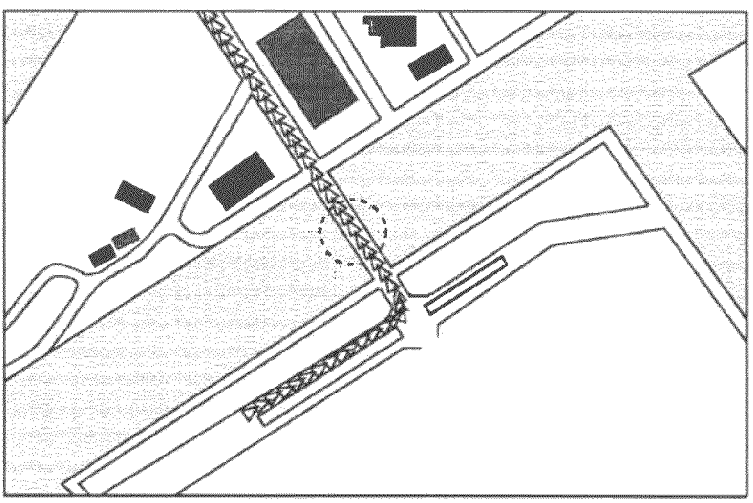
FIG. 42 is a diagram illustrating a position at which an abnormal value EV3 is output.

It has been found that the abnormal value EV1 corresponds to a timing (elapsed time) when the vehicle is accelerating from a parking lot to a traffic lane of an expressway as illustrated in FIG. 40. It has been found that the abnormal values EV2 and EV3 each correspond to a timing (elapsed time) when the vehicle is accelerating in a traffic lane as illustrated in FIGS. 41 and 42.

Figure 43:
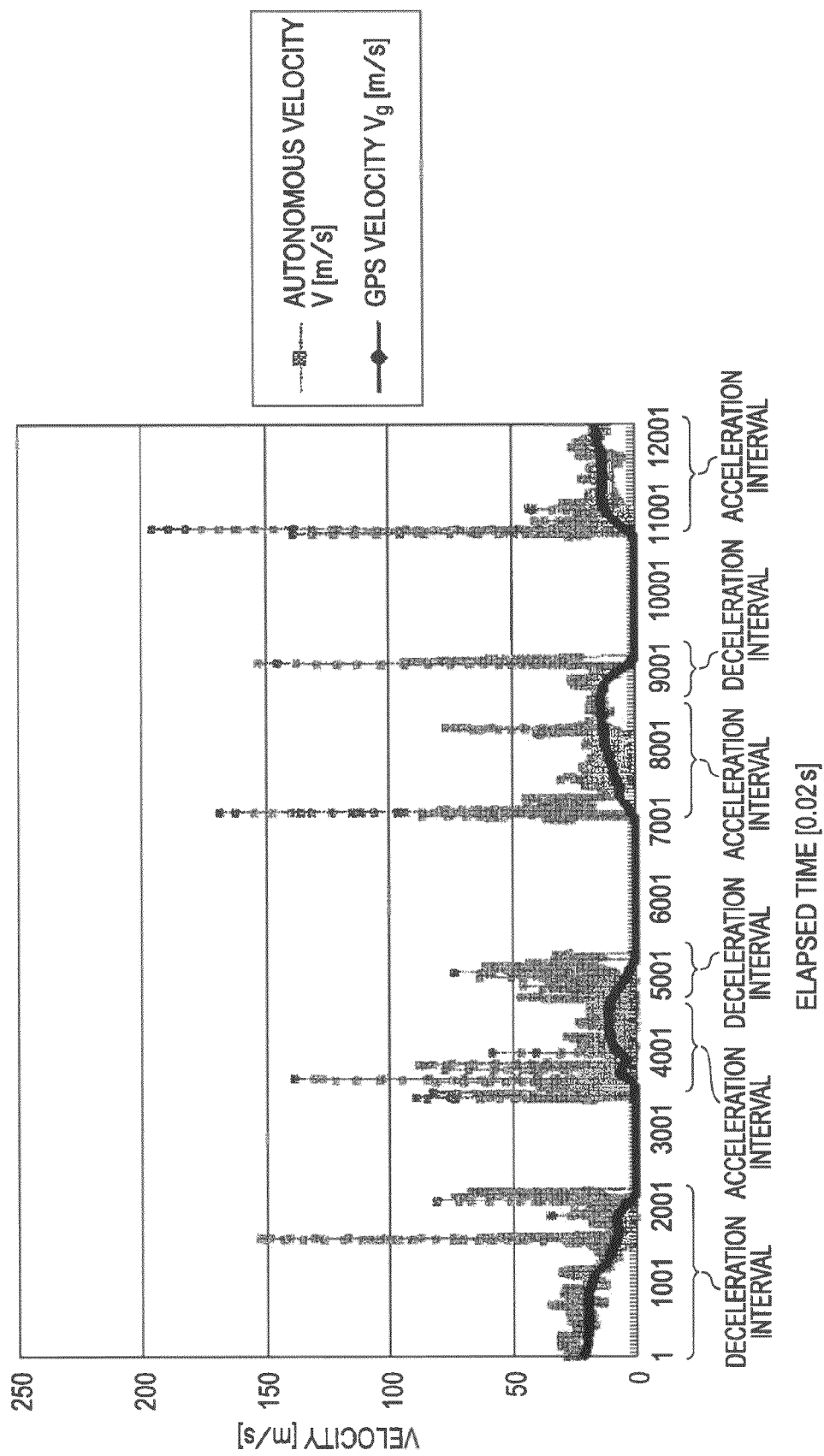
FIG. 43 is a graph illustrating a comparison between the autonomous velocity calculated by performing velocity calculation and the GPS velocity.

That is, as illustrated in FIG. 43, the PND 50 generally outputs the autonomous velocity V that is extremely larger than the GPS velocity $V_g$ when the vehicle is accelerating or decelerating.

Figure 44:
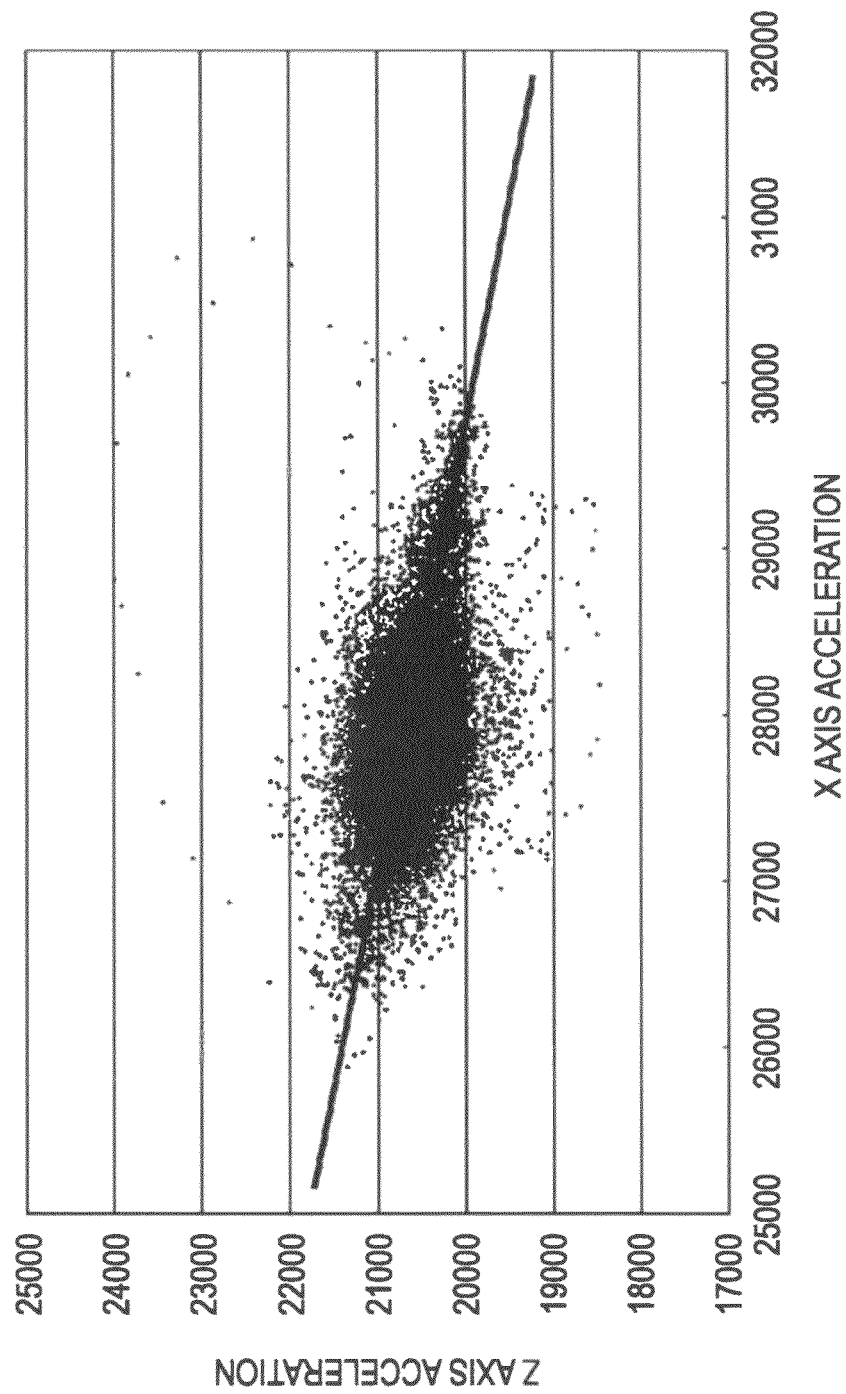
FIG. 44 is a diagram illustrating a correlation between the X axis acceleration and the Z axis acceleration.

When the PND 50 is used in a position in which the body of the PND 50 is perpendicular to the Z axis, the acceleration $\alpha_x$ along the X axis and the acceleration $\alpha_z$ along the Z axis is uncorrelated. However, when the PND 50 is used in the upward tilt position, the acceleration $\alpha_x$ along the X axis and the acceleration $\alpha_z$ along the Z axis is correlated (has a slope indicated by a line) as illustrated in FIG. 44, in that the acceleration $\alpha_z$ along the Z axis changes in accordance with the acceleration $\alpha_x$ along the X axis.

Accordingly, when the PND 50 is used in the upward tilt position, the acceleration $\alpha_x$ along the X axis is mixed into the acceleration $\alpha_z$ along the Z axis, which is used to calculate the autonomous velocity V, when the vehicle is accelerating or decelerating.

That is, with the PND 50, the acceleration $\alpha_x$ along the X axis is mixed into the acceleration $\alpha_z$ along the Z axis, whereby the acceleration $\alpha_z$ along the Z axis is overestimated and an error is generated in the calculation result of the autonomous velocity V.

As described above using FIG. 22, the autonomous velocity V is calculated by using the difference between the maximum acceleration $\alpha_{z,max}$ and the minimum acceleration $\alpha_{z,min}$, in which the values of the acceleration $\alpha_z$ along the Z axis include the acceleration $\alpha_x$ along the X axis.

Therefore, it is necessary for the PND 50 to learn a correlation coefficient K (described below) that represents the degree to which the acceleration $\alpha_x$ along the X axis is mixed into the acceleration $\alpha_z$ along the Z axis and calculate a true acceleration $\alpha_z'$ along the Z axis from which the acceleration $\alpha_x$ along the X axis is removed beforehand in accordance with the following equation (4).

$$\alpha_z' = \alpha_z - K \cdot \alpha_x \qquad (4)$$

Thus, the PND 50 can reduce en error of the autonomous velocity V with respect to the GPS velocity $V_g$, and can make the velocity ratio VP (GPS velocity $V_g$/autonomous velocity V) illustrated in FIG. 39 become closer to an ideal value "1" irrespective of the elapsed time.

When the acceleration $\alpha_x$ along the X axis is near "0", slight noise may considerably influence the value of the acceleration $\alpha_x$ and the noise may become dominant. Therefore, when calculating the autonomous velocity V, the PND 50 calculates the correlation coefficient K only when the acceleration $|\alpha_x|$ is larger than a predetermined threshold TH (for example, 0.075 m/s$^2$).

2-2. Principle of Velocity Calculation

A velocity calculator 52 calculates the correlation coefficient K between the acceleration $\alpha_z$ along the Z axis and the acceleration $\alpha_x$ along the X axis by learning, and calculates the true acceleration $\alpha_z'$ along the Z axis by removing the acceleration $\alpha_x$ along the X axis that is mixed into the acceleration $\alpha_z$ along the Z axis by using the correlation coefficient K.

The velocity calculator 52 calculates the autonomous velocity V using the acceleration $\alpha_z'$ along the Z axis and the pitch rate $\omega_y$ around the Y axis in accordance with the following equation (5).

$$V = \frac{\alpha_z'}{\omega_y} \qquad (5)$$

When calculating the correlation coefficient K beforehand by learning, the velocity calculator 52 calculates a correlation coefficient Kn calculated on the basis of, for example, the result of the n-th sampling in accordance with the following equation (6).

$$Kn = \frac{\alpha_z}{\alpha_x} \qquad (6)$$

However, the calculation results of the correlation coefficient Kn have a large deviation (error) between samples. Therefore, it is difficult to use the correlation coefficient Kn to correct the acceleration $\alpha_z$ along the Z axis (to remove the acceleration $\alpha_x$ along the X axis that is mixed into the acceleration $\alpha_z$ along the Z axis) for the next sampling.

Therefore, it is necessary for the velocity calculator 52 to use a large number of correlation coefficients Kn, each of which including an error, to obtain the final value of the correlation coefficient K that has a small error. A simple method, for example, is to obtain the final value of the correlation coefficient K by averaging all the correlation coefficients Kn obtained by sampling in a certain past period.

However, this method has two demerits. One is that it is necessary to prepare a buffer for storing the correlation coefficient Kn in the past period. The other is that the method is inefficient because the method does not consider the fact that the error of the correlation coefficient Kn is small when the acceleration $|\alpha_x|$ along the X axis is considerably larger than "0" (larger than the threshold TH).

Therefore, when calculating the final value of the correlation coefficient K, the velocity calculator 52 uses a correlation coefficient learning section (described below) including an infinite impulse response (IIR) filter, so that it is not necessary for the velocity calculator 52 to have a buffer for storing all the correlation coefficient Kn in a past period.

The correlation coefficient learning section calculates the final value of the correlation coefficient K using the following equation (7).

$$K = (Kn - K) \cdot \text{Gain} + K \qquad (7)$$

Thus, the correlation coefficient learning section stores only the correlation coefficient K that is the result of the previous learning. In equation (7), Gain is a predetermined constant.

Instead of using the Gain as a constant, however, the correlation coefficient learning section changes the value of the Gain in accordance with the acceleration $|\alpha_x|$ along the X axis, so that the correlation coefficient Kn having a smaller error is weighted heavily and thereby the final value of the correlation coefficient K converges faster on an appropriate final value.

To be specific, the correlation coefficient learning section calculates the Gain in equation (7) using the following equation (8).

$$\text{Gain} = \text{Reference Gain} \cdot \frac{|\alpha_x|}{\text{Reference } \alpha_x} \qquad (8)$$

The reference $\alpha_x$ is set at 0.15 m/s² (for example, corresponding to 200 digits (200 data points) in the X axis acceleration direction of FIG. 44). The reference Gain is set at 1/10000 (for example, corresponding to a time constant of 200 seconds (10000/50=200) for the sampling frequency of 50 Hz according to the embodiment).

That is, the correlation coefficient learning section sets, for example, the reference $\alpha_x$ at 0.15 m/s² and the reference Gain at 1/10000, and calculates the Gain using the values of the acceleration $|\alpha_x|$ along the X axis sampled by the three-axis acceleration sensor 4 in the past 200 seconds.

That is, when calculating the Gain, the correlation coefficient learning section updates the output of the three-axis acceleration sensor 4 every 200 seconds. Thus, with consideration of the case in which the upward tilt position (the tilt angle) of the PND 50 is changed, the correlation coefficient learning section does not use old data in order to prevent miscalculating the Gain by using data before the tilt position (the tilt angle) of the PND 50 is changed.

2-3. Velocity Calculation

Figure 45:
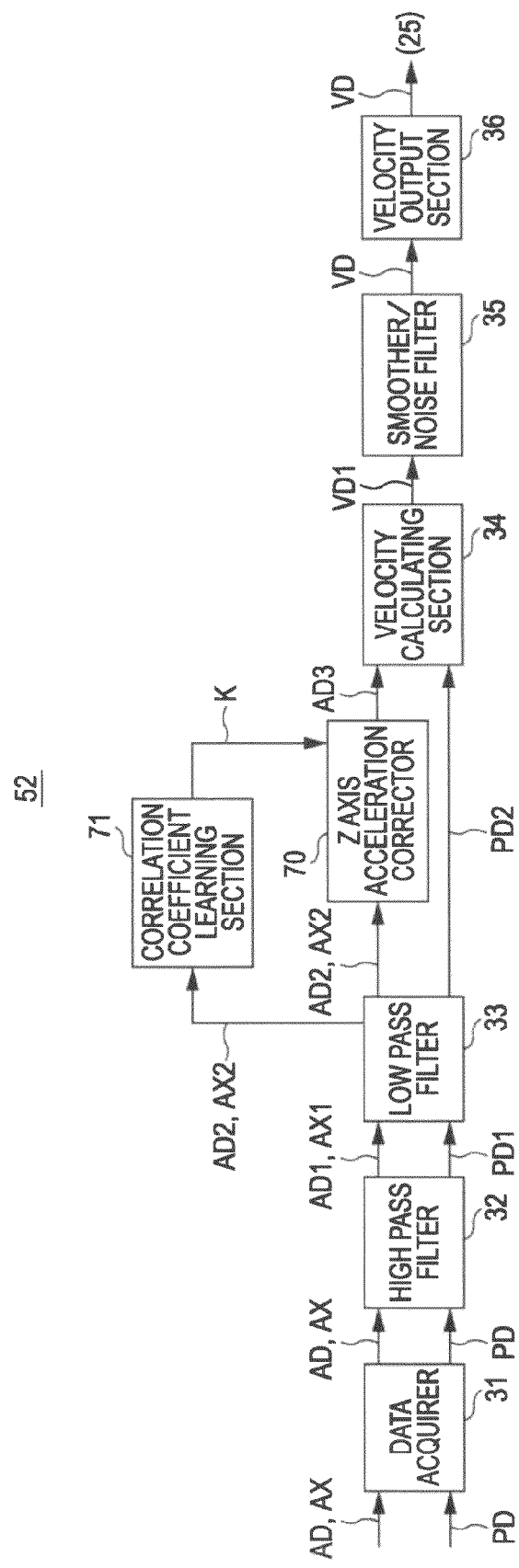
FIG. 45 is a block diagram illustrating a velocity calculator according to a second embodiment.

FIG. 45 is a block diagram of the velocity calculator 52, in which parts corresponding to those of FIG. 8 are represented by the same numerals. As illustrated in FIG. 45, the velocity calculator 52 is similar to the velocity calculator 22 except that the velocity calculator 52 further includes a Z axis direction acceleration corrector 70 and a correlation coefficient learning section 71.

The velocity calculator 52 calculates the final value of the correlation coefficient K when the PND 50 is mounted on the cradle 3, the vehicle is in a GPS measurement area, and the GPS velocity is equal to or higher than 1.0 m/s. Thus, the velocity calculator 52 calculates the correlation coefficient K only when the vehicle is traveling, and does not calculate the correlation coefficient K when the user is holding the PND 50 or adjusting the tilt angle of the PND 50.

The data acquirer 31 of the velocity calculator 52 sends the acceleration data AD representing the acceleration $\alpha_z$, the acceleration data AX representing the acceleration $\alpha_x$, and the pitch rate data PD supplied by the Y-axis gyro sensor 5 to the high pass filter 32.

The high pass filter 32 removes direct-current components (and thereby removes offset components) from the acceleration data AD, the acceleration data AX, and the pitch rate data PD to generate acceleration data AD1, acceleration data AX1, and pitch rate data PD1, and sends the acceleration data AD1, the acceleration data AX1, and the pitch rate data PD1 to the low pass filter 33.

The low pass filter 33 performs the aforementioned low pass filtering on the acceleration data AD1, the acceleration data AX1, and the pitch rate data PD1 to generate an acceleration data AD2 and an acceleration data AX2. The low pass filter 33 sends the acceleration data AD2 to the Z axis direction acceleration corrector 70 and the correlation coefficient learning section 71, and sends the pitch rate data PD2 to the velocity calculating section 34.

The correlation coefficient learning section 71 calculates the final value of the correlation coefficient K by using the acceleration $\alpha_z$ along the Z axis represented by the acceleration data AD2 and the acceleration $\alpha_x$ along the X axis represented by the acceleration data AX2 in accordance with equations (6) and (8), and outputs the final value of the correlation coefficient K to the Z axis direction acceleration corrector 70.

The Z axis direction acceleration corrector 70 calculates the true acceleration $\alpha_z'$ along the Z axis by correcting, in accordance with equation (4), the acceleration $\alpha_z$ represented by the acceleration data AD2 by using the acceleration $\alpha_x$ represented by the acceleration data AX2 and the final value of the correlation coefficient K supplied by the correlation coefficient learning section 71, and sends the acceleration data AD3 representing the true acceleration $\alpha_z'$ along Z axis to the velocity calculating section 34.

The velocity calculating section 34 calculates, in accordance with equation (5), the autonomous velocity V including a small error by using the true acceleration $\alpha_z'$ along the Z axis represented by the acceleration data AD3 supplied by the Z axis direction acceleration corrector 70 and the pitch rate $\omega_y$ around the Y axis represented by the pitch rate data PD2, and sends the velocity data VD1 representing the autonomous velocity V to the smoother/noise filter 35.

The smoother/noise filter 35 performs smoothing and noise filtering (described above) on the velocity data VD1, which is supplied by the velocity calculating section 34, to generate velocity data VD, and sends the velocity data VD to the velocity output section 36.

The velocity output section 36 sends the velocity data VD, which is supplied by the smoother/noise filter 35 and represents the velocity V of the vehicle, to the position calculator 25.

Thus, even when the PND 50 is in the upward tilt position, the velocity calculator 52 according to the second embodiment can more precisely calculate the autonomous velocity V by using the true acceleration $\alpha_z'$ along the Z axis from which the acceleration $\alpha_x$ that is mixed into the acceleration $\alpha_z$ has been removed.

2-4. Operation and Effect

As with the first embodiment, in the PND 50 according to the second embodiment and having the structure described above, the three-axis acceleration sensor 4 detects the acceleration $\alpha_z$ along the Z axis perpendicular to direction of travel of the vehicle, which is generated due to the undulation of a road surface, and the Y axis gyro sensor 5 detects the pitch rate $\omega_y$ around the Y axis perpendicular to the direction of travel of the vehicle, which is generated due to the undulation of a road surface.

When the PND 50 is used in the upward tilt position, the PND 50 considers that the acceleration $\alpha_x$ along the X axis is mixed into the acceleration $\alpha_z$ detected by the three-axis acceleration sensor 4, and learns the degree of mixture as the final value of the correlation coefficient K.

The PND 50 calculates the true acceleration $\alpha_z'$ along the Z axis, from which the acceleration $\alpha_x$ along the X axis has been removed, in accordance with equation (4), and calculates the autonomous velocity V that is more precise on the basis of the acceleration $\alpha_z'$ along the Z axis and the pitch rate $\omega_y$ around the Y axis in accordance with equation (5).

Therefore, as compared with the first embodiment, the PND 50 can calculate the autonomous velocity V that is more precise in that an error generated when the PND 50 is attached to the vehicle in the upward tilt position has been removed.

When the value of the acceleration $\alpha_x$ along the X axis is about "0", noise may become dominant. Therefore, when calculating the autonomous velocity V, the velocity calculator 52 calculates the correlation coefficient K only when the acceleration $|\alpha_x|$ is larger than the predetermined threshold TH.

Thus, the PND 50 can eliminate the influence of noise by removing the acceleration $\alpha_x$ along the X axis from the acceleration $\alpha_z$ along the Z axis when calculating the true acceleration $\alpha_z'$ along the Z axis, whereby the PND 50 can more precisely calculate the autonomous velocity V.

When calculating the Gain by using equation (8), the velocity calculator 52 adjusts the timing for updating the output value of the three-axis acceleration sensor 4, which is used for calculating the autonomous velocity V, in accordance with the reference Gain.

Thus, even when the upward tilt position of the PND 50 is slightly changed (tilt angle is changed), the PND 50 can accurately calculate the autonomous velocity V by using only new data and without being influenced by old data.

With the structure described above, even when the PND 50 according to the second embodiment is in the upward tilt position, the PND 50 can precisely calculate the autonomous velocity V in consideration of an error generated due to the tilt angle of the PND 50.

3. Other Embodiments

In the first embodiment described above, the velocity V is calculated using equation (3) on the basis of the maximum and minimum accelerations $\alpha_{z,min}$ and $\alpha_{z,max}$, which are extracted from the acceleration $\alpha_z$ corresponding to the acceleration data AD2, and the maximum and minimum angular velocities $\omega_{y,max}$ and $\omega_{y,min}$ which are extracted from the pitch rate $\omega_y$ corresponding to the angular velocity data DD2.

However, the present invention is not limited thereto. The velocity calculating section 34 may calculate the variances of the acceleration $\alpha_z$ corresponding to the acceleration data AD2 and the pitch rate $\omega_y$ corresponding to the pitch rate data PD2, which are supplied by the low pass filter 33, for, for example, a range of 25 data points or 75 data points around the data point $P_m$ corresponding to the previous position P0. Then, the velocity calculating section 34 may calculate the velocity V by dividing the variance of the acceleration $\alpha_z$ by the variance of the pitch rate $\omega_y$.

Alternatively, the velocity calculating section 34 may calculate the deviations of the acceleration $\alpha_z$ corresponding to the acceleration data AD2 and the pitch rate $\omega_y$ corresponding to the pitch rate data PD2, which are supplied by the low pass filter 33, for, for example, a range of 25 data points or 75 data points around the data point $P_m$ corresponding to the previous position P0. Then, the velocity calculating section 34 may calculate the velocity V by dividing the deviation of the acceleration $\alpha_z$ by the deviation of the pitch rate $\omega_y$.

In the first and second embodiments described above, the three-axis acceleration sensor 4, the Y axis gyro sensor 5, and the Z axis gyro sensor 6 respectively measure the accelerations $\alpha_x$, $\alpha_y$, $\alpha_z$, the pitch rates $\omega_y$, and the yaw rate $\omega_z$ with a sampling frequency of 50 Hz. However, the present invention is not limited thereto. The three-axis acceleration sensor 4, the Y axis gyro sensor 5, and the Z axis gyro sensor 6 may respectively measure the accelerations $\alpha_x$, $\alpha_y$, $\alpha_z$, the pitch rates $\omega_y$, and the yaw rate $\omega_z$ with a sampling frequency of, for example, 10 Hz instead of 50 Hz.

In the first and second embodiments described above, the velocity V is calculated using the acceleration $\alpha_z$ and the pitch rate $\omega_y$ that are detected with a sampling frequency of 50 Hz. However, the present invention is not limited thereto. The velocity calculators 22 and 52 of the PNDs 1 and 50 may calculate the averages of the acceleration $\alpha_z$ and the pitch rate $\omega_y$, which are detected with a sampling frequency of 50 Hz, for, for example, every 25 data points, and may calculate the velocity V using the averages of the acceleration $\alpha_z$ and the pitch rate $\omega_y$.

In this case, the velocity calculators 22 and 52 of the PNDs 1 and 50 calculate the averages of the acceleration $\alpha_z$ and pitch rate $\omega_y$, which are detected with a sampling frequency of 50 Hz, for, for example, every 25 data points, thereby calculating the velocity V twice per second. Thus, a processing load for the controllers 11 of the PNDs 1 and 50 due to velocity calculation can be reduced.

In the first and second embodiments described above, the high pass filter 32 performs high pass filtering on the acceleration data AD and the pitch rate data PD, which have been detected by the three-axis acceleration sensor 4 and the Y axis gyro sensor 5. However, the present invention is not limited thereto. The PNDs 1 and 50 may not perform high pass filtering on the acceleration data AD and the pitch rate data PD, which have been detected by the three-axis acceleration sensor 4 and the Y axis gyro sensor 5.

In the first and second embodiments, the high pass filter 32 and the low pass filter 33 perform high pass filtering and low pass filtering on the acceleration data AD and the pitch rate data PD, which have been detected by the three-axis acceleration sensor 4 and the Y axis gyro sensor 5. However, the present invention is not limited thereto. The PNDs 1 and 50 may perform, in addition to the high pass filtering and low pass filtering, moving average filtering on the acceleration data AD and the pitch rate data PD. The PNDs 1 and 50 may perform filtering that is an appropriate combination of high pass filtering, low pass filtering, and moving average filtering on the acceleration data AD and the pitch rate data PD.

In the first and second embodiments described above, when calculating, for example, the velocity V at the previous position P0 using the acceleration $\alpha_z$ and the pitch rate $\omega_y$, if it is determined that the velocity V at the previous position P0 is excessively high, the velocity V at the present position P0 is set at the former velocity $V_{n-1}$. However, the present invention is not limited thereto. If the velocity V at the previous position P0 is higher than the former velocity $V_{n-1}$ by a predetermined threshold, the velocity calculators 22 and 52 of the PNDs 1 and 50 may set the velocity V at the previous position P0 at a value that equals the former velocity $V_{n-1}$ plus a velocity that will be increased by acceleration of the vehicle.

If the velocity V at the previous position P0 is lower than the former velocity $V_{n-1}$ by a predetermined threshold, the velocity calculator 22 of the PND 1 may set the velocity at the previous position P0 at a value that equals the former velocity $V_{n-1}$ minus a velocity that will be decreased by deceleration of the vehicle.

In the first embodiment described above, the velocity V is calculated on the basis of the acceleration $\alpha_z$ and the pitch rate $\omega_y$ using equation (3).

However, the present invention is not limited thereto. The controller 11 of the PND 1 may compare the velocity V, which is calculated on the basis of the acceleration $\alpha_z$ and the pitch rate $\omega_y$ using equation (3), with the GPS velocity $V_g$, which is calculated on the basis of GPS signals.

When the velocity V has an error with respect to the GPS velocity $V_g$, the controller 11 of the PND 1 may calculate, for example, a correction factor for correcting the velocity V by using a linear function or a polynomial function of a second or a higher degree so as to minimize the error, and stores the correction factor in the memory 12.

Therefore, the velocity calculator 22 of the PND 1 may calculate the velocity V on the basis of the acceleration $\alpha_z$ and the pitch rate $\omega_y$ respectively detected by the three-axis acceleration sensor 4 and the Y-axis gyro sensor 5 using equation (3), read the correction factor from the memory 12, and correct the velocity V using the correction factor and a linear function or a polynomial function of a second or a higher degree.

In this case, the PND 1 can more precisely calculate the velocity V by learning beforehand the correction factor for correcting the velocity V on the basis of the GPS velocity $V_g$ calculated on the basis of GPS signals.

When calculating the correction factor used to correct the velocity V with respect to the GPS velocity $V_g$, the controller 11 of the PND 1 may divide the range of the velocity V into a plurality of velocity regions, such as a super low velocity region, a low velocity region, a medium velocity region, and a high velocity region, and may calculate a correction factor for each of the velocity regions.

When calculating the correction factor used to correct the velocity V with respect to the GPS velocity $V_g$, the controller 11 of the PND 1 may calculate the correction factor only when the vehicle is traveling at a high velocity that is equal to or higher than a predetermined value, such as 60 km/h.

In the second embodiment described above, the PND 50 calculates the velocity V by removing beforehand an influence that is produced when the PND 50 is used in the upward tilt position in which the PND 50 is tilted in the direction of travel along the X axis and around the Y axis (FIG. 5) by Q degrees (for example, 120 degrees). However, the present invention is not limited thereto. The PND 50 may calculate the autonomous velocity $V_y$ by removing beforehand an influence that is produced when the PND 50 is used in a position tilted with respected to the roll direction (a rightward tilt position or a leftward tilt position).

In this case, with the PND 50, the Z axis yaw angular velocity (yaw rate) $\omega_z$, which is detected by the Z-axis gyro sensor 6, is mixed into the Y axis pitch rate $\omega_y$, which is detected by the Y-axis gyro sensor 5.

Thus, with the PND 50, the pitch rate $\omega_y$ may become overestimated, and an error may be generated in the calculation result of the velocity $V_y$ (the autonomous velocity may be underestimated).

Therefore, the PND 50 learns a correlation coefficient $K_y$ that represents the degree to which the yaw rate $\omega_z$ around the Z axis is mixed into the pitch rate $\omega_y$ around the Y axis, and calculates a true pitch rate $\omega_y'$ around the Y axis from which the yaw rate $\omega_z$ around the Z axis is removed beforehand from the pitch rate $\omega_y$ around the Y axis in accordance with the following equation (9).

$$\omega_y' = \omega_y - K_y \cdot \omega_z \quad (9)$$

When the yaw rate $\omega_z$ around the Z axis is near "0", slight noise may considerably influence the value of the yaw rate $\omega_z$ and the noise may become dominant. Therefore, when calculating the autonomous velocity $V_y$, the PND 50 calculates the correlation coefficient $K_y$ only when the yaw rate $|\omega_z|$ is larger than a predetermined threshold $TH_y$ (for example, 1 deg/s).

A velocity calculator (described below) of the PND 50 calculates the correlation coefficient $K_y$ between the pitch rate $\omega_y$ around the Y axis and the yaw rate $\omega_z$ around the Z axis by learning, and calculates the true pitch rate $\omega_y'$ around the Y axis by removing the yaw rate $\omega_y$ around the Z axis that is mixed into the pitch rate $\omega_y$ around the Y axis by using the correlation coefficient $K_y$.

The velocity calculator calculates the autonomous velocity $V_y$ using the acceleration $\alpha_z$ along the Z axis and the true pitch rate $\omega_g'$ around the Y axis in accordance with the following equation (10).

$$V_y = \frac{\alpha_z}{\omega_y'} \quad (10)$$

When calculating the correlation coefficient $K_y$ beforehand by learning, the velocity calculator calculates a correlation coefficient $K_y n$ calculated on the basis of, for example, the result of the n-th sampling in accordance with the following equation (11).

$$K_y n = \frac{\omega_y}{\omega_z} \quad (11)$$

However, the calculation results of the correlation coefficient $K_y n$ have a large deviation (error) between samples. Therefore, it is difficult to use the correlation coefficient $K_y n$ to correct of the pitch rate $\omega_y$ around the Y axis (removing the yaw rate $\omega_z$ around the Z axis that is mixed into the pitch rate $\omega_y$ around the Y axis) for the next sampling.

Therefore, it is necessary for the velocity calculator to use a large number of correlation coefficients $K_y n$, each of which including an error, to obtain the final value of the correlation coefficient $K_y$ that has a small error. A simple method, for example, is to obtain the final value of the correlation coefficient $K_y$ by averaging all the correlation coefficient Kn obtained by sampling in a past period.

However, this method has two demerits. One is that it is necessary to prepare a buffer for storing the correlation coefficient Kn in the past period. The other is that the method is inefficient because the method does not consider the fact that the error of the correlation coefficient $K_y n$ is small when the yaw rate $|\omega_z|$ around the Z axis is considerably larger than "0" (larger than the threshold $TH_y$).

Therefore, when calculating the final value of the correlation coefficient K, the velocity calculator uses a correlation coefficient learning section (described below) including an infinite impulse response (IIR) filter, so that it is not necessary for the velocity calculator to have a buffer for storing all the correlation coefficient $K_y n$ in a past period.

The correlation coefficient learning section calculates the final value of the correlation coefficient $K_y$ using the following equation (12).

$$K_y = (K_yn - K_y) \cdot \text{Gain}_y + K_y \quad (12)$$

Thus, the correlation coefficient learning section stores only the correlation coefficient $K_y$ that is the result of the previous learning. In equation (12), $\text{Gain}_y$ is a predetermined constant.

Instead of using the $\text{Gain}_y$ as a constant, however, the correlation coefficient learning section changes the value of the $\text{Gain}_y$ in accordance with the yaw rate $|\omega_z|$ around the Z axis, so that the correlation coefficient $K_yn$ having a smaller error is weighted and thereby the final value of the correlation coefficient $K_y$ converges faster on an appropriate final value.

To be specific, the correlation coefficient learning section calculates the Gain in equation (12) using the following equation (13)

$$\text{Gain}_y = \text{Reference Gain}_y \cdot \frac{|\omega_x|}{\text{Reference } \omega_x} \quad (13)$$

Description of the meaning of equation (13) is omitted because it is the same as that of equation (8).

Figure 46:
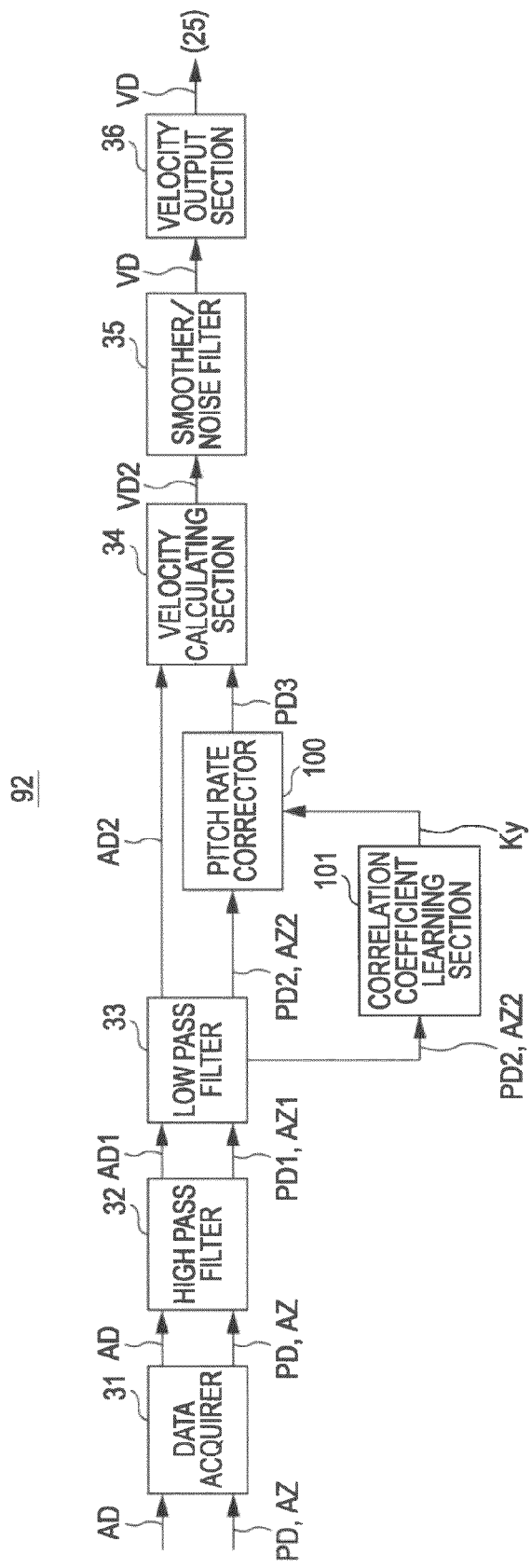
FIG. 46 is a block diagram illustrating a velocity calculator according to another embodiment.

FIG. 46 is a block diagram of a velocity calculator 92, in which parts corresponding to those of FIG. 45 are represented by the same numerals. As illustrated in FIG. 46, the velocity calculator 92 is similar to the velocity calculator 52 except that the velocity calculator 92 includes a pitch rate corrector 100 instead of the Z axis direction acceleration corrector 70 and includes a correlation coefficient learning section 101 instead of the correlation coefficient learning section 71.

The data acquirer 31 of the velocity calculator 92 sends the acceleration data AD representing the acceleration $\alpha_z$, the yaw rate data AZ representing the yaw rate $\omega_z$ around the Z axis, and the pitch rate data PD representing the pitch rate $\omega_y$ around the Y axis supplied by the Y-axis gyro sensor 5 to the high pass filter 32.

The high pass filter 32 removes direct-current components (and thereby removes offset components) from the acceleration data AD, the yaw rate data AX, and the pitch rate data PD to generate acceleration data AD1, yaw rate data AZ1, and pitch rate data PD1, and sends the acceleration data AD1, the acceleration data AX1, and the pitch rate data PD1 to the low pass filter 33.

The low pass filter 33 performs the aforementioned low pass filtering on the acceleration data AD1, the yaw rate data AZ1, and the pitch rate data PD1 to generate acceleration data AD2, yaw rate data AZ2, and pitch rate data PD2. The low pass filter 33 sends the acceleration data AD2 to the velocity calculating section 34, and sends the pitch rate data PD2 and the yaw rate data AZ2 to the correlation coefficient learning section 101 and the pitch rate corrector 100.

The correlation coefficient learning section 101 calculates the final value of the correlation coefficient $K_y$ by using the pitch rate $\omega_y$ around the Y axis represented by the pitch rate data PD2 and the yaw rate $\omega_z$ around the Z axis represented by the yaw rate data AZ2 in accordance with equations (11) and (13), and outputs the final value of the correlation coefficient $K_y$ to the pitch rate corrector 100.

The pitch rate corrector 100 calculates the true pitch rate $\omega_y'$ around the Y axis by correcting, in accordance with equation (9), the pitch rate $\omega_y$ around the Y axis represented by the pitch rate data PD2 by using the yaw rate $\omega_z$ represented by yaw rate data AZ2 and the final value of the correlation coefficient $K_y$ supplied by the correlation coefficient learning section 101, and sends pitch rate data PD3 representing the true pitch rate $\omega_y'$ to the velocity calculating section 34.

The velocity calculating section 34 calculates, in accordance with equation (10), the autonomous velocity $V_y$ including a small error by using the true pitch rate $\omega_y'$ around the Y axis represented by the acceleration data PD3 supplied by the pitch rate corrector 100 and the acceleration $\alpha_z$ along the Z axis represented by the acceleration data AD2, and sends the velocity data VD2 representing the autonomous velocity $V_y$ to the smoother/noise filter 35.

The smoother/noise filter 35 performs smoothing and noise filtering (described above) on the velocity data VD2, which is supplied by the velocity calculating section 34, to generate velocity data VD, and sends the velocity data VD to the velocity output section 36.

The velocity output section 36 sends the velocity data VD, which is supplied by the smoother/noise filter 35 and represents the autonomous velocity $V_y$ of the vehicle, to the position calculator 25.

Thus, even when the PND 50 is in the tilt position tilted in a roll direction, the velocity calculator 92 can more precisely calculate the autonomous velocity $V_y$ by using the true pitch rate $\omega_y'$ around the Y axis from which the yaw rate $\omega_z$ that is mixed into the pitch rate $\omega_y$ around the Y axis has been removed.

The PND 50 may remove beforehand the influence when the PND 50 is used in an upward tilt position and the influence when the PND 50 is used in a position tilted with respect to a roll direction (a rightward tilt position or a leftward tilt position) and calculate the autonomous velocity V.

In the first and second embodiments described above, the PNDs 1 and 50 perform navigation while the PNDs 1 and 50 are supplied with electric power. However, the present invention is not limited thereto. When the power button (not shown) is pressed and the PNDs 1 and 50 are powered off, the PNDs 1 and 50 may store, in the memory 12, the present position, the height, and the like at the moment when the power button is pressed. When the power button is pressed again and the PNDs 1 and 50 are powered on, the PNDs 1 and 50 may read the present position, the height, and the like from the memory 12, and may perform navigation on the basis of the present position, the height, and the like in accordance with the process of calculating the present position.

In the first and second embodiments described above, the PNDs 1 and 50 calculate the velocity V while the PNDs 1 and 50 are supported on the cradle 3 placed on the dashboard of the vehicle. However, the present invention is not limited thereto. When it is detected that the PNDs 1 and 50 are mechanically or electrically disconnected from the cradle 3, the velocity V may be set at 0 or maintained at the former velocity $V_{n-1}$.

Figure 47:
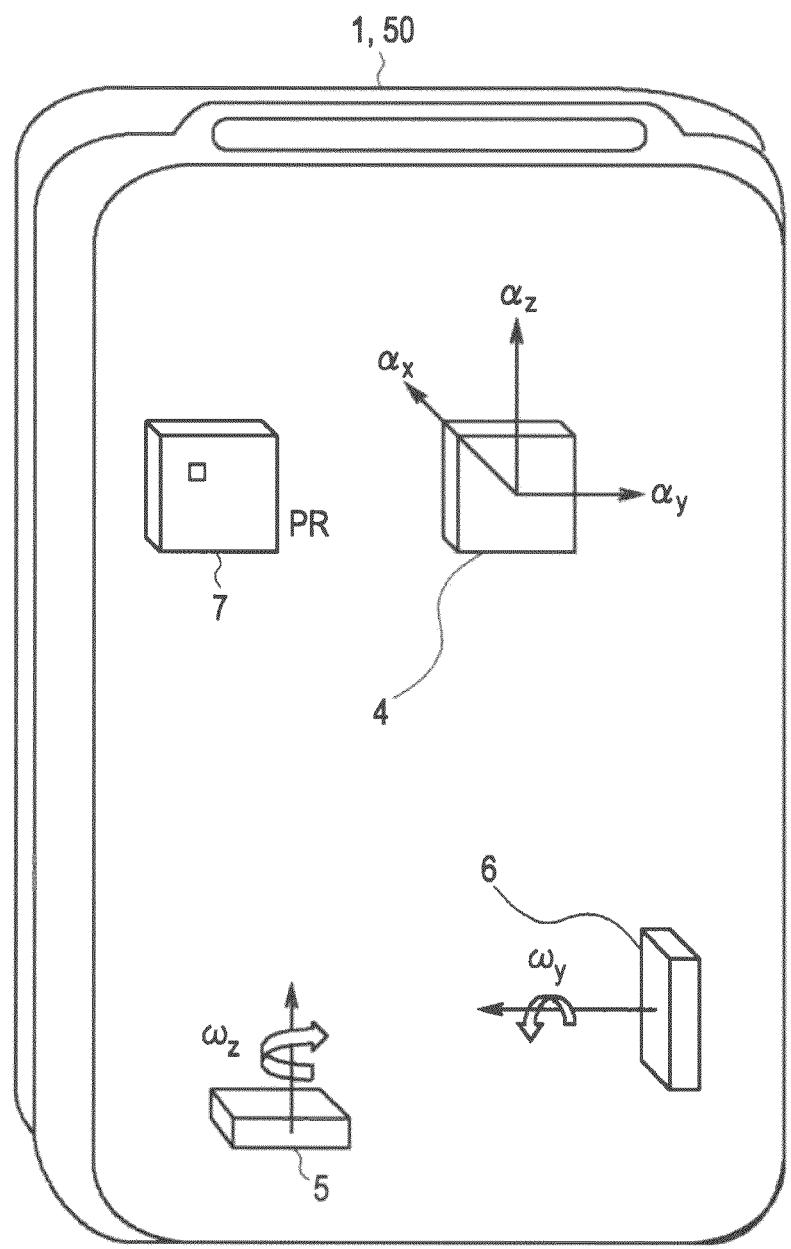
FIG. 47 is a diagram illustrating an example of the way the PND is used according to another embodiment.

In the first and second embodiments described above, the PNDs 1 and 50 are used in a landscape position. However, the present invention is not limited thereto. As illustrated in FIG. 47, the PNDs 1 and 50 may be used in a portrait position. In this position, the PNDs 1 and 50 may detect the yaw rate $\omega_z$ around the Z axis with the Y axis gyro sensor 5 and the pitch rate $\omega_y$ around the Y axis with the Z axis gyro sensor 6.

In the first and second embodiments described above, the three-axis acceleration sensor 4, the Y axis gyro sensor 5, the Z axis gyro sensor 6, and the barometric pressure sensor 7 are disposed inside the PNDs 1 and 50. However, the present invention is not limited thereto. The three-axis acceleration sensor 4, the Y axis gyro sensor 5, the Z axis gyro sensor 6, and the barometric pressure sensor 7 may be disposed outside the PNDs 1 and 50.

The PNDs 1 and 50 may include an adjustment mechanism disposed on a side thereof so that a user can adjust the attachment angles of the three-axis acceleration sensor 4, the Y axis gyro sensor 5, the Z axis gyro sensor 6, and the barometric pressure sensor 7.

In this case, the PNDs 1 and 50 allow a user to adjust the adjustment mechanism so that, for example, the rotation axis of the Y axis gyro sensor 5 is aligned in the vertical direction with respect to the vehicle even when the display 2 is not substantially perpendicular to the direction of travel of the vehicle.

In the first and second embodiments described above, the velocity V is determined as excessively high if the pitch rate $\omega_y$ corresponding to the pitch rate data PD2 is lower than a predetermined threshold and if the acceleration $\alpha_z$ corresponding to the acceleration data AD2 and the pitch rate $\omega_y$ corresponding to the pitch rate data PD2 are higher than predetermined thresholds. However, the present invention is not limited thereto. The controllers 11 may determine that the velocity V is excessively high if the velocity V calculated by the velocity calculating section 34 is higher than the former velocity $V_{n-1}$ by a predetermined value.

In this case, the smoother/noise filter 35 may set the velocity V at 0 when the velocity V calculated by the velocity calculating section 34 is higher than the former velocity $V_{n-1}$ by a predetermined value and when the former velocity is at a low velocity lower than, for example, 10 km/h. The smoother/noise filter 35 may set the velocity V at the former velocity $V_{n-1}$ when the velocity V calculated by the velocity calculating section 34 is higher than the former velocity $V_{n-1}$ by a predetermined value and the former velocity is equal to or higher than, for example, 10 km/h.

In the first and second embodiments described above, the controllers 11 of the PNDs 1 and 50 performs the process of calculating the present position of the routine RT1 and the like in accordance with application programs stored in the memory 12. However, the present invention is not limited thereto. The controllers 11 of the PNDs 1 and 50 may perform the process of calculating the present position in accordance with application programs that are installed from storage media, downloaded from the Internet, or installed by using other methods.

In the embodiments described above, the PNDs 1 and 50, each of which corresponds to a velocity calculating device according to the present invention, includes the three-axis acceleration sensor 4 corresponding to a vertical acceleration detector, the Y-axis gyro sensor 5 corresponding to a horizontal angular velocity detector, the correlation coefficient learning section 71 corresponding to a correlation coefficient learning section, the Z axis direction acceleration corrector 70 corresponding to a true vertical acceleration detector, and the velocity calculating section 34 corresponding to a velocity calculator. However, the present invention is not limited thereto. A velocity calculating device according to the present invention may include a vertical acceleration detector, a horizontal angular velocity detector, a correlation coefficient learning section, a true vertical acceleration detector, and a velocity calculator, which have different structures.

The present application contains subject matter related to that disclosed in Japanese Priority Patent Application JP 2009-213447 filed in the Japan Patent Office on Sep. 15, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A velocity calculating device comprising:
    a vertical acceleration detector mounted on a moving body, the vertical acceleration detector detecting an acceleration in a vertical direction generated due to an undulation of a contact surface that is in contact with the moving body;
    a horizontal angular velocity detector mounted on the moving body, the horizontal angular velocity detector detecting an angular velocity around a horizontal axis that is perpendicular to a direction of travel of the moving body, the angular velocity being generated due to the undulation of the contact surface; and
    circuitry configured to
        calculate a correlation coefficient that represents a degree to which an acceleration in the direction of travel of the moving body is mixed into the acceleration in the vertical direction in accordance with an attachment angle with which a body including the vertical acceleration detector and the horizontal angular velocity detector is attached to the moving body;
        calculate a true acceleration in the vertical direction by subtracting the acceleration in the direction of travel mixed into the acceleration in the vertical direction from the acceleration in the vertical direction, the acceleration in the direction of travel mixed into the acceleration in the vertical direction being calculated on the basis of the correlation coefficient; and
        calculate a velocity of the moving body in the direction of travel of the moving body on the basis of the true acceleration in the vertical direction and the angular velocity around the horizontal axis.

2. The velocity calculating device according to claim 1, wherein the circuitry is configured to calculate the correlation coefficient only when the acceleration in the direction of travel is larger than a predetermined threshold.

3. The velocity calculating device according to claim 2, wherein the circuitry is configured to calculate a final value of the correlation coefficient by using, as an input, a new correlation coefficient that is obtained by sampling a plurality of outputs from the vertical acceleration detector and the horizontal angular velocity detector and by performing processing using a low pass filter.

4. The velocity calculating device according to claim 3, wherein the circuitry is configured to change a gain of the low pass filter in accordance with a magnitude of the acceleration in the direction of travel.

5. The velocity calculating device according to claim 1, wherein the circuitry is further configured to:
    calculate a second correlation coefficient that represents a degree to which a yaw angular velocity of the moving body around the Z axis is mixed into the angular velocity around the horizontal axis in accordance with the attachment angle with which the body is attached to the moving body;
    calculate a true angular velocity around the horizontal axis by subtracting the yaw angular velocity mixed into the angular velocity around the horizontal axis from the angular velocity around the horizontal axis, the yaw angular velocity mixed into the angular velocity around the horizontal axis being calculated on the basis of the second correlation coefficient; and
    calculate the velocity of the moving body in the direction of travel of the moving body on the basis of the true acceleration in the vertical direction and the true angular velocity around the horizontal axis.

6. The velocity calculating device according to claim 5, wherein the circuitry is further configured to calculate the second correlation coefficient only when the yaw angular velocity around the Z axis is higher than a predetermined threshold.

7. A method of calculating a velocity, the method comprising the steps of:

detecting an acceleration in a vertical direction generated due to an undulation of a contact surface that is in contact with a moving body by using a vertical acceleration detector mounted on the moving body;

detecting an angular velocity around a horizontal axis that is perpendicular to a direction of travel of the moving body by using a horizontal angular velocity detector mounted on the moving body, the angular velocity being generated due to the undulation of the contact surface;

calculating a correlation coefficient that represents a degree to which an acceleration in the direction of travel of the moving body is mixed into the acceleration in the vertical direction in accordance with an attachment angle with which a body including the vertical acceleration detector and the horizontal angular velocity detector is attached to the moving body by using a correlation coefficient calculator;

calculating a true acceleration in the vertical direction by subtracting the acceleration in the direction of travel mixed into the acceleration in the vertical direction from the acceleration in the vertical direction by using a predetermined true vertical acceleration detector, the acceleration in the direction of travel mixed into the acceleration in the vertical direction being calculated on the basis of the correlation coefficient; and calculating a velocity of the moving body in the direction of the travel of the moving body on the basis of the true acceleration in the vertical direction and the angular velocity around the horizontal axis by using a velocity calculator.

8. A navigation device comprising:

a vertical acceleration detector mounted on a moving body, the vertical acceleration detector detecting an acceleration in a vertical direction generated due to an undulation of a contact surface that is in contact with the moving body;

a horizontal angular velocity detector mounted on the moving body, the horizontal angular velocity detector detecting an angular velocity around a horizontal axis that is perpendicular to a direction of travel of the moving body, the angular velocity being generated due to the undulation of the contact surface; and circuitry configured to calculate a correlation coefficient that represents a degree to which an acceleration in the direction of travel of the moving body is mixed into the acceleration in a vertical direction in accordance with an attachment angle with which a body including the vertical acceleration detector and the horizontal angular velocity detector is attached to the moving body;

calculate a true acceleration in a vertical direction by subtracting the acceleration in the direction of travel mixed into the acceleration in a vertical direction from the acceleration in a vertical direction, the acceleration in the direction of travel mixed into the acceleration in a vertical direction being calculated on the basis of the correlation coefficient;

calculate a velocity of the moving body in the direction of travel of the moving body on the basis of the true acceleration in the vertical direction and the angular velocity around the horizontal axis;

calculate an angular velocity around the vertical axis perpendicular to the direction of travel;

calculate an angle by which the moving body has rotated on the basis of the angular velocity around the vertical axis; and calculate a position of the moving body on the basis of the velocity in the direction of travel that is calculated by the velocity calculator and the angle that is calculated by the angle calculator.

* * * * *